US012579593B2

(12) United States Patent
Penrose et al.

(10) Patent No.: US 12,579,593 B2
(45) Date of Patent: Mar. 17, 2026

(54) SYSTEMS AND METHODS FOR ENTITY, RELATIONSHIP, AND TIMELINE GENERATION FROM COMPLEX OBJECT SETS

(71) Applicant: Tranquility AI Inc., Jackson, WY (US)

(72) Inventors: James T. Penrose, Laurel, MD (US); David M. Harvilicz, Los Angeles, CA (US)

(73) Assignee: Tranquility AI Inc., Jackson, WY (US)

( * ) Notice: Subject to any disclaimer, the term of this patent is extended or adjusted under 35 U.S.C. 154(b) by 0 days.

(21) Appl. No.: 19/004,017

(22) Filed: Dec. 27, 2024

(65) Prior Publication Data

US 2025/0258863 A1 Aug. 14, 2025

Related U.S. Application Data

(60) Provisional application No. 63/551,193, filed on Feb. 8, 2024.

(51) Int. Cl.
| | |
|---|---|
| *G06F 16/70* | (2019.01) |
| *G06F 16/71* | (2019.01) |
| *G06F 16/783* | (2019.01) |
| *G06F 16/787* | (2019.01) |
| *G06Q 50/18* | (2012.01) |
| *G06F 40/40* | (2020.01) |

(52) U.S. Cl.
CPC ............. *G06Q 50/18* (2013.01); *G06F 16/71* (2019.01); *G06F 16/7834* (2019.01); *G06F 16/7837* (2019.01); *G06F 16/7844* (2019.01); *G06F 16/787* (2019.01); *G06F 40/40* (2020.01)

(58) Field of Classification Search
CPC .. G06F 16/71; G06F 16/7834; G06F 16/7837; G06F 16/7844; G06F 16/787
See application file for complete search history.

(56) References Cited

U.S. PATENT DOCUMENTS

| | | | |
|---|---|---|---|
| 11,182,338 B1 * | 11/2021 | Shim | ......................... G06F 7/24 |
| 2015/0106683 A1 * | 4/2015 | Lindsey | .............. G06F 16/2477 |
| | | | 715/202 |
| 2016/0092883 A1 | 3/2016 | Weber et al. | |
| 2018/0095938 A1 | 4/2018 | Monte | |
| 2018/0374057 A1 | 12/2018 | Vardidze | |
| 2019/0371475 A1 | 12/2019 | Oliveira et al. | |
| 2020/0387810 A1 | 12/2020 | Hodgson et al. | |
| 2021/0342541 A1 * | 11/2021 | Taylor | ................. G06F 16/3328 |
| 2024/0362279 A1 * | 10/2024 | Kharbanda | .......... G06V 10/255 |

OTHER PUBLICATIONS

International Search Report and Written Opinion from corresponding PCT application No. PCT/US2025/015082 dated Apr. 14, 2025.

* cited by examiner

*Primary Examiner* — Kristopher Andersen
(74) *Attorney, Agent, or Firm* — Scale LLP

(57) ABSTRACT

Disclosed are methods, systems, and non-transitory computer readable memory for processing, analyzing, and visualizing complex digital object sets using large language models. For instance, a method may include receiving a set of digital objects; indexing the received set of digital objects to generate indexed data; generating a timeline prompt based on the indexed data; processing the timeline prompt to generate a timeline response; and outputting the timeline response as an interactive timeline of based on the set of digital objects.

20 Claims, 48 Drawing Sheets

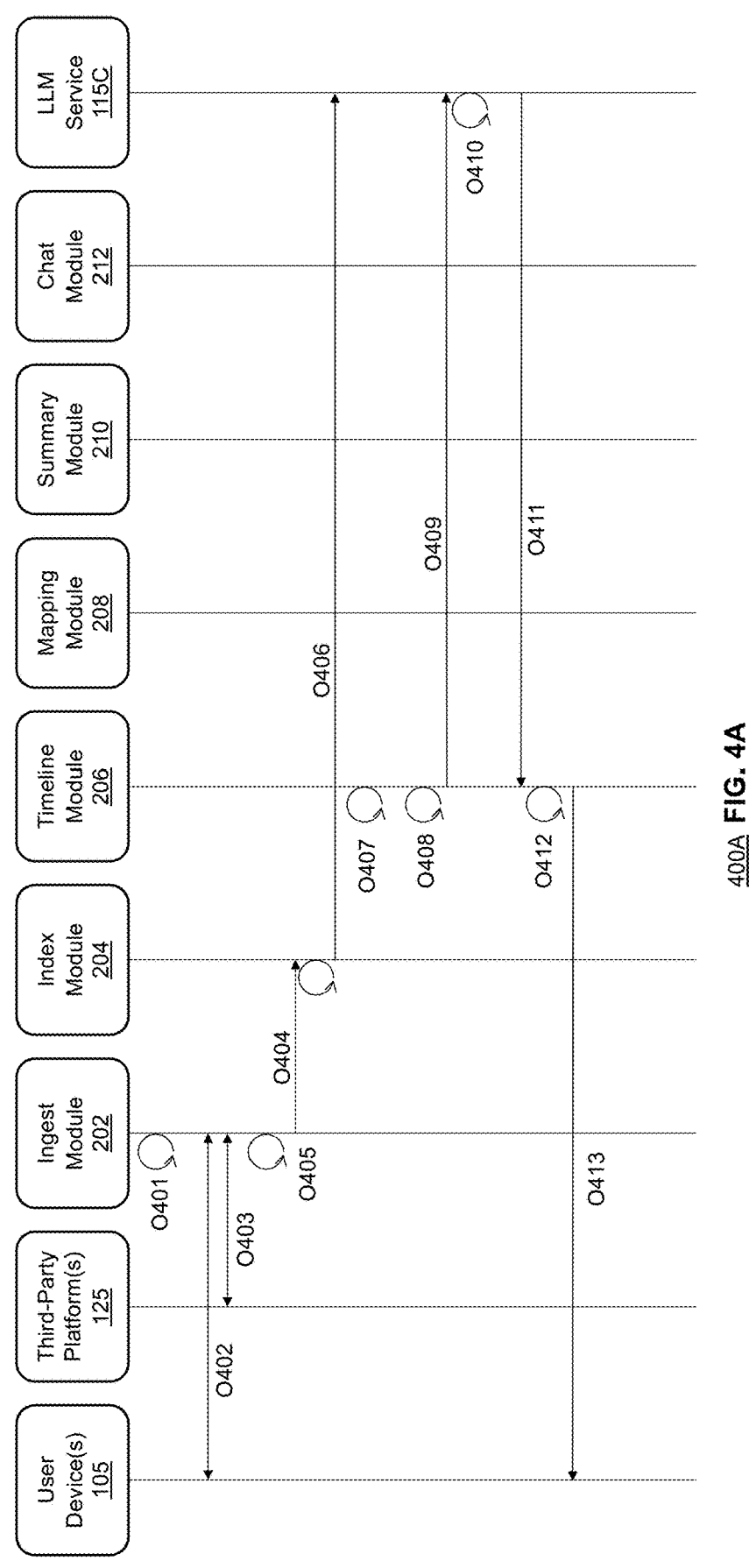
400A FIG. 4A

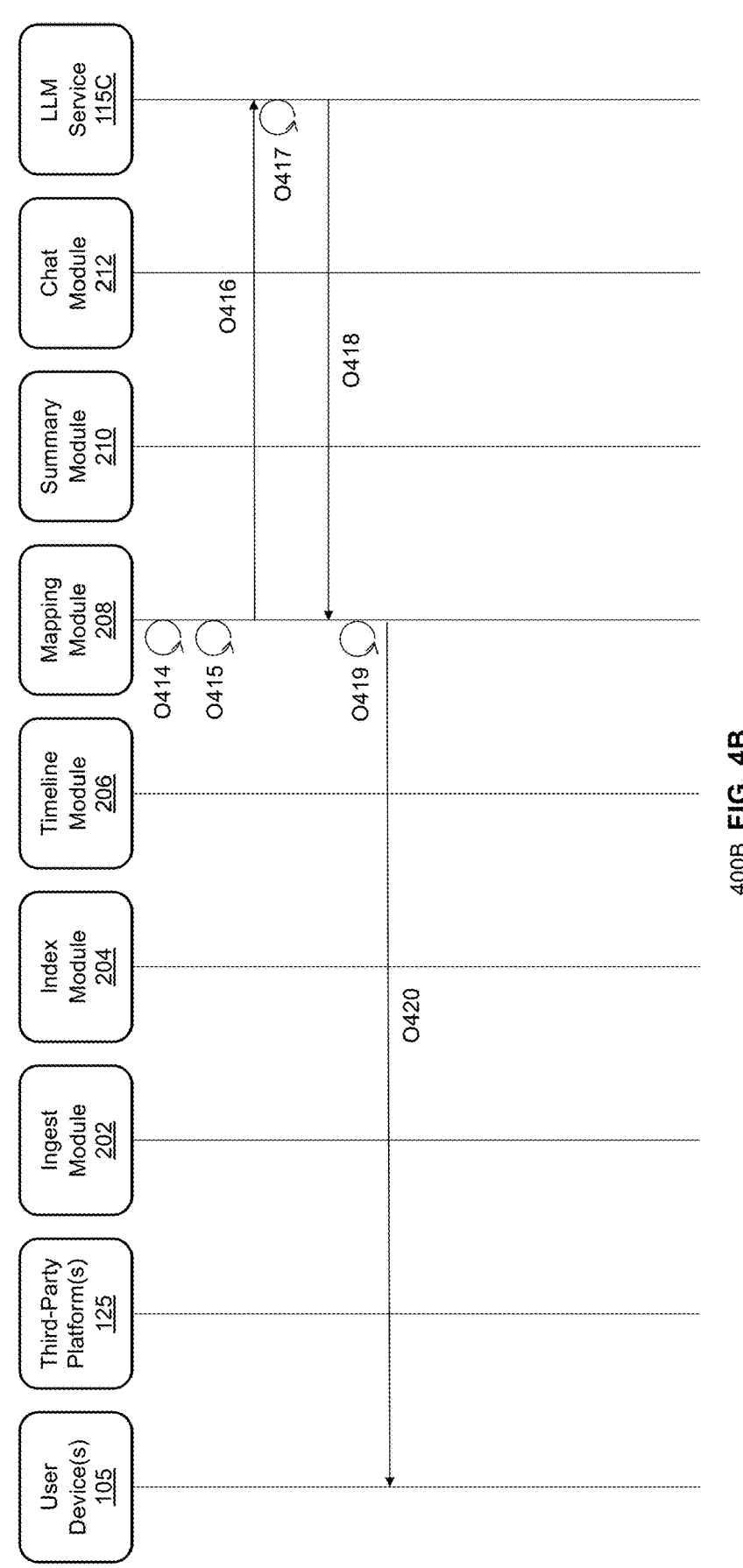
400B FIG. 4B

400C

400D

500A

Figure 5B:
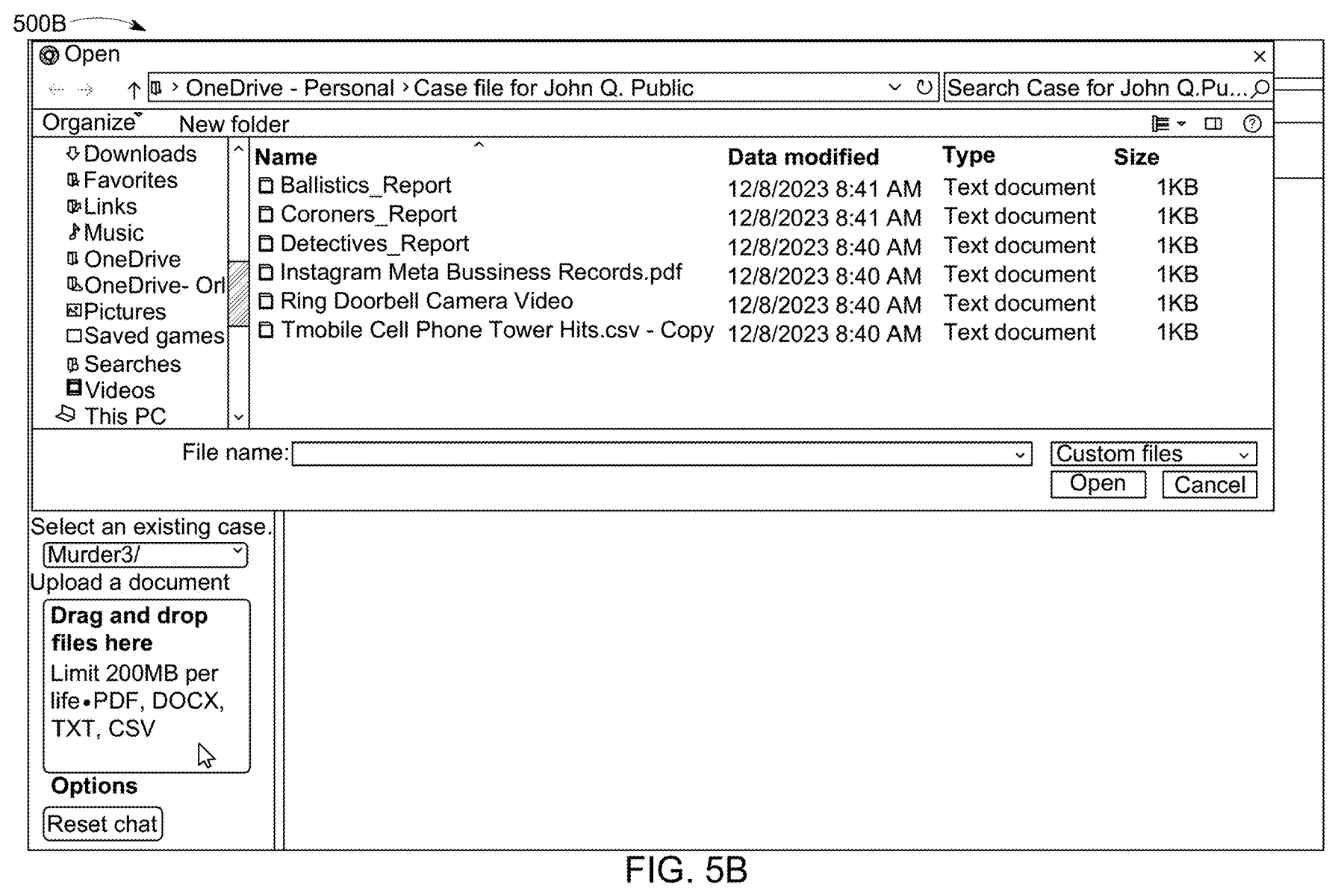

500B

Open

← → ↑ ⊞ › OneDrive - Personal › Case file for John Q. Public  ∨ ↻  Search Case for John Q.Pu...

Organize ˇ  New folder

| Name | Data modified | Type | Size |
|---|---|---|---|
| ☐ Ballistics_Report | 12/8/2023 8:41 AM | Text document | 1KB |
| ☐ Coroners_Report | 12/8/2023 8:41 AM | Text document | 1KB |
| ☐ Detectives_ Report | 12/8/2023 8:40 AM | Text document | 1KB |
| ☐ Instagram Meta Bussiness Records.pdf | 12/8/2023 8:40 AM | Text document | 1KB |
| ☐ Ring Doorbell Camera Video | 12/8/2023 8:40 AM | Text document | 1KB |
| ☐ Tmobile Cell Phone Tower Hits.csv - Copy | 12/8/2023 8:40 AM | Text document | 1KB |

Downloads
Favorites
Links
Music
OneDrive
OneDrive- Orl
Pictures
Saved games
Searches
Videos
This PC File name: ⌄  Custom files ⌄
Open  Cancel Select an existing case.
Murder3/ ⌄
Upload a document

Drag and drop files here

Limit 200MB per life•PDF, DOCX, TXT, CSV

Options

Reset chat

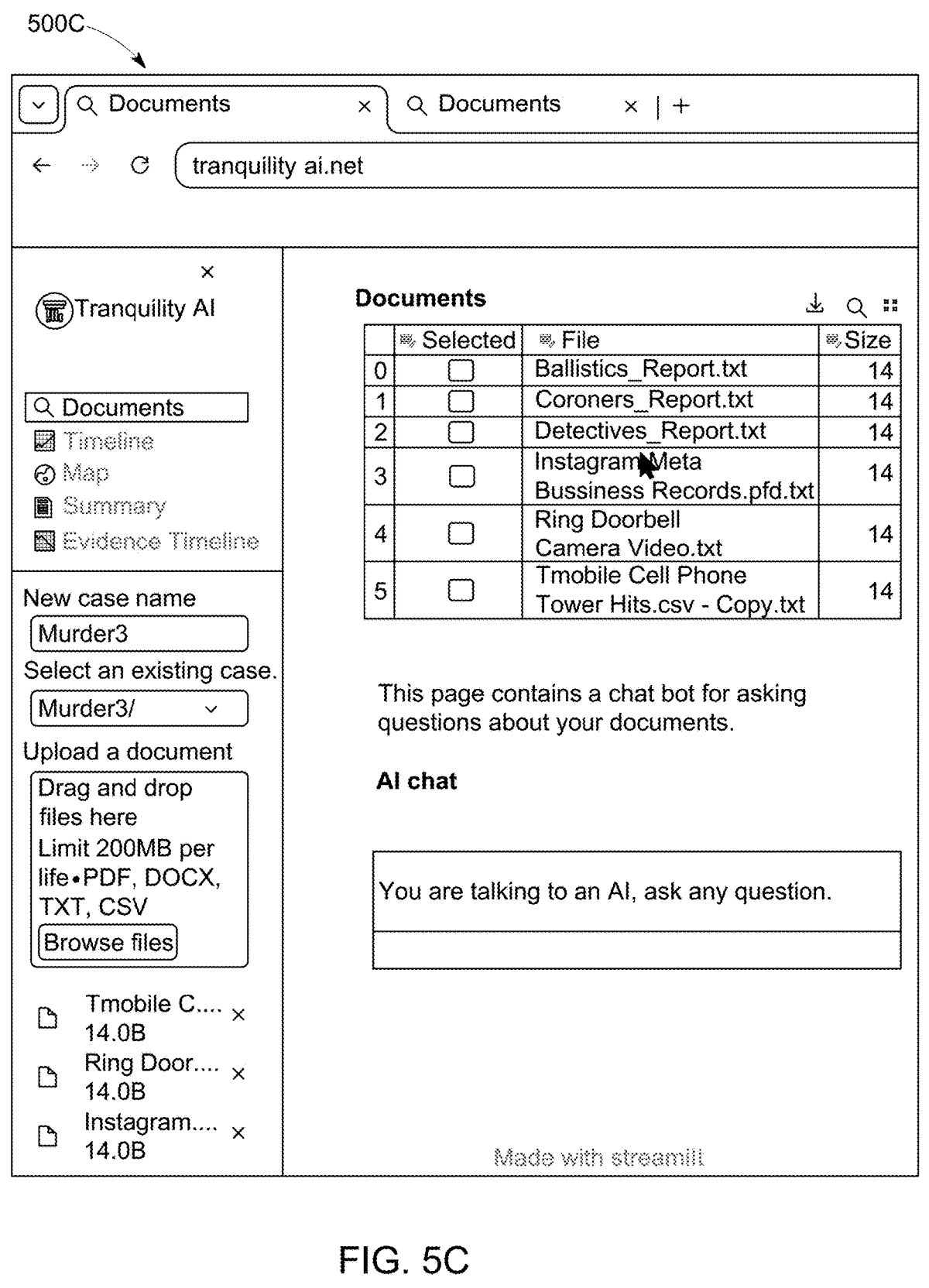

Q Documents ✕    Q Documents ✕ | +

← → C   tranquility ai.net

✕

🏛 Tranquility AI

Q Documents

☑ Timeline
⊘ Map
📄 Summary
📊 Evidence Timeline

New case name
Murder3

Select an existing case.
Murder3/ ⌄

Upload a document

Drag and drop
files here
Limit 200MB per
life•PDF, DOCX,
TXT, CSV
Browse files

📄 Tmobile C.... ✕
14.0B

📄 Ring Door.... ✕
14.0B

📄 Instagram.... ✕
14.0B

Documents    ⬇ Q ⠿

| | Selected | File | Size |
|---|---|---|---|
| 0 | ☐ | Ballistics_Report.txt | 14 |
| 1 | ☐ | Coroners_Report.txt | 14 |
| 2 | ☐ | Detectives_Report.txt | 14 |
| 3 | ☐ | Instagram Meta Bussiness Records.pfd.txt | 14 |
| 4 | ☐ | Ring Doorbell Camera Video.txt | 14 |
| 5 | ☐ | Tmobile Cell Phone Tower Hits.csv - Copy.txt | 14 |

This page contains a chat bot for asking
questions about your documents.

AI chat

You are talking to an AI, ask any question.

Made with streamlit

FIG. 5C

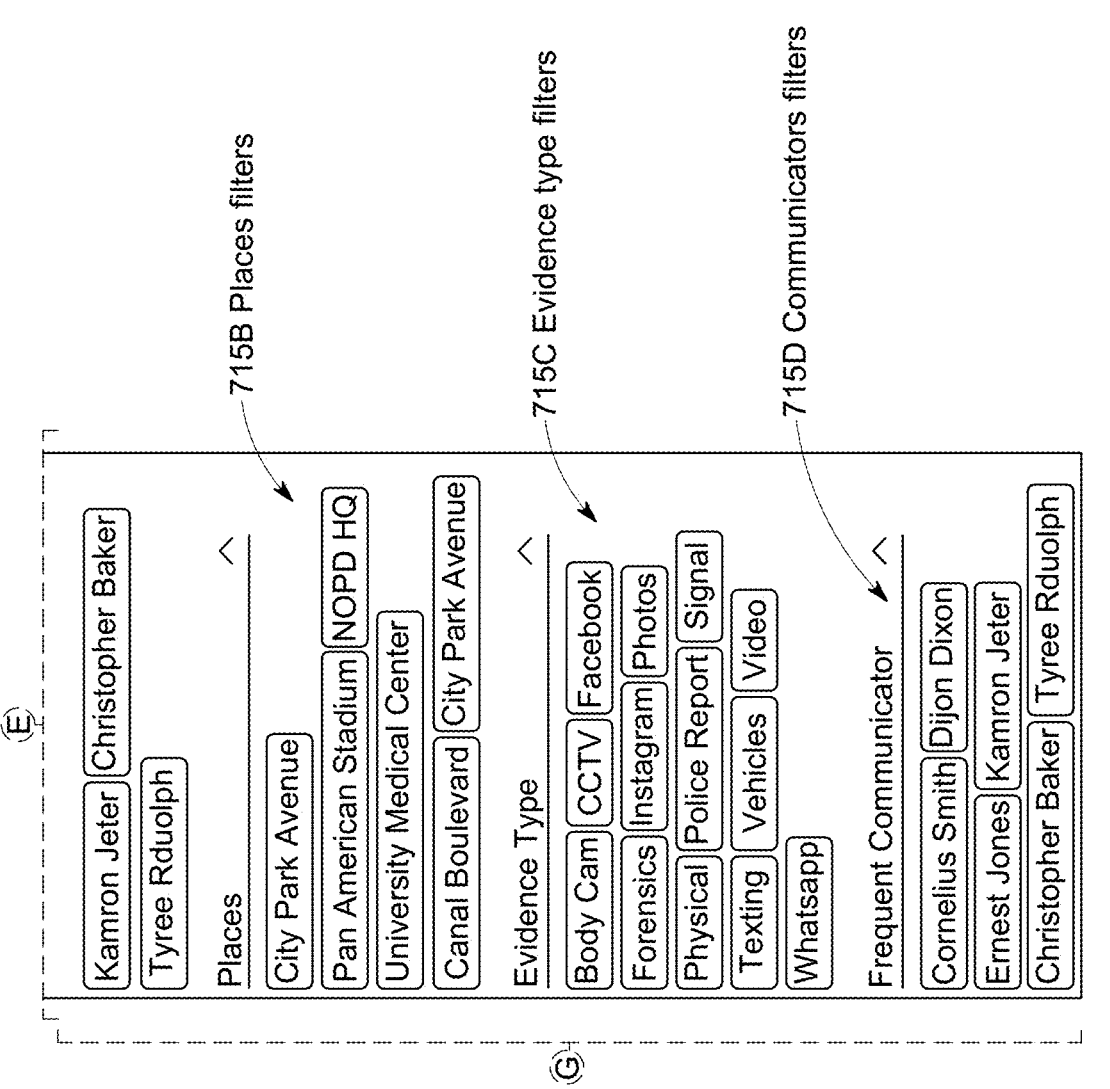

715B Places filters

715C Evidence type filters

715D Communicators filters (E)

Kamron Jeter | Christopher Baker

Tyree Rduolph

Places

City Park Avenue

Pan American Stadium | NOPD HQ

University Medical Center

Canal Boulevard | City Park Avenue

Evidence Type

Body Cam | CCTV | Facebook

Forensics | Instagram | Photos

Physical | Police Report | Signal

Texting | Vehicles | Video

Whatsapp

Frequent Communicator

Cornelius Smith | Dijon Dixon

Ernest Jones | Kamron Jeter

Christopher Baker | Tyree Rduolph (G)

FIG. 7B (Continued)

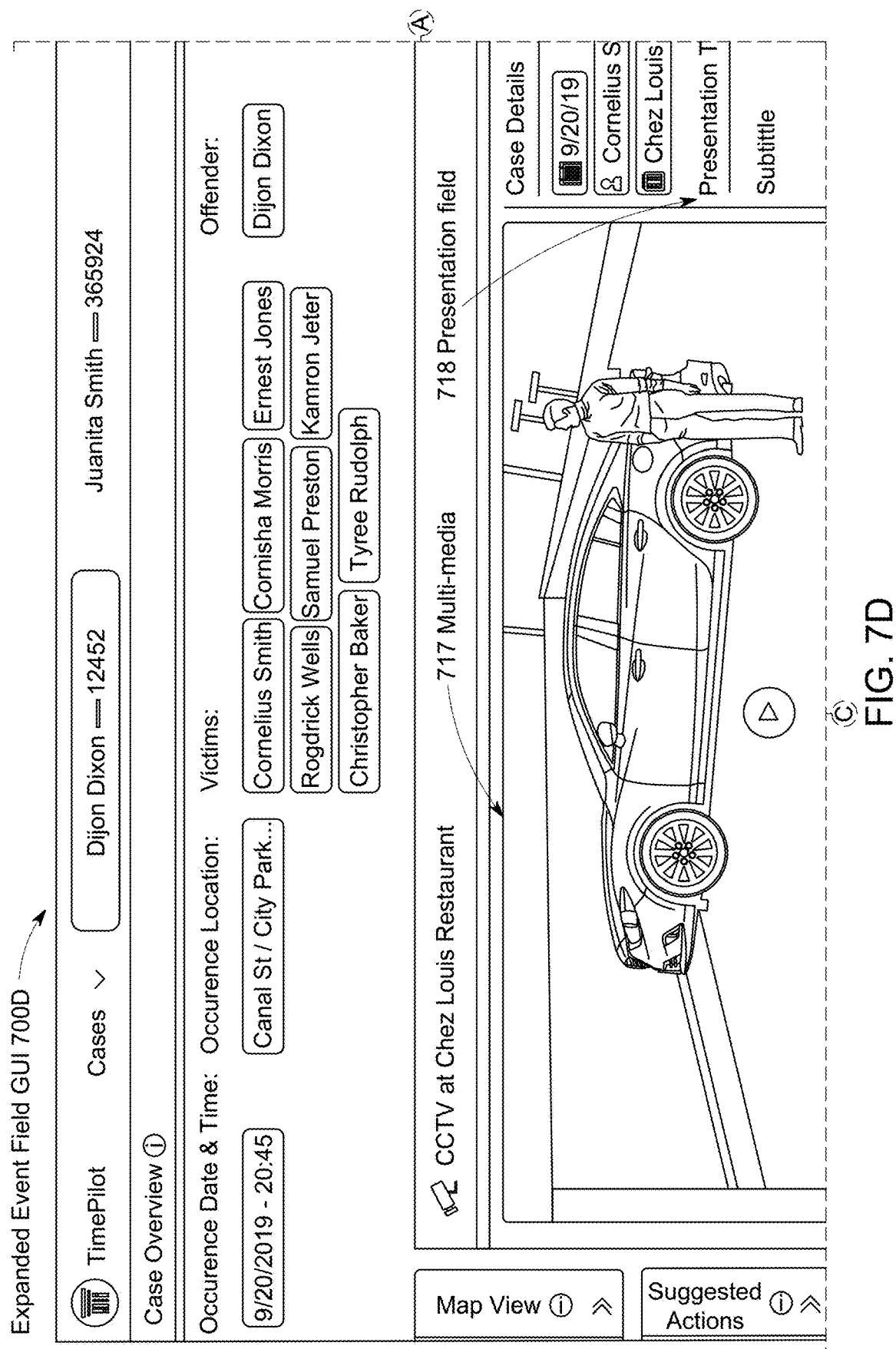

Expanded Event Field GUI 700D

TimePilot          Cases  >          Dijon Dixon — 12452          Juanita Smith — 365924

Case Overview ⓘ

Occurence Date & Time:     Occurence Location:     Victims:     Offender:

9/20/2019 - 20:45     Canal St / City Park...     Cornelius Smith | Cornisha Morris | Ernest Jones     Dijon Dixon Rogdrick Wells | Samuel Preston | Kamron Jeter Christopher Baker | Tyree Rudolph 717 Multi-media ✍ CCTV at Chez Louis Restaurant 718 Presentation field Case Details

📅 9/20/19

👤 Cornelius S

📇 Chez Louis

Presentation T

Subtitle

Map View ⓘ ≫

Suggested Actions ⓘ ≫

FIG. 7D

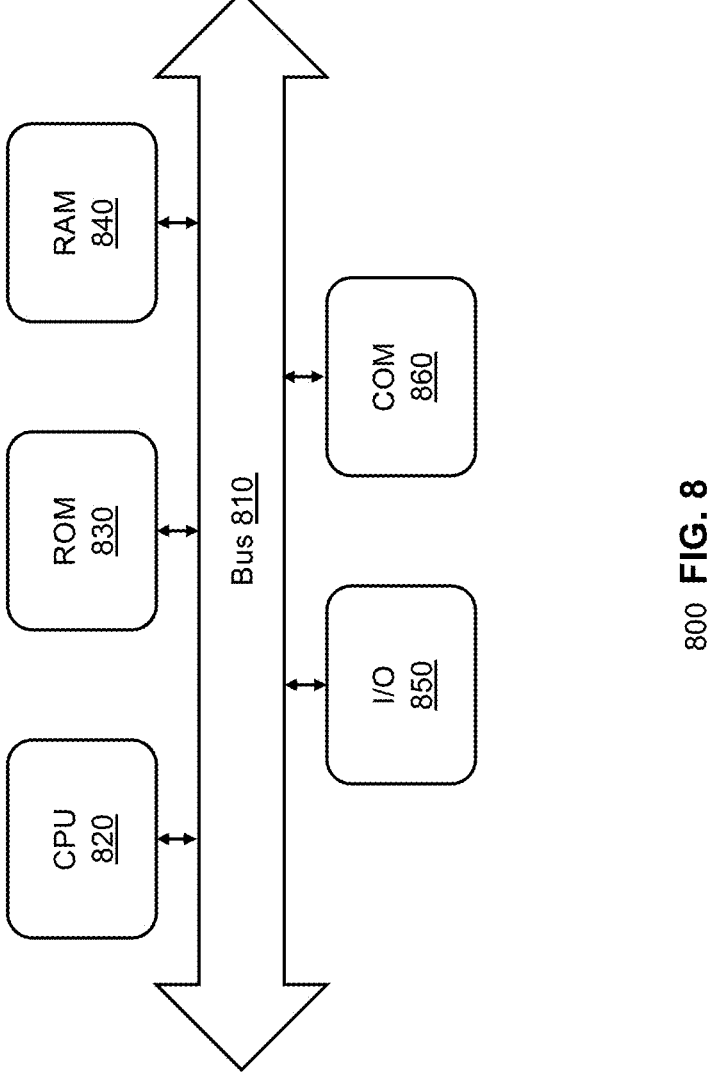
800  FIG. 8

SYSTEMS AND METHODS FOR ENTITY, RELATIONSHIP, AND TIMELINE GENERATION FROM COMPLEX OBJECT SETS

CROSS-REFERENCE TO RELATED APPLICATION(S)

This application claims the benefit of U.S. Provisional Application No. 63/551,193, filed Feb. 8, 2024.

The contents of each of the above referenced applications are hereby incorporated by reference in its entirety.

TECHNICAL FIELD

Various aspects of the present disclosure relate generally to systems and methods for large language model (LLM) and, more particularly, to systems and methods for processing, analyzing, and visualizing legal case files.

BACKGROUND

The present disclosure pertains to the broad and multi-faceted field of artificial intelligence (AI), specifically large language models (LLMs) and their applications in various domains. LLMs are a type of AI that have been trained on a large amount of text data and can generate human-like text based on a given input. They have found applications in a wide range of areas, including natural language processing, machine translation, text summarization, and more.

Within this broad field, the focus narrows to the application of LLMs in the legal domain. Legal case file analysis is a complex task that involves the examination of a multitude of voluminous documents. These documents often contain a wealth of information that is relevant to the case, but extracting this information and making sense of it can be a challenging task.

Traditionally, legal case file analysis has been a manual process, carried out by legal professionals who sift through the documents, extract relevant information, and piece together a narrative of the case. This process can be time-consuming and prone to errors, especially when dealing with large volumes of data. Furthermore, the information in these documents is often unstructured and can be difficult to search and analyze using traditional data processing techniques.

Another challenge in legal case file analysis is the presentation of the information. Once the relevant information has been extracted from the documents, it often has to be presented in a way that is easy to understand and interpret. This is typically done by creating a timeline of the case, which provides a chronological overview of the events and evidence. However, creating such a timeline manually can be a laborious and error-prone process.

The present disclosure is directed to overcoming one or more of these above-referenced challenges.

SUMMARY OF THE DISCLOSURE

According to certain aspects of the disclosure, systems, methods, and computer readable memory are disclosed for processing, analyzing, and visualizing legal case files.

In some cases, a computer-implemented method for processing and analyzing legal case files may include: receiving a set of legal case files; indexing the legal case files to generate indexed data; generating a timeline prompt based on the indexed data; processing the timeline prompt to generate a timeline response; and outputting the timeline response as an interactive timeline of the legal case files.

In some cases, a system for processing and analyzing legal case files may include: at least one memory configured to store instructions; and at least one processor configured to execute the instructions to perform operations. The operations may include: receive a set of legal case files; index the legal case files to generate indexed data; generate a timeline prompt based on the indexed data; process the timeline prompt to generate a timeline response; and output the timeline response as an interactive timeline of the legal case files.

In some cases, a non-transitory computer-readable medium may store instructions that, when executed by a processor, cause a computer to perform a method for processing and analyzing legal case files. The method may include: receiving a set of legal case files; indexing the legal case files to generate indexed data; generating a timeline prompt based on the indexed data; processing the timeline prompt to generate a timeline response; and outputting the timeline response as an interactive timeline of the legal case files.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIG. 4A shows a data flow diagram for the platform for generating crime timelines using large language models, according to aspects of the present disclosure.

FIG. 4B presents a data flow diagram for the platform for processing and analyzing case files using large language models for generating geospatial maps of timelines, according to aspects of the present disclosure.

FIG. 5B depicts a second user interface for a case file ingest workflow within the platform, according to aspects of the present disclosure.

FIG. 5C shows a third user interface of a document management within the platform, according to aspects of the present disclosure.

FIG. 8 depicts an example system that may execute techniques presented herein.

DETAILED DESCRIPTION

Figure 1:
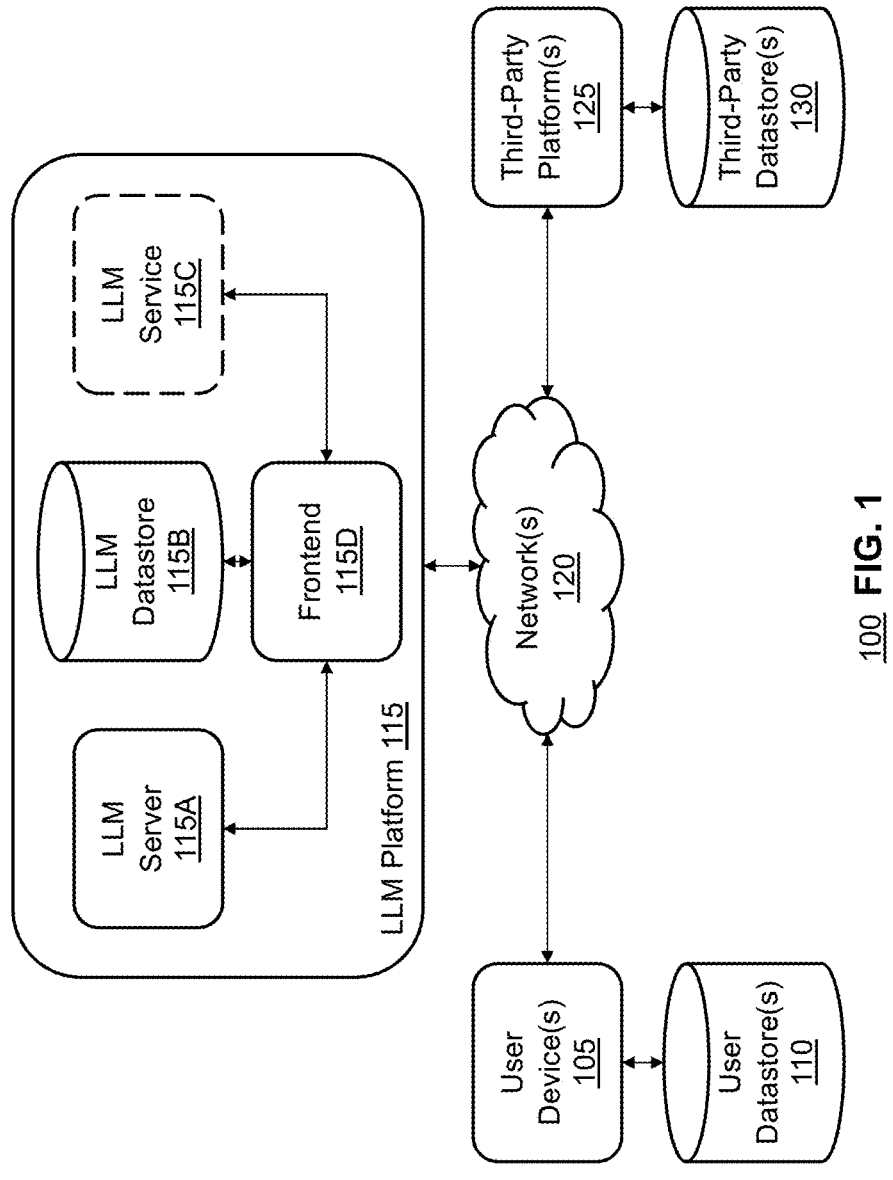
FIG. 1 illustrates an environment for processing and analyzing case files using a large language model platform, according to aspects of the present disclosure.

Given the above challenges, there is a clear demand for tools and techniques that can automate the process of legal case file analysis, extract relevant information from the documents, and present this information in a clear and concise manner. This is where the application of LLMs comes into play. By leveraging the capabilities of LLMs, it is possible to automate the process of legal case file analysis, thereby reducing the time and effort involved and increasing the accuracy and efficiency of the process.

The present disclosure relates to systems and methods for processing and analyzing legal case files using large language models (LLMs). In particular, the present disclosure may provide systems and methods for automatically generating an interactive timeline and geospatial representation of a legal case based on the data contained in the case files. This approach may facilitate a more efficient and comprehensive understanding of the case, thereby addressing the technical problem of manually sifting through large volumes of case files to extract relevant information.

More specifically, the systems and methods disclosed herein may involve receiving a set of legal case files, which can include a variety of data types such as police reports, ballistics reports, coroners reports, social media data, mobile phone forensics data, mobile phone business records, financial records, video footage, photos, facial recognition results, and audio recordings. These case files may be indexed to generate indexed data, which can then be used to generate a timeline prompt. The timeline prompt may be processed using a large language model to generate a timeline response, which can be output as an interactive timeline of the legal case.

In some aspects, the systems and methods may also involve generating a geospatial representation of the legal case based on the indexed data. This can provide a visual representation of the geographical locations associated with the events in the case, thereby enhancing the understanding of the case. Additionally, a narrative summary of the legal case may be generated based on the indexed data, providing a concise overview of the case. Furthermore, a chatbot interface may be provided for user interaction with the large language model, enabling users to ask questions and receive textual answers about the case.

The systems and methods disclosed herein may offer several technical benefits. For instance, they may automate the process of analyzing legal case files, thereby reducing the time and effort typically involved in manually reviewing these files. They may also provide a more comprehensive understanding of the case by presenting the information in an interactive timeline and geospatial representation. Furthermore, they may enable users to interact with the large language model via a chatbot interface, facilitating a more dynamic and interactive exploration of the case. These technical benefits may address the technical problems associated with the manual review and analysis of legal case files.

Thus, methods and systems of the present disclosure may be improvements to computer technology and/or processing, analyzing, and visualizing case files.

1. Processing and Analyzing Case Files

FIG. 1 depicts an environment 100 for processing and analyzing case files using a LLM platform 115. In some aspects, user device(s) 105 may connect to the LLM platform 115 through network(s) 120, allowing users to provide data from, for example, user datastore(s) 110. The LLM platform 115 may comprise an LLM server 115A, an LLM datastore 115B, an LLM service 115C, and a frontend interface 115D. The environment 100 may also include third-party platform(s) 125 that can interface with the LLM platform 115 via the network(s) 120, and third-party datastore(s) 130 (e.g., based on user access credentials of user device(s) 105) that provide additional data sources for the LLM platform 115 to process and analyze.

The user device(s) 105 may be any one or more of a broad range of electronic devices that can be utilized by users to interact with the system. These devices can include, but are not limited to, personal computers, laptops, tablets, smartphones, wearable devices, XR, VR, or AR devices, and any other device capable of connecting to a network and transmitting or receiving data. The user device(s) 105 can be equipped with various input and output mechanisms, such as keyboards, touchscreens, mice, voice recognition systems, display screens, speakers, and the like, to facilitate user interaction with the system. The user device(s) 105 can also include various types of software applications, such as web browsers, dedicated client applications, or mobile apps, to enable the user to access and use the system. Furthermore, the user device(s) 105 can operate on various operating systems and platforms, including Windows, MacOS, Linux, iOS, Android, and others. The user device(s) 105 can be owned and operated by individual users, or they can be part of a larger network of devices managed by an organization or entity.

In some cases, the user device(s) may store case file data on the user device(s). The user datastore(s) 110 represent a storage system or repository where case file data is stored. This data storage can be in part or in its totality, depending on the specific requirements and the nature of the case files. The case file data stored in the user datastore(s) 110 can include a wide range of information types, such as police reports, ballistics reports, coroners reports, social media data, mobile phone forensics data, mobile phone business records, financial records, video footage, photos, facial recognition results, and audio recordings. The user datastore(s) 110 can be managed by an individual user or by an organization. In the case of organizational management, the user datastore(s) 110 can be part of a larger network of datastores, facilitating efficient data management and access control. The user datastore(s) 110 can be implemented using various data storage technologies and can be located on-premises or in the cloud, depending on the specific requirements and preferences of the user or the managing organization.

The third-party platform(s) 125 represent external systems or services that can interface with the LLM platform 115 via network(s) 120. These platforms can provide additional data sources for the LLM platform 115 to process and analyze. They can include various types of systems or services, such as cloud storage services, social media platforms, mobile phone service providers, financial institutions, surveillance systems, and ballistics repositories, among others. These platforms can host a wide range of case file data, including police reports, ballistics reports, coroners reports, social media data, mobile phone forensics data, mobile phone business records, financial records, video footage, photos, facial recognition results, and audio recordings.

The third-party datastore(s) 130, which can be associated with the third-party platform(s) 125, represent storage systems or repositories where case file data is stored. These datastores can be managed by the third-party platforms and can be part of a larger network of datastores, facilitating efficient data management and access control. The third-party datastore(s) 130 can be implemented using various data storage technologies and can be located on-premises or in the cloud, depending on the specific requirements and preferences of the third-party platforms. The third-party datastore(s) 130 can host case file data based on user access credentials of user device(s) 105, thereby providing additional data sources for the LLM platform 115 to process and analyze.

The network(s) 120, as depicted in FIG. 1, represent the communication infrastructure that facilitates data transmission between the user device(s) 105, the LLM platform 115, and third-party platform(s) 125. The network(s) 120 can include any one or more types of wired or wireless networks such as local area networks (LAN), wide area networks (WAN), the internet, cellular networks, satellite networks, and other types of networks that enable data communication. The network(s) 120 can support various communication protocols, including but not limited to, TCP/IP, HTTP, HTTPS, FTP, SMTP, and others. The network(s) 120 enable the user device(s) 105 to access and interact with the LLM platform 115, and also allow the LLM platform 115 to access data from third-party datastore(s) 130 based on user access credentials of user device(s) 105. This connectivity provided by the network(s) 120 is integral to the functioning of the system, enabling the ingestion, processing, and analysis of legal case files.

In some cases, the set of legal case files may be received from a user device and/or a third-party platform. The operations of the system may include interacting with a plurality of sources including user devices and third-party platforms. The third-party platforms may include one or combinations of: publicly available data sets, social media platforms, mobile phone service providers, financial institutions, surveillance systems, and/or ballistics repositories. The system can interact with a plurality of sources including user devices and third-party platforms to receive the set of legal case files. The third-party platforms can include publicly available data sets, social media platforms, mobile phone service providers, financial institutions, surveillance systems, and/or ballistics repositories.

The LLM server 115A serves as a processing unit of the system for processing and analyzing legal case files. It is a part of the LLM platform 115, which also includes an LLM datastore 115B, an LLM service 115C, and a frontend interface 115D. The LLM server 115A is responsible for executing the main operations of the system, which include receiving a set of legal case files, indexing the received legal case files to generate indexed data, generating a timeline prompt based on the indexed data, processing the timeline prompt to generate a timeline response, and outputting the timeline response as an interactive timeline of the legal case.

The LLM server 115A has various modules (see FIG. 2), including an ingest module 202 for data acquisition, an index module 204 for data organization, a timeline module 206 for timeline construction, a mapping module 208 for spatial data processing, a summary module 210 for narrative summary generation, and a chat module 212 for facilitating user interaction with the system through a chatbot interface.

The LLM server 115A is designed to handle large volumes of data and perform complex computations efficiently. It leverages the capabilities of large language models (LLMs) to interpret and organize the timeline prompt, thereby generating a timeline response that can be output as an interactive timeline of the legal case. The LLM server 115A is also capable of generating a geospatial representation of the legal case based on the indexed data, providing a visual representation of the geographical locations associated with the events in the case.

Furthermore, the LLM server 115A is designed to be scalable and robust, capable of handling multiple concurrent requests and ensuring high availability and reliability of the system. It is also designed with security in mind, implementing various security measures to protect the data and ensure the privacy and confidentiality of the legal case files.

The LLM datastore 115B is a component of the LLM platform 115 that serves as a repository for storing and managing data related to the processing and analysis of legal case files. The LLM datastore 115B is designed to handle a wide range of data types, including but not limited to, police reports, ballistics reports, coroners reports, social media data, mobile phone forensics data, mobile phone business records, financial records, video footage, photos, facial recognition results, and audio recordings.

The LLM datastore 115B is responsible for storing the indexed data generated from the received legal case files. This indexed data forms the basis for generating timeline prompts and processing these prompts to generate timeline responses, which are then outputted as an interactive timeline of the legal case. The LLM datastore 115B ensures that this data is securely stored and readily accessible for processing by the LLM service 115C.

Furthermore, the LLM datastore 115B can be implemented using various data storage technologies and can be located on-premises or in the cloud, depending on the specific requirements and preferences of the system. The LLM datastore 115B is designed to facilitate efficient data management and access control, ensuring that the data is securely stored and readily accessible for processing and analysis.

The LLM service 115C is a component of the system designed to process and analyze legal case files. It leverages advanced artificial intelligence (AI) techniques, specifically large language models, to interpret, organize, and generate responses based on the data ingested into the system.

The LLM service 115C operates by receiving prompts generated based on the indexed data from the case files. These prompts can include system generated prompts (e.g., timeline prompt, map prompt, summary prompt, and the like) and/or user prompts that are queries or requests for information related to the case. The LLM service 115C processes these prompts using a large language model, which has been trained on a vast amount of text data and is capable of generating human-like text based on the given input. This allows the LLM service 115C to generate detailed and contextually relevant responses to the prompts, which can include generating an interactive timeline of the legal case, a geospatial representation of the case, a narrative summary of the case, or responses to user queries via a chatbot interface.

The LLM service 115C is designed to handle a wide range of data types, including text-based documents, portable document format (PDF) documents, audio recordings, video recordings, and images. This versatility allows the LLM service 115C to process and analyze a comprehensive set of legal case files, thereby providing a thorough and detailed understanding of the case.

Overall, the LLM service 115C plays a role in automating the process of legal case file analysis, reducing the time and effort typically involved in manually reviewing these files, and providing a more comprehensive understanding of the case by presenting the information in an interactive and accessible manner.

The frontend interface 115D serves as the primary point of interaction between the user (via user device(s) 105) and the LLM platform 115. It is designed to be user-friendly and intuitive, enabling users to easily navigate and interact with the system. The frontend interface 115D may be web-based or app-based, (e.g., on a mobile device, or hosted locally) allowing users to access the system from various devices, including personal computers, laptops, tablets, and smartphones.

The frontend interface 115D provides various functionalities to the user. It allows users to create a new case or select an existing case, and upload relevant case files either by dragging and dropping files or browsing files from the user's device. The interface also provides options for users to interact with the system through a chatbot interface, enabling them to ask questions and receive textual answers about the case.

Furthermore, the frontend interface 115D displays the results of the system's processing and analysis of the case files. This includes an interactive timeline of the legal case, a geospatial representation of the crime, and a narrative summary of the case. The timeline and geospatial representation are visual and interactive, allowing users to explore the sequence of events and the geographical context of the crime. The narrative summary provides a concise overview of the case in a textual format.

The frontend interface 115D is designed to facilitate efficient and comprehensive understanding of the case, addressing the technical problem of manually sifting through large volumes of case files to extract relevant information. By providing an intuitive and interactive interface, the frontend interface 115D enhances the user experience and increases the efficiency of legal case file analysis.

In some cases, the LLM service 115C or modules of the LLM server 115A can be locally hosted on user device(s) 105. This configuration allows for the processing and analyzing of legal case files directly on the user's device, without the data having to be transmitted over a network to a remote server. This can provide benefits in terms of data privacy and security, as the case files remain on the user's device and are not transmitted or stored elsewhere. It can also provide benefits in terms of performance, as the processing and analysis of the case files can be carried out locally on the user's device, reducing the latency associated with transmitting data over a network.

The LLM service 115C or modules of the LLM server 115A can be implemented as a software application or program that is installed on the user's device. The software application can be designed to run on various types of user devices, including personal computers, laptops, tablets, and smartphones, and can be compatible with various operating systems, such as Windows, MacOS, Linux, iOS, and Android.

When the LLM service 115C or modules of the LLM server 115A are locally hosted on the user's device, they can access the case files stored on the user's device or on a local network accessible by the user's device. The case files can be indexed to generate indexed data, and a timeline prompt can be generated based on the indexed data. The timeline prompt can then be processed to generate a timeline response, which can be output as an interactive timeline of the legal case.

In addition to processing and analyzing the case files, the LLM service 115C or modules of the LLM server 115A that are locally-hosted can also provide a chatbot interface for user interaction with the large language model. This allows the user to ask questions and receive textual answers about the case directly on their device.

Furthermore, the LLM service 115C or modules of the LLM server 115A that are locally-hosted can generate a geospatial representation of the legal case based on the indexed data, and can generate a narrative summary of the legal case based on the indexed data. These features provide the user with a comprehensive understanding of the case, presented in an interactive and accessible format directly on their device.

1.A. LLM Server

Figure 2:
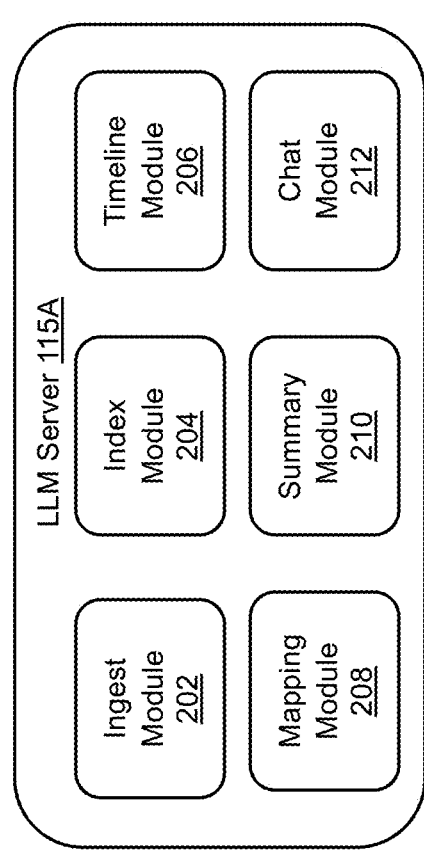
FIG. 2 depicts a block diagram of a server for processing and analyzing case files, according to aspects of the present disclosure.

FIG. 2 depicts a block diagram 200 of an LLM server 115A for processing and analyzing case files. The features of the block diagram 200 of FIG. 2 may apply to any of FIGS. 1, 3, 4A-4D, 5A-5I, and 6.

The LLM server 115A may serve as the core processing unit for various functional modules. These modules may include an ingest module 202, an index module 204, a timeline module 206, a mapping module 208, a summary module 210, and a chat module 212. Each module may be interconnected to allow data to flow within the system to facilitate comprehensive case analysis.

In some aspects, the ingest module 202 is responsible for the intake of case file data. The set of legal case files may include one or combinations of: police reports, ballistics reports, coroners reports, social media data, mobile phone forensics data, mobile phone business records, financial records, video footage, photos, facial recognition results, and/or audio recordings. The legal case files may include multi-model datasets of text-based documents, portable document format documents, audio recordings, video recordings, and/or images.

The case file data may be multi-model datasets (e.g., the platform can receive any or combinations) of different types of files. For instance, the multi-model datasets may include text-based documents, portable document format documents, audio recordings, video recordings, and/or images. In some cases, the multi-model datasets may include biometric data and/or identification data for objects.

The text or PDF based documents may include Word document (or other text formatting programs), text files, PDFs, data structures, and the like. Examples include police reports, ballistics reports, coroner reports, social media search warrant return data, open-source intelligence (OS-INT) collection, mobile phone forensics data, mobile phone business records, financial records.

Police reports may describe the incident or crime that occurred in text. Ballistics reports may describe the physical specimens recovered and their relation to each other and previously known weapons. Coroner reports may describe the cause of death of victims. Social media search warrant return data may include private messaging that is not available via open-source intelligence (OSINT) collection. OSINT collection may data collection from/on various social media platforms used by suspects, witnesses, victims, and others related to the crime. Mobile phone forensics data may include extractions of text messages, social media posts, website visit histories, geolocational history, call history, and various "over-the-top" apps databases available (e.g., only) on the mobile device. Mobile phone business records may include data from cell provider, such as ATT, Verizon, or T-Mobile. Financial records may include bank records and cash transfer applications, such as Venmo.

Audio, video, or image data may include the audio, video, or image files (e.g., MP4, JPEG, MP3), file metadata of the files (e.g., where it came from, date, device, etc.), and content metadata corresponding to content of the files themselves (e.g., timestamps, transcript of audio, description of video, description of image). Examples may include video from video sources, evidence photos and videos, body cam video, and audio recordings.

Video from video sources may include pan, tilt, zoom (PTZ) cameras, doorbell cameras, business surveillance systems, home security systems, vehicles (like Tesla). Evidence photos and videos from crime scenes, search warrants, and witnesses. Body cam video may include audio or video of body cams worn by police officers. Audio recordings may include audio from surveillance devices, phone calls (e.g., wiretap), or jail calls made by suspects while under arrest.

Biometric data may include voice, palm, fingerprint, facial, eye, or other biometric data to identify/verify a person. This data may be used in conjunction to match individuals to other evidence (e.g., fingerprints, face in video, voice in audio, etc.). For instance, facial recognition results on images in the case file may extract content metadata to enable the LLM to understand what a piece of multi-model content includes or refers to.

Identification data for objects may include serial numbers, vehicle identification numbers, unique or semi unique markings of objects (e.g., shoe print, ballistic markings of guns, etc.). For instance, the case files may include cross references to other cases using the ATF NIBIN system that tracks matching shell casings from various crime scenes.

The index module 204 may organize and index the data. In some cases, the indexing of the received legal case files includes generating a searchable database of the legal case files. This allows for efficient retrieval and analysis of the case file data. In some cases, the index module 204 may provide a retrieval augmented generation (RAG) index.

Retrieval Augmented Generation (RAG) is a method used in natural language processing that combines the benefits of pre-trained language models with the ability to retrieve and use relevant external knowledge. RAG is particularly useful in scenarios where a language model is expected to generate responses that require knowledge beyond what is contained in the input prompt.

In the context of the system described in this patent application, RAG is used to generate timeline prompts based on the indexed data from the legal case files. The RAG model retrieves relevant information from the indexed data and uses this information to generate a prompt (e.g., as context data). This prompt is then processed by a large language model to generate a timeline response, which is outputted as an interactive timeline of the legal case.

The RAG model operates by first encoding the input prompt and using the encoded representation to retrieve relevant documents or passages from a knowledge base. The retrieved documents are then combined with the input prompt to form a new, augmented prompt. This augmented prompt is then decoded by the language model to generate a response.

The use of RAG in this system allows for the generation of detailed and contextually relevant responses to the prompts, which can include generating an interactive timeline of the legal case, a geospatial representation of the case, a narrative summary of the case, or responses to user queries via a chatbot interface. Overall, the use of RAG in this system enhances the ability of the system to process and analyze legal case files, providing a more comprehensive understanding of the case by presenting the information in an interactive and accessible manner.

The timeline module 206 may be tasked with generating a chronological sequence of events. To generate a timeline prompt, the operations may include generating the timeline prompt based on parameters. The parameters may include chronological events, geographical locations, and involved individuals within the legal case files. This allows for a comprehensive and detailed timeline of the case to be created, aiding in the understanding and analysis of the case. The timeline module 206 may pass the timeline prompt the LLM service and receive a timeline response from the LLM service.

The timeline prompt may be structured to request a file including timeline data. The timeline data may include dates and times for events. The timeline prompt may also include requests for descriptions of events, individuals associated with the events, and media associated with the events. The timeline prompt may include a context portion and a request portion. The context portion may be populated with data from the index (e.g., RAG results). The request portion may include default structure (e.g., text asking for a timeline of events) and parameters. The parameters may be populated to shape a response of the LLM. In some cases, the file may be a JSON file.

In some cases, the LLM may be a generic LLM, such as one offered by Anthropic (e.g., Claude-v2/v2.1) or open-source development (e.g., llama model). In some cases, the LLM may be cloud-hosted and accessed via API.

The timeline module 206 may process the timeline response (e.g., the timeline data in JSON format) and generate user interfaces to display the timeline in an interactive manner. For instance, the timeline may be generated using a timeline generation tool.

The mapping module 208 may generate a geospatial representation of the crime. This provides a visual representation of the crime scene and the locations of various events related to the case, aiding in the understanding of the spatial context of the crime. The mapping module 208 may generate the geospatial representation of the crime by generating a map prompt, and passing the map prompt to the LLM to receive map response data.

To generate a map prompt, the operations may include generating the map prompt based on parameters. The parameters may include chronological events, geographical locations, and involved individuals within the legal case files. This allows for a comprehensive and detailed timeline of the case to be created, aiding in the understanding and analysis of the case.

The map prompt may be structured to request a file including map data. The map data may include dates and times for events and their locations (e.g., GPS, names of locations, addresses, and the like). The map prompt may also include requests for descriptions of events, individuals associated with the events, and media associated with the events. The map prompt may include a context portion and a request portion. The context portion may be populated with data from the index (e.g., RAG results) and/or the timeline data. The request portion may include default structure (e.g., text asking for geospatial descriptions of event) and parameters. The parameters may be populated to shape a response of the LLM. In some cases, the file may be a JSON file.

The mapping module 208 may process the map response (e.g., the map data in JSON format) and generate user interfaces to display the map data in an interactive manner. For instance, the map may be generated using a map generation tool.

The summary module 210 may produce a narrative summary of the case. This provides a concise and comprehensive overview of the case, aiding in the understanding and communication of the case details. The summary module 210 may generate the narrative summary of the case by generating a summary prompt, and passing the summary prompt to the LLM to receive summary response data.

To generate a summary prompt, the operations may include generating the summary prompt based on parameters. The parameters may include chronological events, geographical locations, and involved individuals within the legal case files. This allows for a comprehensive and detailed timeline of the case to be created, aiding in the understanding and analysis of the case.

The summary prompt may be structured to request a file including summary data. The summary data may include dates and times for events and their locations (e.g., GPS, names of locations, addresses, and the like). The summary prompt may also include requests for descriptions of events, individuals associated with the events, and media associated with the events. The summary prompt may include a context portion and a request portion. The context portion may be populated with data from the index (e.g., RAG results), the timeline data, and/or the map data. The request portion may include default structure (e.g., text asking for textual summation of events) and parameters. The parameters may be populated to shape a response of the LLM. In some cases, the file may be a JSON file.

The summary module 210 may process the summary response (e.g., the summary data in JSON format) and generate user interfaces to display the summary data in an interactive manner. For instance, the summary may be structured and include media using a presentation generation tool.

The chat module 212 may enable user interaction with the system through a chatbot interface. This allows users to ask questions and receive textual answers about the case, facilitating a more dynamic and interactive exploration of the case.

The chat module 212 may generate a response to a user input about the case by generating a chat prompt, and passing the chat prompt to the LLM to receive chat response data.

To generate a chat prompt, the operations may include generating the chat prompt based on user input and/or parameters. The parameters may include chronological events, geographical locations, and involved individuals within the legal case files. This allows for a comprehensive and detailed response, that is accurate, of the case, aiding in the understanding and analysis of the case.

The chat prompt may be structured to request a file including chat data. The chat data may include text, media, maps, etc. regarding dates and times for events and their locations (e.g., GPS, names of locations, addresses, and the like), individuals associated with the events, and points to specific files (or portions of files) for basis. The chat prompt may include a context portion and a request portion. The context portion may be populated with data from the index (e.g., RAG results), the timeline data, the map data, and/or the summary data. The request portion may include default structure (e.g., defined types of text asking for specific data may re-format a user's input) and parameters. The parameters may be populated to shape a response of the LLM. In some cases, the file may be a JSON file.

The chat module 212 may process the chat data response (e.g., the chat data in JSON format) and generate user interfaces to display the chat data in an interactive manner. For instance, the chat may be structured (e.g., showing chat history and the like, user inputs, and responsive text) and may include case files or media from case files, for instance by using a presentation generation tool.

1.B. LLM Service

Figure 3:
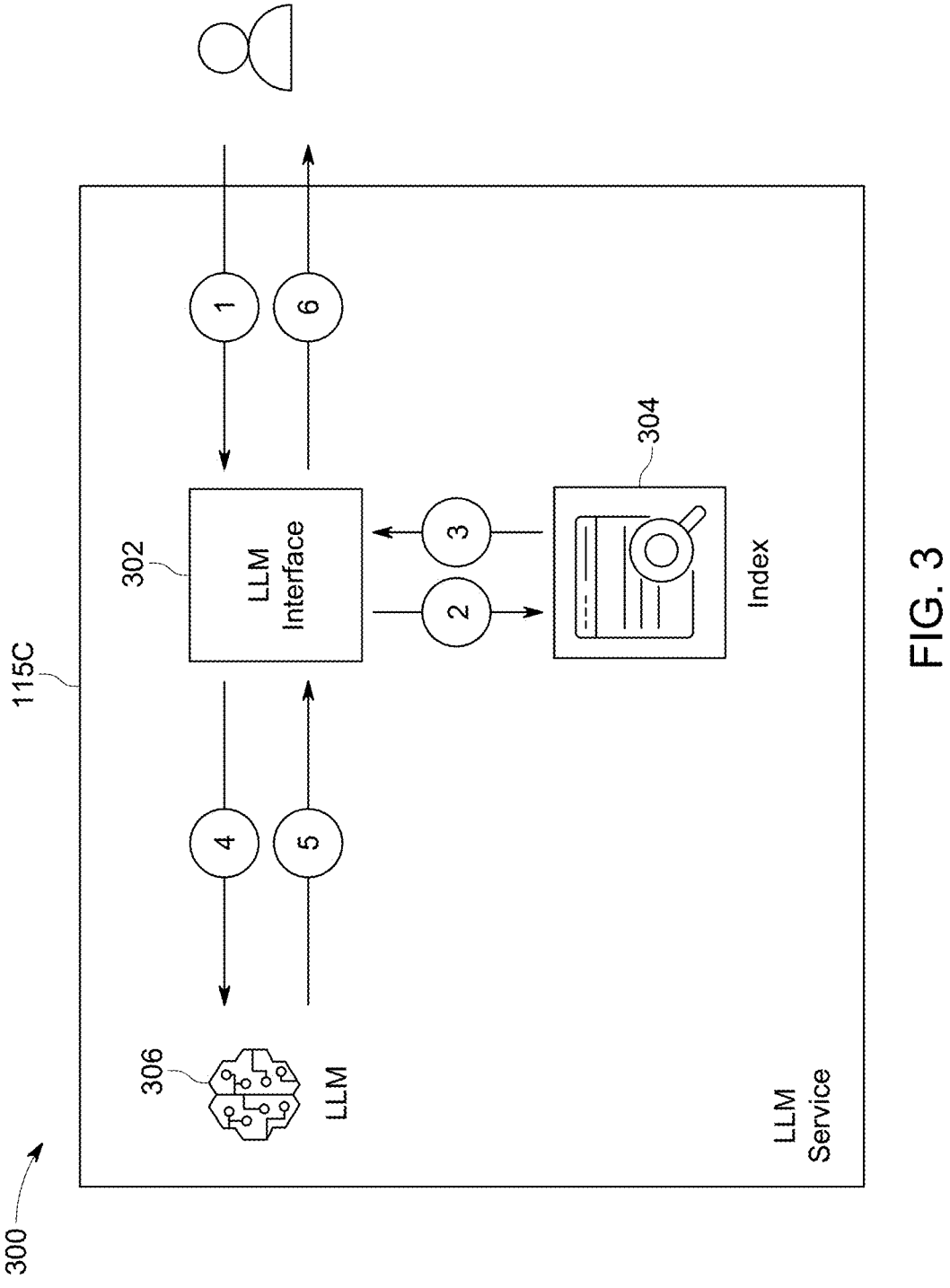
FIG. 3 presents a block diagram of a service for processing and analyzing case files using a large language model, according to aspects of the present disclosure.

FIG. 3 depicts a block diagram 300 of a LLM service 115C for processing and analyzing case files using an LLM. The features of the block diagram 300 of FIG. 3 may apply to any of FIGS. 1, 2, 4A-4D, 5A-5I, and 6.

The block diagram 300 illustrates the flow of information between a user interaction, an index component 304, an LLM interface component 302, and an LLM 306. In some aspects, user to LLM interface flows 1 and 6 may indicate the user's interaction with the LLM interface component 302. At user to LLM interface flow 1, this interaction may involve the user inputting queries or commands to the LLM interface component 302. At LLM interface to user flow 6, the LLM interface component 302 may provide responses or outputs from the LLM 306 (e.g., user interfaces or updates to a chat history).

In some cases, index to LLM interface flows 2 and 3 may represent the interaction between the index component 304 and the LLM interface component 302. The index component 304 may be responsible for organizing and indexing the data received from the user or third-party platforms. The index component 304 may receive, at LLM interface to index 2, a query, and determine relevant index entries in the index component 304. At index to LLM interface 3, the index component 304 may serve the relevant index entries (and any documents or files). Thus, the indexed data may be transmitted to the LLM interface component 302 for further processing.

In some aspects, LLM to LLM interface flows 4 and 5 may show the interaction of the LLM interface component 302 with the LLM 306. At LLM interface to LLM 4, the LLM interface component 302 may generate prompts (e.g., system design prompts or user-based prompts) based on the indexed data and transmit these prompts to the LLM 306. The LLM 306 may then process these prompts to generate responses. At LLM to LLM interface 5, the LLM 306 may transmit the responses to the LLM interface component 302. For instance, the response may include a timeline of the case, a geospatial representation of the crime, a narrative summary of the case, or answers to user queries.

In some cases, processing the timeline prompt to generate a timeline response may include using a large language model to interpret the timeline prompt and organize/generate a response. This may involve the large language model analyzing the prompt, identifying relevant information from the indexed data, and organizing this information into a coherent and chronological sequence of events. This process may facilitate a comprehensive and detailed analysis of the case, aiding in the understanding and communication of the case details.

The block diagram 300 provides a high-level overview of how the system facilitates the interaction between the user and the LLM to process and analyze legal case files. This overview may illustrate the flow of data and processing within the system, highlighting the roles of the user, the index component 304, the LLM interface component 302, and the LLM 306 in the processing and analysis of legal case files.

1.C. Data Flow Diagrams

FIGS. 4A-4D depict data flow diagrams for different aspects of the disclosure, including data ingest and various prompt sequences in response to user or system trigger conditions. The data flow diagrams of FIGS. 4A-4D may apply to any of FIGS. 1, 2, 3, 5A-5I, and 6.

Referring to FIG. 4A, a data flow diagram 400A is depicted for an automated system designed to generate crime timelines using large language models. The user device(s) 105 initiates the process, allowing users to interact with the system. Data is transferred from third-party platform(s) 125 and/or the user device(s) 105 to the ingest module 202, where it enters the system. In some aspects, the ingest module 202 may be responsible for the intake of case file data, which may include one or combinations of: police reports, ballistics reports, coroners reports, social media data, mobile phone forensics data, mobile phone business records, financial records, video footage, photos, facial recognition results, and/or audio recordings.

The index module 204 processes the data, determining relevant index data and updates. In some cases, the indexing of the received legal case files includes generating a searchable database of the legal case files. This allows for efficient retrieval and analysis of the case file data. The timeline module 206 generates a timeline prompt based on the indexed data, which is then processed to create a timeline response. In some cases, generating a timeline prompt based on the indexed data includes identifying chronological events within the legal case files. This allows for a comprehensive and detailed timeline of the case to be created, aiding in the understanding and analysis of the case.

The mapping module 208 may also be used to generate a geospatial representation of the timeline. This provides a visual representation of the crime scene and the locations of various events related to the case, aiding in the understanding of the spatial context of the crime. The summary module 210 compiles a case summary in prose text, while the chat module 212 allows users to interact with the system via a chatbot. The LLM service 115C processes the language model data.

The data flow diagram 400A includes operations O401 to O413, which represent software processes and data transmissions within the system, to generate an interactive timeline of a case file for a crime. The operations may start at first trigger operation 0401, where the ingest module 202 may wait for a trigger to start the process.

In user data retrieval operation 0402, the ingest module 202 may obtain user data (e.g., case file data) from user device(s) 105 and/or third-party platform(s) 125.

In user data storage operation 0403, the ingest module 202 may store the user data (e.g., in LLM datastore 115B).

In transmit user data operation 0404, the ingest module 202 may transmit the user data to the index module 204.

In index data determination operation 0405, the index module 204 may determine index data and updates to index (e.g., index component 304).

In transmit index data operation 0406, the index module 204 may transmit the index data and/or updates to the LLM service 115C, so that the index may be updated.

In second trigger operation 0407, the timeline module 206 may wait for another trigger to initiate timeline prompt generation operation 0408.

In timeline prompt generation operation 0408, the timeline module 206 may generate timeline prompt data.

In transmit timeline prompt operation 0409, the timeline module 206 may transmit the timeline prompt data to the LLM service 115C.

In timeline data processing operation 0410, the LLM service 115C may process the timeline prompt data to generate a timeline response data.

In transmit timeline response operation 0411, the LLM service 115C may transmit the timeline response data to the timeline module 206.

In timeline UI generation operation 0412, the timeline module 206 may process the timeline response data to generate timeline user interface(s).

In transmit UI and response data operation 0413, the timeline module 206 may transmit the timeline user interface(s) and/or the timeline response data to the user device(s) 105, which may display the timeline user interface(s) and/or other data of the timeline response data, and the like.

Referring to FIG. 4B, a data flow diagram 400B is depicted for processing and analyzing case files using large language models (LLMs) for generating geospatial maps of timelines. In some aspects, user device(s) 105 and third-party platform(s) 125 may be connected to an ingest module 202, which is responsible for data acquisition. The ingest module 202 may receive a set of legal case files, which may include one or combinations of: police reports, ballistics reports, coroners reports, social media data, mobile phone forensics data, mobile phone business records, financial records, video footage, photos, facial recognition results, and/or audio recordings.

The index module 204 may organize the ingested data, making it searchable and accessible for further processing. In some cases, the indexing of the received legal case files includes generating a searchable database of the legal case files. This allows for efficient retrieval and analysis of the case file data.

The timeline module 206 may utilize the indexed data to construct a chronological sequence of events. In some cases, generating a timeline prompt based on the indexed data includes identifying chronological events within the legal case files. This allows for a comprehensive and detailed timeline of the case to be created, aiding in the understanding and analysis of the case.

The mapping module 208 may generate a geospatial representation of the crime. In some aspects, the operations may include generating a geospatial representation of the legal case based on the indexed data and the timeline response. This provides a visual representation of the crime scene and the locations of various events related to the case, aiding in the understanding of the spatial context of the crime. The system can generate one or combinations of graphical representations, geospatial maps, interactive elements, and/or textual descriptions when outputting the timeline response as the interactive timeline of the legal case.

The summary module 210 may compile a narrative summary of the case, providing a concise and comprehensive overview of the case, aiding in the understanding and communication of the case details.

The chat module 212 may provide a chatbot interface for user interaction with the system. This allows users to ask questions and receive textual answers about the case, facilitating a more dynamic and interactive exploration of the case. The LLM service 115C may process the data and generate responses to prompts.

The data flow diagram 400B depicts operations 0414 to 0420, which represent software processes and data transmissions within the system, to generate geospatial maps of timelines. The operations may at third trigger operation O414, where the mapping module 208 may wait for a trigger to generate a geospatial map of a timeline.

In map prompt data operation O415, the mapping module 208 may generate map prompt data.

In transmit map prompt data operation O416, the mapping module 208 may transmit the map prompt data to the LLM service 115C.

In generate response data operation O417, the LLM service 115C may process the map prompt data to generate map response data.

In transmit map response data operation O418, the LLM service 115C may transmit the map response data to the mapping module 208.

In generate map UI operation O419, the mapping module 208 may process the map response data to generate map user interface(s).

In transmit UI operation O420, the mapping module 208 may transmit the map user interface(s) and/or map response data to the user device(s) 105 so that the user device(s) may display and allow users to interact with geospatial maps of timelines.

Figure 4C:
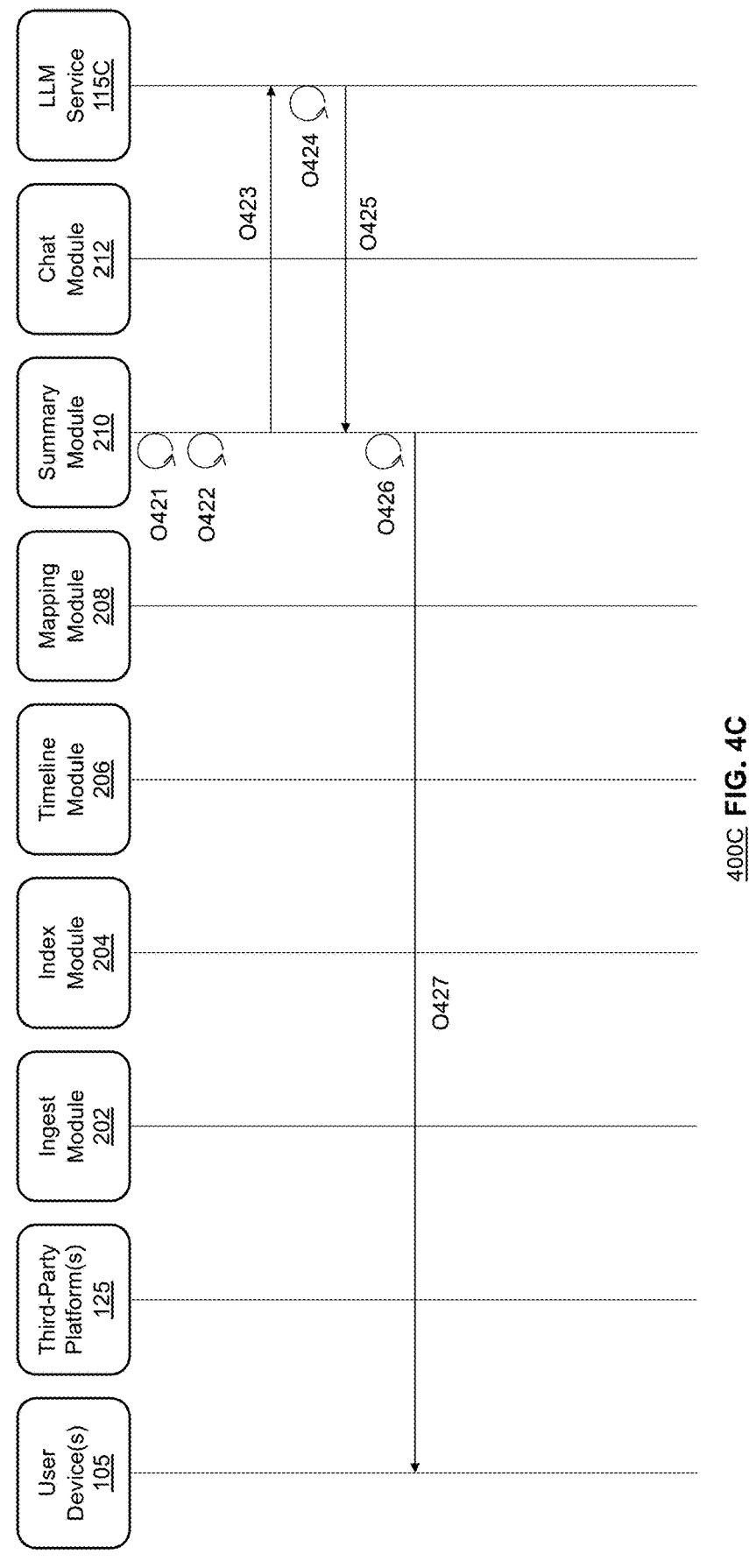
FIG. 4C depicts a data flow diagram for the platform for processing and analyzing case files using large language models for generating textual summaries of a crime, according to aspects of the present disclosure.

Referring to FIG. 4C, a data flow diagram 400C is depicted for a system for processing and analyzing case files using large language models (LLMs) for generating textual summaries of a crime. In some aspects, user device(s) 105 and third-party platform(s) 125 may be connected to an ingest module 202, which is responsible for data acquisition. The ingest module 202 may receive a set of legal case files, which may include one or combinations of: police reports, ballistics reports, coroners reports, social media data, mobile phone forensics data, mobile phone business records, financial records, video footage, photos, facial recognition results, and/or audio recordings.

The index module 204 may organize the ingested data, making it searchable and accessible for further processing. In some cases, the indexing of the received legal case files includes generating a searchable database of the legal case files. This allows for efficient retrieval and analysis of the case file data.

The timeline module 206 may utilize the indexed data to construct a chronological sequence of events. In some cases, generating a timeline prompt based on the indexed data includes identifying chronological events within the legal case files. This allows for a comprehensive and detailed timeline of the case to be created, aiding in the understanding and analysis of the case.

In some aspects, the mapping module 208 may generate a geospatial representation of the crime. This provides a visual representation of the crime scene and the locations of various events related to the case, aiding in the understanding of the spatial context of the crime. In some cases, the system may generate a geospatial representation of the legal case based on the indexed data and the timeline response. This provides a visual representation of the crime scene and the locations of various events related to the case, aiding in the understanding of the spatial context of the crime.

The summary module 210 may compile a narrative summary of the case, providing a concise and comprehensive overview of the case, aiding in the understanding and communication of the case details. The operations may include generating a narrative summary of the legal case based on the indexed data. This provides a concise and comprehensive overview of the case, aiding in the understanding and communication of the case details.

The chat module 212 may provide a chatbot interface for user interaction with the system. This allows users to ask questions and receive textual answers about the case, facilitating a more dynamic and interactive exploration of the case. The LLM service 115C may process the data and generate responses to user queries.

The data flow diagram 400C depicts operations 0421 to 0427, which represent software processes and data transmissions within the system, to generate textual summaries of crimes. The operations may start at a fourth trigger operation O421, where a summary module 210 may wait for a trigger to a generate summary.

In summary prompt data operation O422, the summary module 210 may generate a summary prompt data.

In transmit summary prompt data operation O423, the summary module 210 may transmit the summary prompt data to the LLM service 115C.

In process summary prompt data operation O424, the LLM service 115C may process the summary prompt data to generate summary response data.

In transmit summary response data operation O425, the LLM service 115C may transmit the process summary response data to the summary module 210.

In generate summary UI operation O426, the summary module 210 may process the summary response data and generate summary user interface(s).

In transmit UI and response data operation O427, the summary module 210 may transmit the summary user interface(s) and/or the summary response data, and the like to the user device(s) 105, to thereby be rendered on a display of the user device(s) 105.

Thus, the platform may collectively enable the system to provide comprehensive case analysis and interactive user engagement.

Figure 4D:
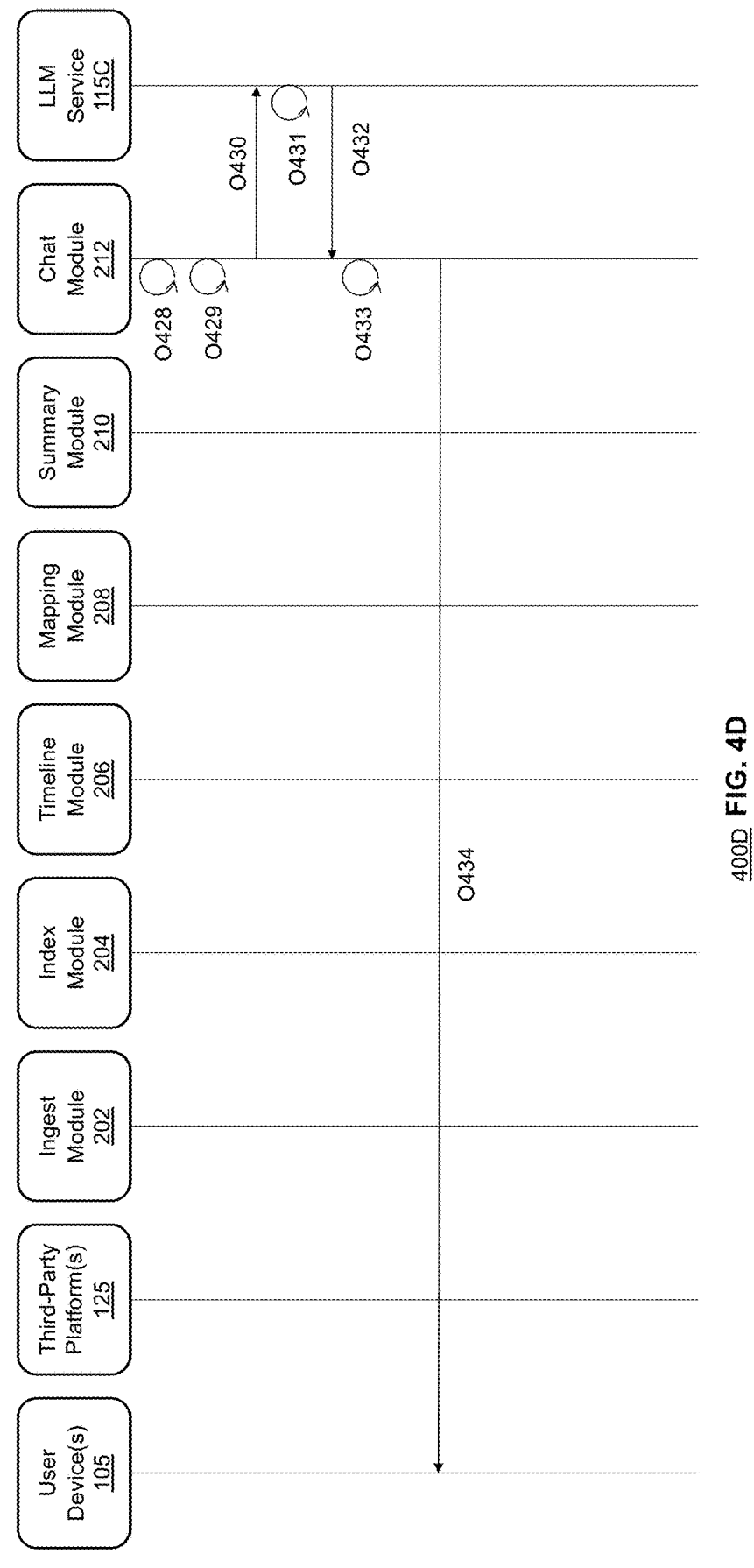
FIG. 4D illustrates a data flow diagram for the platform for processing and analyzing case files using large language models for chatbot responses based on case files, according to aspects of the present disclosure.

Referring to FIG. 4D, a data flow diagram 400D is depicted for the platform for processing and analyzing case files using large language models (LLMs) to generate chatbot responses based on case files. In some aspects, user device(s) 105 and third-party platform(s) 125 may be connected to an ingest module 202, which is responsible for data acquisition. The ingest module 202 may receive a set of legal case files, which may include one or combinations of: police reports, ballistics reports, coroners reports, social media data, mobile phone forensics data, mobile phone business records, financial records, video footage, photos, facial recognition results, and/or audio recordings.

The index module 204 may organize the ingested data, making it searchable and accessible for further processing. In some cases, the indexing of the received legal case files includes generating a searchable database of the legal case files. This allows for efficient retrieval and analysis of the case file data.

The timeline module 206 may utilize the indexed data to construct a chronological sequence of events. In some cases, generating a timeline prompt based on the indexed data includes identifying chronological events within the legal case files. This allows for a comprehensive and detailed timeline of the case to be created, aiding in the understanding and analysis of the case.

In some aspects, the mapping module 208 may generate a geospatial representation of the crime. This provides a visual representation of the crime scene and the locations of various events related to the case, aiding in the understanding of the spatial context of the crime. In some cases, the system may generate a geospatial representation of the legal case based on the indexed data and the timeline response. This provides a visual representation of the crime scene and the locations of various events related to the case, aiding in the understanding of the spatial context of the crime.

The summary module 210 may compile a narrative summary of the case, providing a concise and comprehensive overview of the case, aiding in the understanding and communication of the case details. In some aspects, the system can generate a narrative summary of the legal case based on the indexed data. This provides a concise and comprehensive overview of the case, aiding in the understanding and communication of the case details.

The chat module 212 may provide a chatbot interface for user interaction with the system. This allows users to ask questions and receive textual answers about the case, facilitating a more dynamic and interactive exploration of the case. The LLM service 115C may process the data and generate responses to prompts.

The data flow diagram 400D depicts operations 0428 to 0434, which represent software processes and data transmissions within the system, generating chatbot-style responses relating to case files and crimes. The operations may start at fifth trigger operation O428, where the chat module 212 may wait for a user interaction, which triggers a chat prompt generation.

In generate chat prompt operation O429, the chat module 212 may generate chat prompt data.

In transmit chat prompt data operation O430, the chat module 212 may transmit the chat prompt data to the LLM service 115C.

In process chat data operation O431, the LLM service 115C may process the chat prompt data to generate chat response data.

In transmit chat response operation O432, the LLM service 115C may transmit the chat response data to the chat module 212.

In generate chat UI operation O433, the chat module 212 may process the chat response data to generate chat user interface(s).

In transmit UI response operation O434, the chat module 212 may transmit the chat user interfaces and/or the chat response data to the user device(s) 105, to thereby update a display for the user. Thus, this sequence of operations enables the system to provide comprehensive case analysis and interactive user engagement, facilitating a more dynamic and interactive exploration of the case.

1.D. User Interfaces

FIGS. 5A-5I depict user interfaces of the platform. The user interfaces of FIGS. 5A-5I may apply to any of FIGS. 1, 2, 3, 4A-4D, and 6.

Figure 5A:
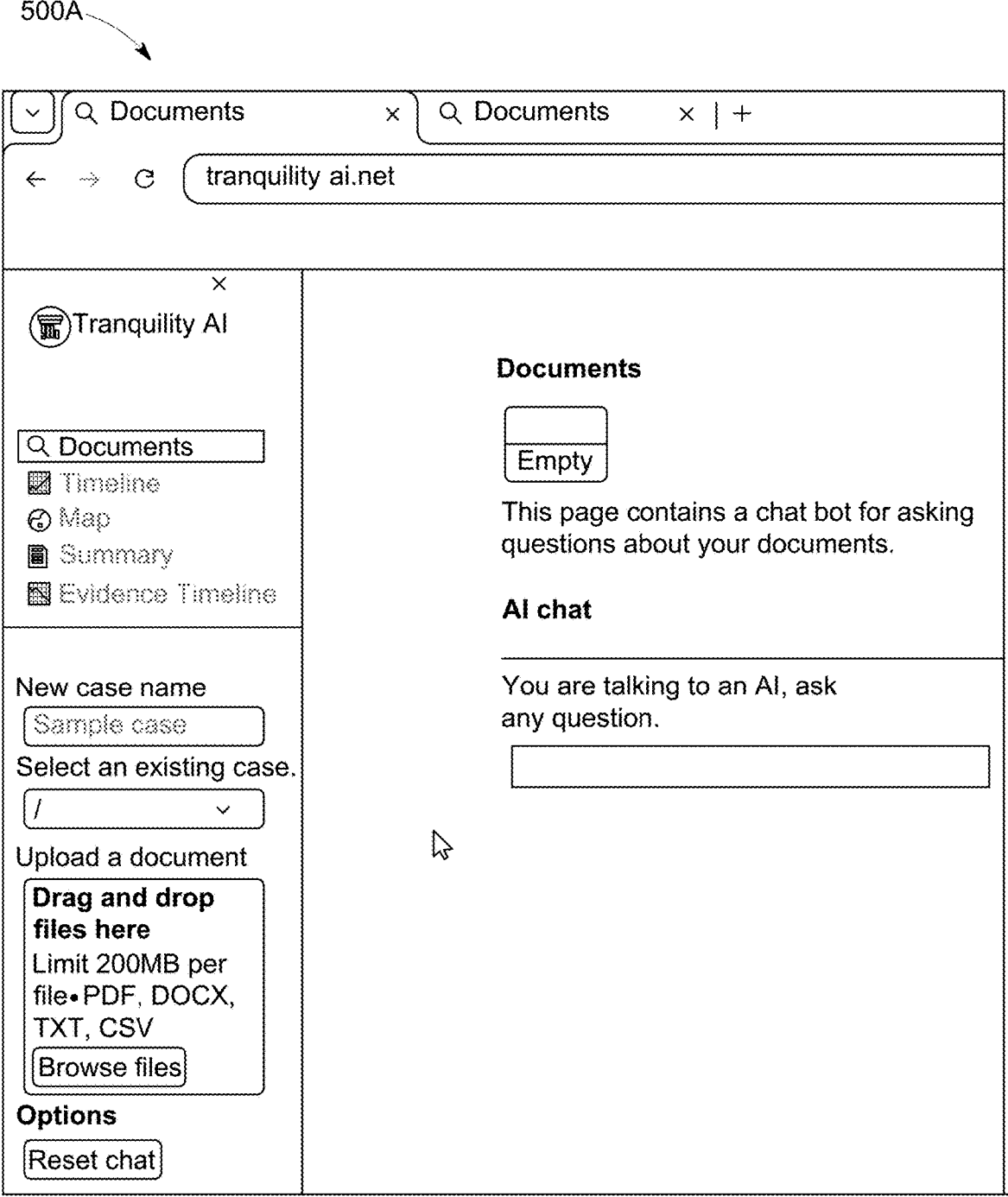
FIG. 5A presents a first user interface for a chat interface within the platform, according to aspects of the present disclosure.

Referring to FIG. 5A, a first user interface 500A is depicted for a chat interface within the platform. In some aspects, the first user interface 500A may be presented as a dedicated section on a user interface. The first user interface 500A may facilitate interaction between the user and LLM based on case files of the user. The first user interface 500A may include a text box where users can type and submit their questions to the platform. In some cases, the platform is designed to provide relevant information or answers based on the documents and data associated with a particular case. The layout of the first user interface 500A provides a streamlined and user-friendly environment for users to engage with the platform to gain insights or assistance related to their case files.

Referring to FIG. 5B, a second user interface 500B is depicted for case file ingest workflow within the platform. The second user interface 500B illustrates a file selection dialog box where a user can navigate through their file system to locate and select various types of documents related to a case. In some aspects, these documents may include one or combinations of: police reports, ballistics reports, coroners reports, social media data, mobile phone forensics data, mobile phone business records, financial records, video footage, photos, facial recognition results, and audio recordings.

The interface provides options for the user to either select an existing case from a dropdown menu labeled "Select an existing case" or to create a new case. In either event, the user may upload a document by dragging and dropping files into the designated area (e.g., to add new files to an existing case or to add files to a newly created case). In some cases, the second user interface 500B may include a note indicating the file size limit, providing users with information about the maximum size of files that can be uploaded, preferred files, and the like. This feature may help users manage their file uploads and ensure that they do not exceed the system's capacity or incur data charges (to the platform or from third-party services).

Additionally, the second user interface 500B includes an "Options" section with a "Reset Chat" button, for a chatbot feature within the platform. In some aspects, this chatbot feature may facilitate user interaction with the platform, allowing users to ask questions and receive textual answers about the case. This feature may provide a more dynamic and interactive exploration of the case, aiding users in understanding and analyzing the case files.

Referring to FIG. 5C, a third user interface 500C of a document management workflow is depicted for the platform. In some aspects, the third user interface 500C may include a navigation bar with options for "Documents," "Timeline," "Map," "Summary," and "Evidence Timeline." These options may provide users with quick access to various components and functionalities of the platform, allowing them to navigate between different sections of the platform with case.

Below the navigation bar, there may be a section for creating a new case or selecting an existing case. This feature may allow users to manage their cases efficiently, enabling them to either start a new case by inputting relevant case file data or continue working on an existing case by selecting it from a list of previously created cases.

Following the case selection section, there may be an option to upload a document by dragging and dropping files or browsing files from the user's device. This feature may facilitate the intake of case file data, allowing users to easily add new documents to a case. The documents may include a variety of file types, such as text documents, PDFs, images, audio files, and video files, among others.

The main area of the third user interface 500C may display a list of documents related to a case. The list of documents may include titles of documents, metadata of documents, and the like. For instance, the list of files depicted may read "Ballistics_Report.txt," "Coroners_Report.txt," "Detectives_Report.txt," "Instagram_Net Business Records.pdf," "Ring Doorbell Camera Video.txt," and "Tmobile Cell Phone Tower Hits.csv." This list may provide users with an overview of the documents associated with a case, allowing them to quickly access and review specific documents as desired.

At the bottom of the third user interface 500C, there may be a chatbot feature labeled "AI Chat," where users can interact with an AI to ask questions about their documents. In some cases, this chatbot feature may facilitate user interaction with the platform, allowing users to ask questions and receive textual answers about the case. This feature may provide a more dynamic and interactive exploration of the case, aiding users in understanding and analyzing the case files.

Figure 5D:
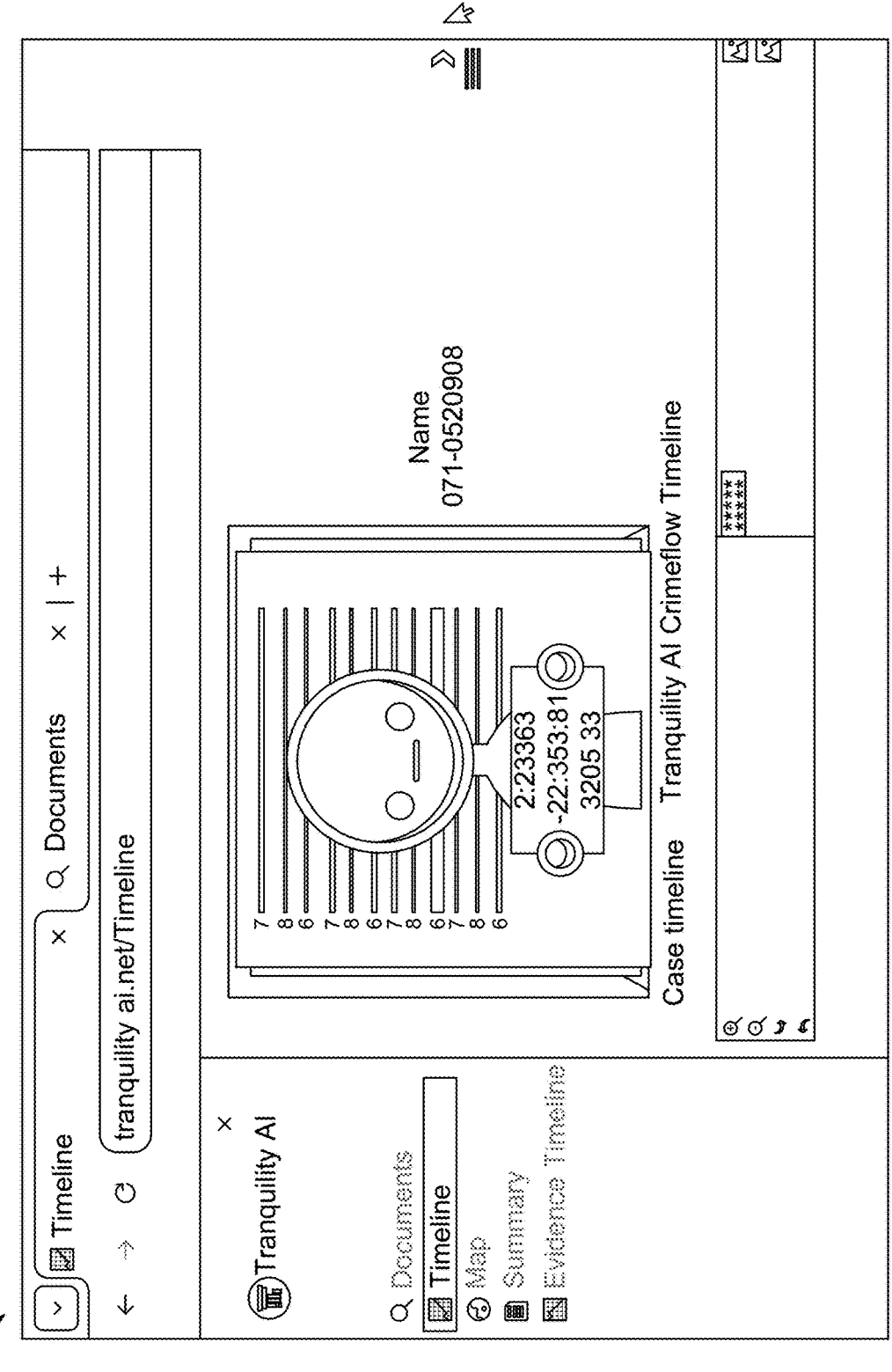
FIG. 5D illustrates a fourth user interface displaying an automatically generated and interactive timeline of a case file for a crime, according to aspects of the present disclosure.

Referring to FIG. 5D, a fourth user interface 500D is depicted, which displays an automatically generated and interactive timeline of a case file for a crime. In some aspects, the timeline may start with a first graphical feature, such as an individual's photograph and identification information. This graphical feature may provide a visual representation of the individual involved in the case, aiding in the understanding and analysis of the case.

The fourth user interface 500D may include navigational elements that allow users to access various functionalities such as documents, timeline, map, summary, and evidence timeline. These navigational elements may provide users with quick access to different sections of the platform, allowing them to navigate between different components and functionalities with ease. In some cases, these navigational elements may be presented as buttons, links, or tabs on the user interface.

In some aspects, the fourth user interface 500D may display the timeline of the case in an interactive format. This interactive timeline may allow users to navigate through the timeline, view details of specific events, and interact with the timeline in various ways. For instance, users may be able to click on specific events in the timeline to view more detailed information, zoom in or out to view different time scales, or scroll through the timeline to view different periods of time. This interactive timeline may provide a comprehensive and detailed overview of the case, aiding in the understanding and analysis of the case.

In some cases, outputting the timeline response as an interactive timeline of the legal case may include displaying the timeline on the fourth user interface 500D. This may involve generating a graphical representation of the timeline and displaying it on the user interface. The graphical representation may include various graphical elements representing different events in the timeline, such as icons, lines, bars, or other visual indicators. The graphical representation may also include textual descriptions or labels associated with the graphical elements, providing additional information about the events represented in the timeline. In some cases, the graphical representation may include one or more media elements (e.g., maps, audio, video, images, and the like). These feature may facilitate a more dynamic and interactive exploration of the case, aiding users in understanding and analyzing the case files.

Figure 5E:
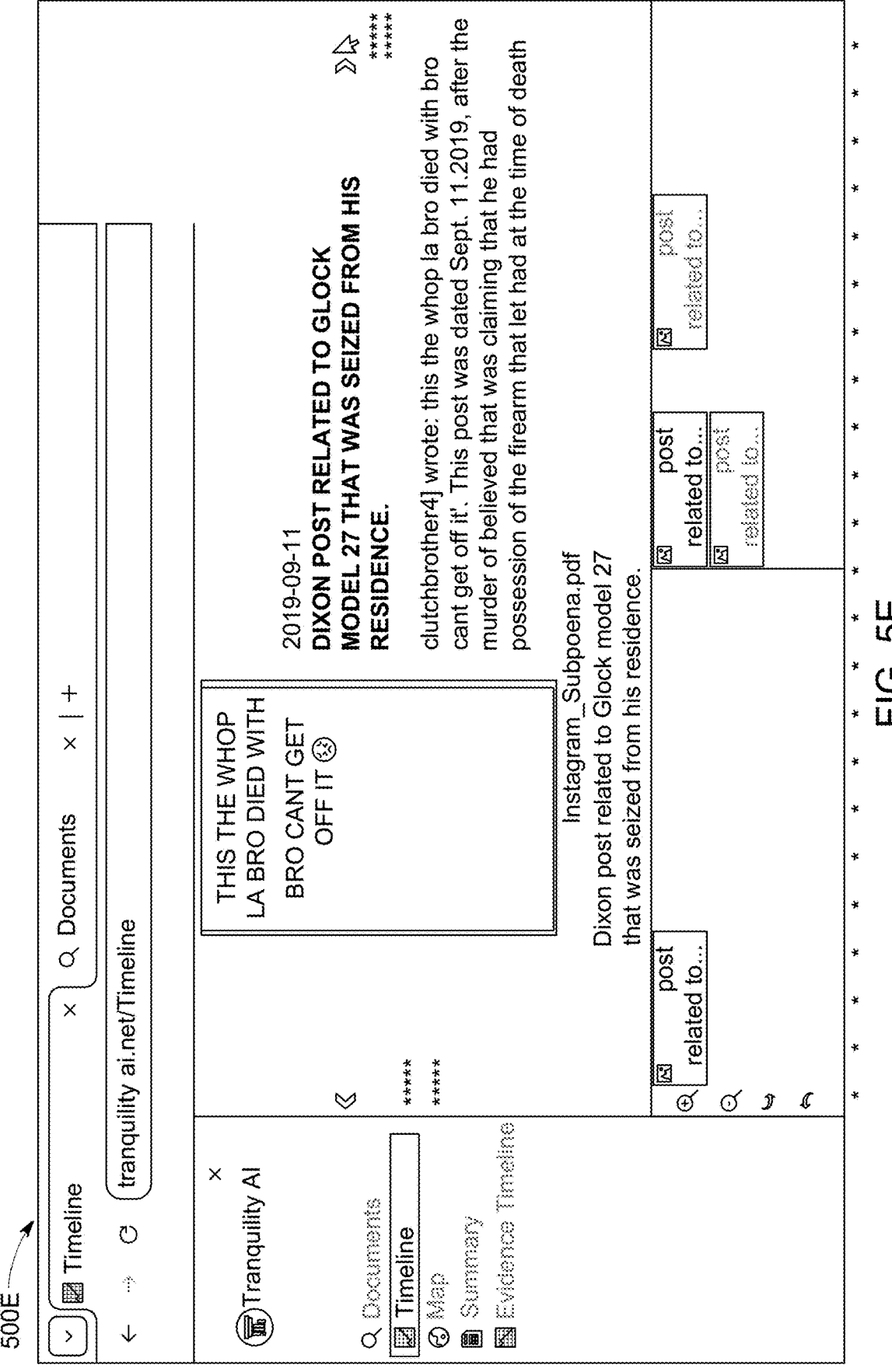
FIG. 5E presents a fifth user interface that depicts a different portion of the timeline for an evidence timeline related to a legal case, according to aspects of the present disclosure.

Referring to FIG. 5E, a fifth user interface 500E is depicted that presents a different portion of the timeline, specifically a section related to social media evidence, for an evidence timeline associated with a legal case. In some aspects, the fifth user interface 500E may include a social media post from a social media account, which is highlighted as a noteworthy piece of evidence within the timeline. For instance, the post may contain text that is believed to be a claim of possession of a firearm related to a crime. This text may be extracted from the social media post and analyzed to provide insights into the case.

In some cases, the interface may provide navigational elements 506, allowing users to move through different points in the timeline and examine various pieces of evidence in detail. These navigational elements may include buttons, sliders, scroll bars, or other interactive elements that allow users to navigate the timeline. Users may be able to click on specific events in the timeline to view more detailed information, zoom in or out to view different time scales, or scroll through the timeline to view different periods of time.

The evidence timeline, as displayed on the fifth user interface 500E, is part of the platform, to thereby to organize and present case-related data in a coherent and interactive format. This system may aid legal professionals in understanding the sequence of events and the relationships between different pieces of evidence. By presenting the evidence in a timeline format, the system may provide a visual and chronological representation of the case, facilitating a more comprehensive and intuitive understanding of the case.

Figure 5F:
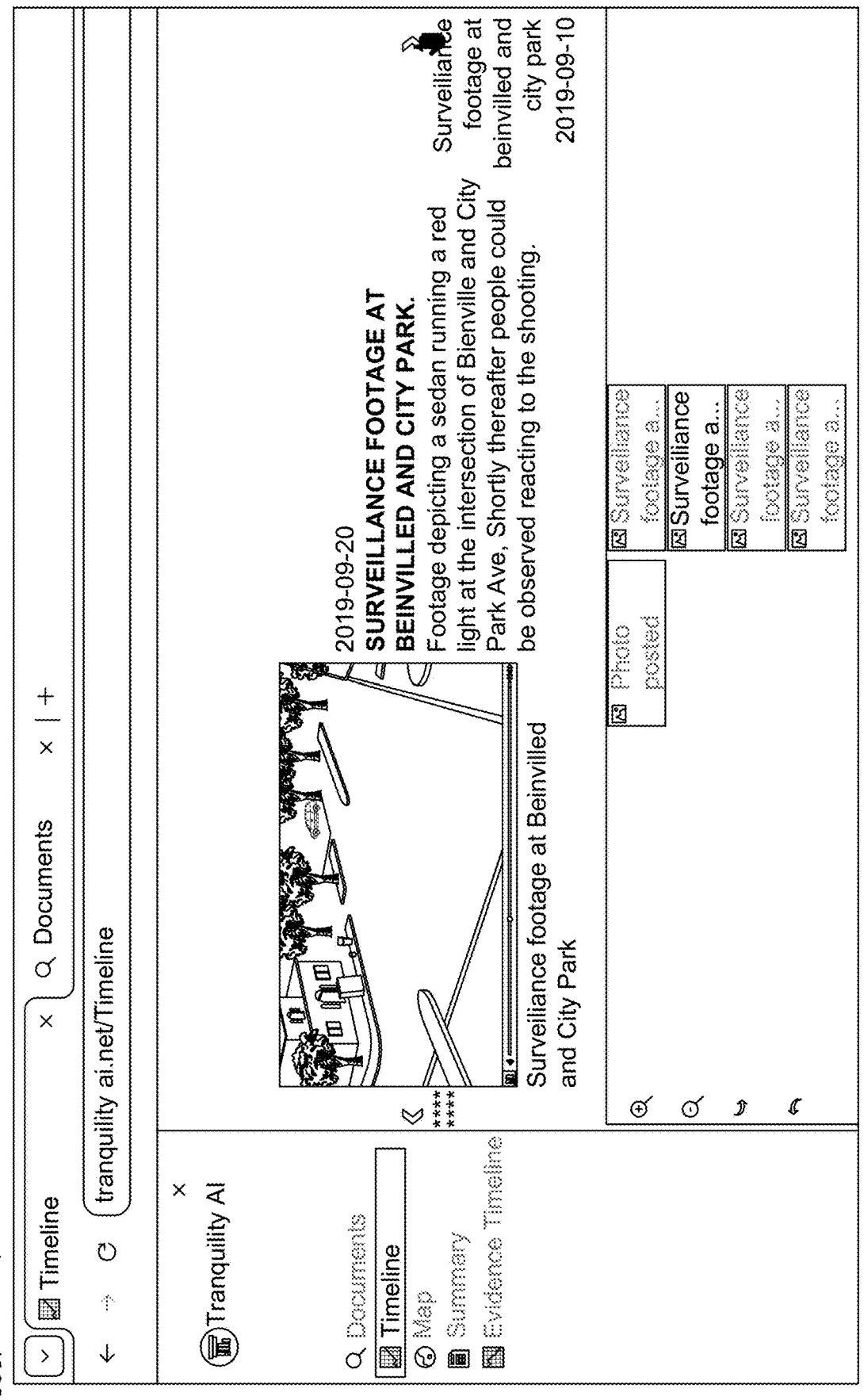
FIG. 5F depicts a sixth user interface that depicts a different portion of the timeline for an evidence timeline related to a legal case, according to aspects of the present disclosure.

Referring to FIG. 5F, a sixth user interface 500F is depicted that presents a different portion of the timeline, specifically a section related to surveillance footage evidence, for an evidence timeline associated with a legal case. In some aspects, the sixth user interface 500F may include a video playback area where surveillance footage is displayed. This footage may be part of the evidence related to the case, providing visual information that can aid in the understanding and analysis of the case.

In some cases, the sixth user interface 500F may include a descriptive text overlay that provides context for the video content. This text overlay may indicate specific details about the footage, such as the event captured in the footage, the location of the event, and the date and time of the recording. For instance, the text overlay may indicate that the footage captures a specific event, such as a sedan running a red light at a particular intersection. This information may provide additional context for the video footage, aiding in the understanding and interpretation of the evidence.

Additional interface elements may be visible on the sixth user interface 500F, allowing users to interact with the software application and access different functionalities. These functionalities may include accessing different documents, viewing the timeline, map, summary, and evidence timeline related to the case being investigated. These interface elements may provide users with quick access to different sections of the application, allowing them to navigate between different components and functionalities with ease.

In some aspects, the sixth user interface 500F may be part of the platform, to thereby to organize and present case-related data in a coherent and interactive format. This platform may aid legal professionals in understanding the sequence of events and the relationships between different pieces of evidence. By presenting the evidence in a timeline format, the platform may provide a visual and chronological representation of the case, facilitating a more comprehensive and intuitive understanding of the case.

Figure 5G:
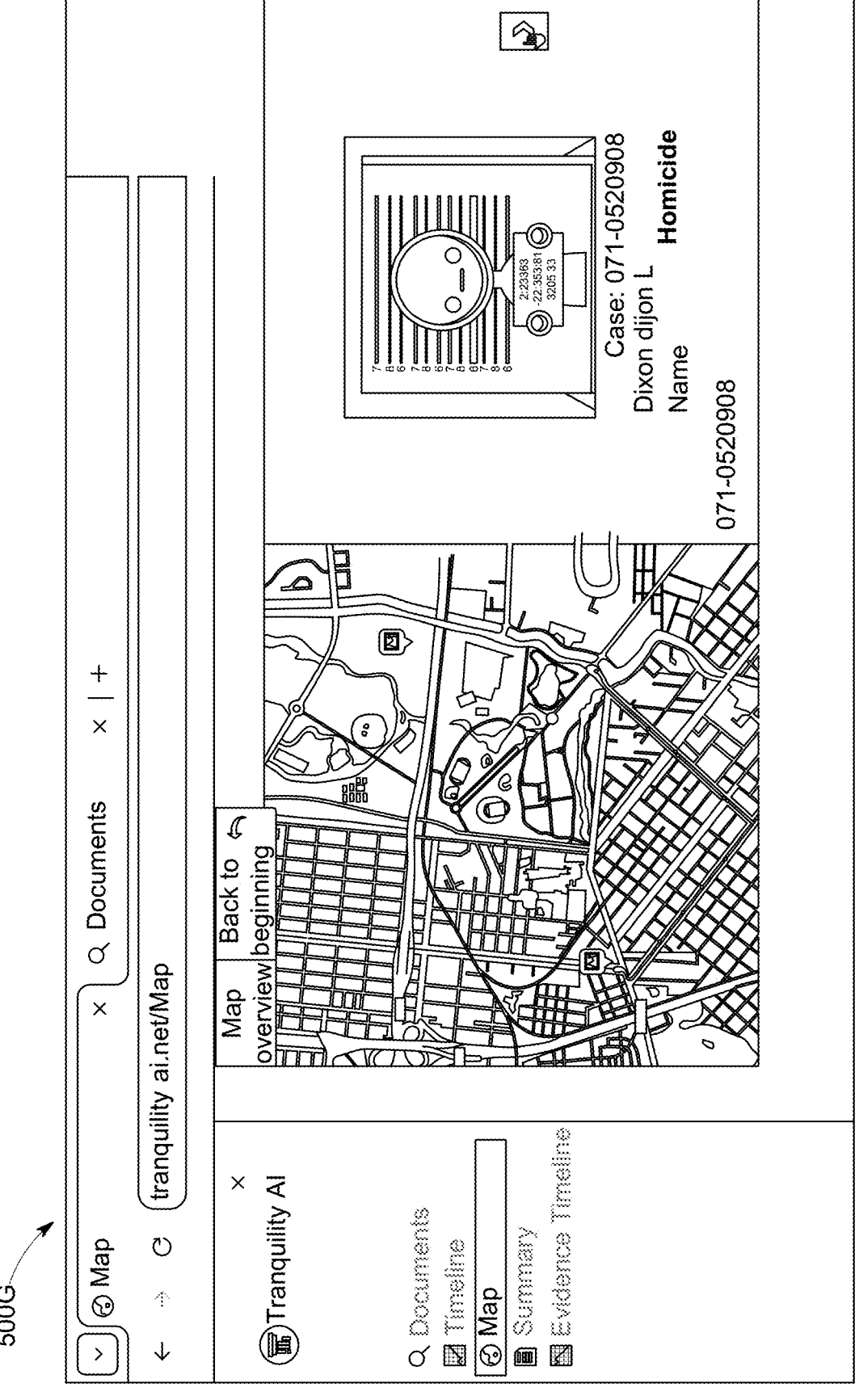
FIG. 5G shows a seventh user interface that depicts a geospatial map within the platform, according to aspects of the present disclosure.

Referring to FIG. 5G, a seventh user interface 500G is depicted that presents a geospatial map. In some aspects, the seventh user interface 500G may include a geospatial analysis tool that displays a map view related to evidence and timeline of a case file for a crime. The map section of the seventh user interface 500G may display a detailed map with various geographical features and street layouts, providing a visual representation of the spatial context of the crime. This map may serve as a visual aid for users to understand the spatial context of the crime, aiding in the understanding of the spatial relationships between different events and locations related to the case.

In some cases, the seventh user interface 500G may also include a case information section that provides details about the case, including a case name and a case number. This case information section may provide quick reference to the specific case being analyzed, allowing users to easily access and review specific details about the case.

The seventh user interface 500G may also offer various interactive elements such as a search bar, navigation buttons, and additional tools for document management, timeline viewing, and summary generation. These interactive elements, as indicated by the icons on the left side of the GUI, may provide users with quick access to different functionalities of the system, allowing them to navigate between different components and functionalities with ease.

In some aspects, the platform may generate a geospatial representation of the legal case based on the indexed data. This geospatial representation may provide a visual representation of the crime scene and the locations of various events related to the case, aiding in the understanding of the spatial context of the crime. In other cases, the system may generate a geospatial representation of the legal case based on both the indexed data and the timeline response. This combined representation may provide a more comprehensive view of the spatial context of the crime, incorporating both the spatial data from the indexed data and the chronological data from the timeline response.

The seventh user interface 500G may also include interactive elements to zoom in and navigate a timeline of the evidence/crime on the map. These interactive elements may allow users to explore the timeline in more detail, zooming in to view specific events or periods of time, or navigating through the timeline to view different periods of time. This feature may facilitate a more dynamic and interactive exploration of the case, aiding users in understanding and analyzing the case files.

Figure 5H:
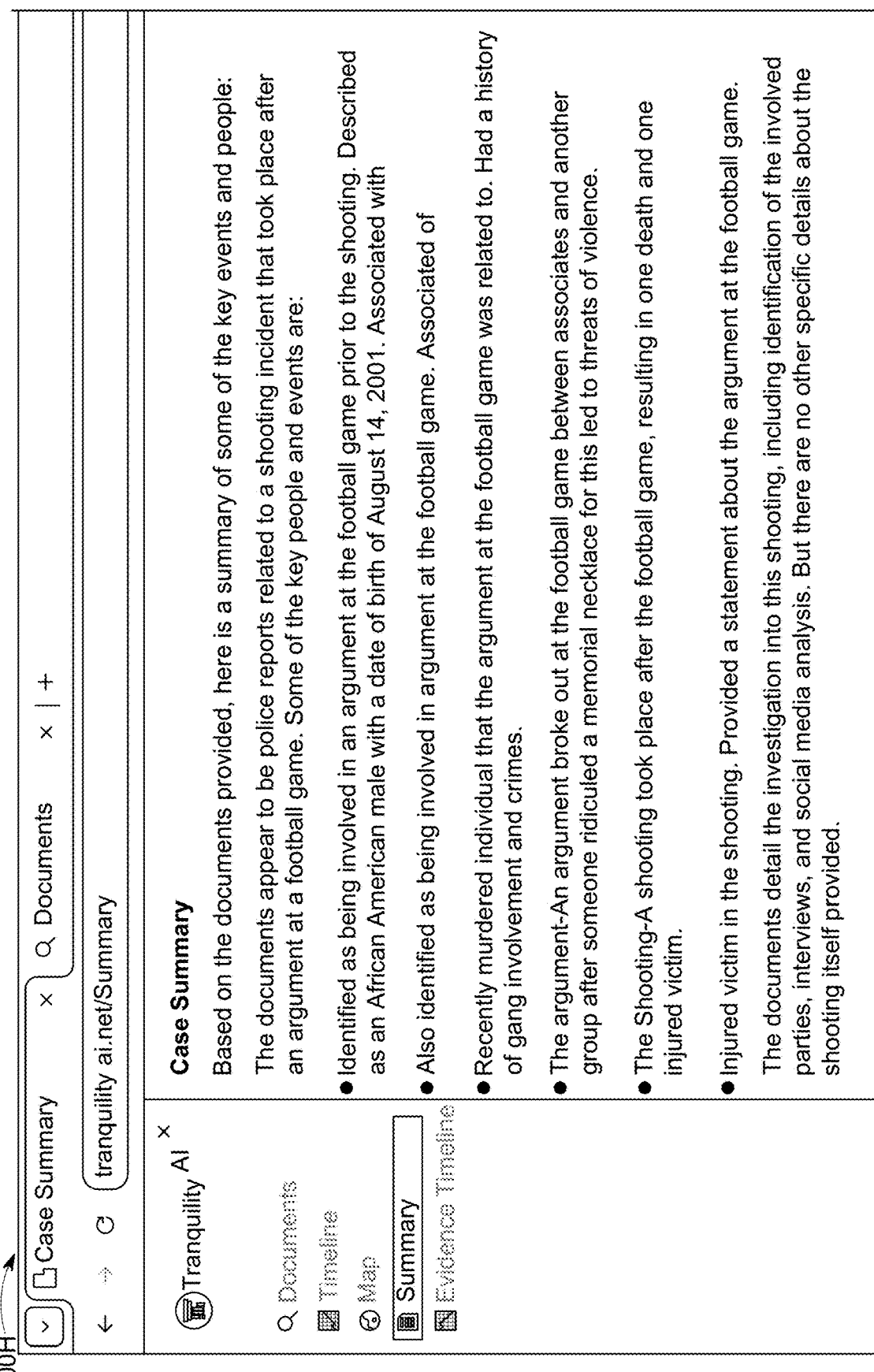
FIG. 5H illustrates an eighth user interface that depicts a textual case summary within the platform, according to aspects of the present disclosure.

Referring to FIG. 5H, an eighth user interface 500H is depicted that presents a textual case summary. The eighth user interface 500H may include a case summary presented in text format. The eighth user interface 500H may include a navigation sidebar on the left with options for Documents, Timeline, Map, Summary, and Evidence Timeline. These options may indicate the various components and functionalities available within the platform, providing users with quick access to different sections of the application and allowing them to navigate between different components and functionalities with ease.

In some aspects, the main panel of the eighth user interface 500H may display the case summary, which provides a concise overview of the case. The case summary may include a list of the names of individuals involved in the case, such as suspect 1 and suspect 2, and descriptions of their roles and associations with the incident. The summary may also discuss victims, such as a murder victim named victim 1, and provide details about the crime, such as an argument, a shooting, and an injured victim named victim 2. The summary may note that the documents detail the investigation into the shooting, including identification of the involved parties, interviews, and social media analysis.

In some cases, the system may generate a narrative summary of the legal case based on the indexed data. This narrative summary may provide a concise and comprehensive overview of the case, aiding in the understanding and communication of the case details. The narrative summary may be generated based on the indexed data, which may include one or combinations of: police reports, ballistics reports, coroners reports, social media data, mobile phone forensics data, mobile phone business records, financial records, video footage, photos, facial recognition results, and/or audio recordings. This feature may facilitate a more dynamic and interactive exploration of the case, aiding users in understanding and analyzing the case files.

The eighth user interface 500H is designed to organize and present case-related information in a structured and accessible manner, facilitating the review and analysis of legal cases. By presenting the case summary in a clear and concise format, the eighth user interface 500H may aid legal professionals in understanding the sequence of events and the relationships between different pieces of evidence. This feature may provide a more dynamic and interactive exploration of the case, aiding users in understanding and analyzing the case files.

Figure 5I:
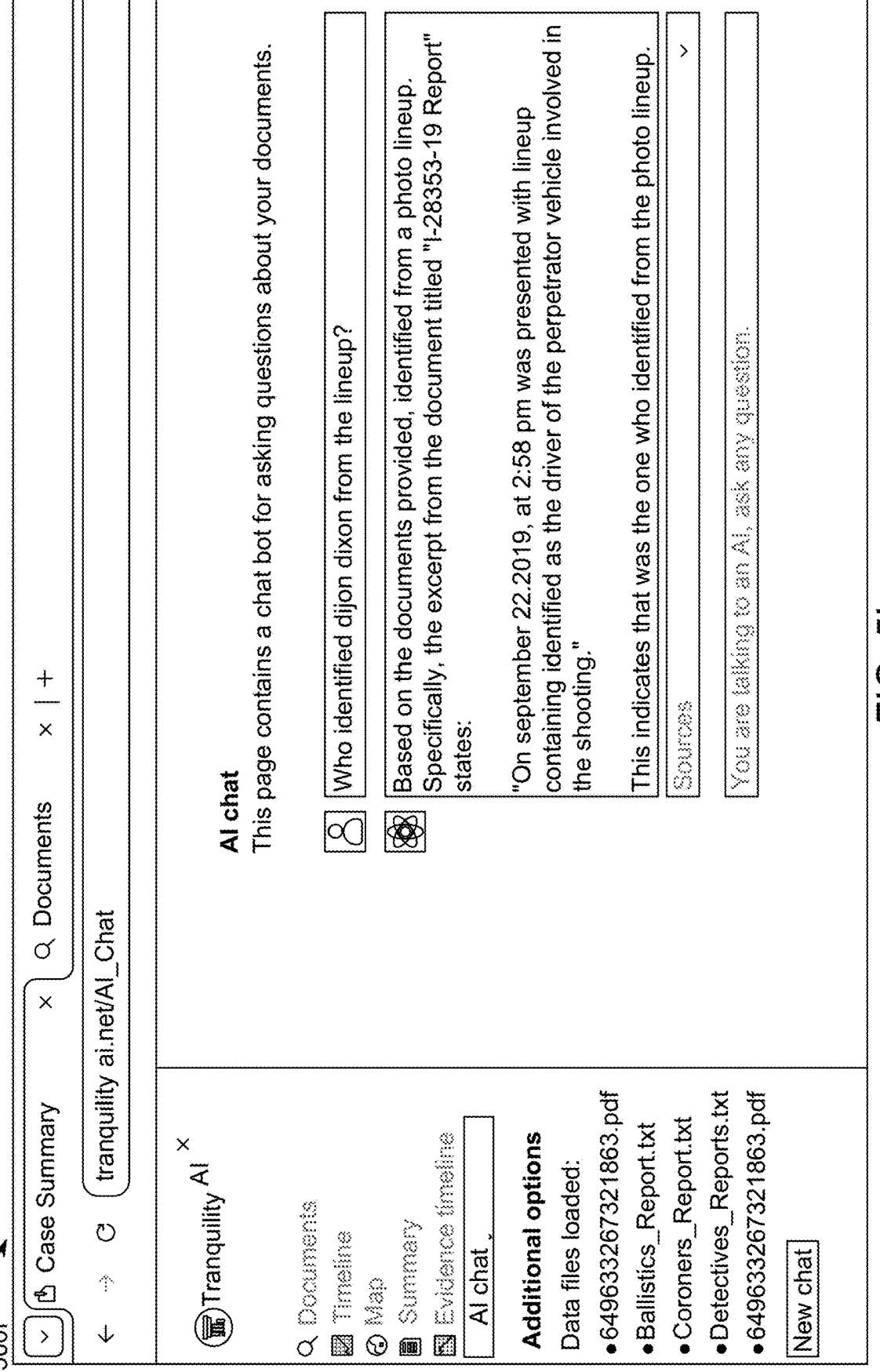
FIG. 5I presents a ninth user interface for a chat interface within the platform, according to aspects of the present disclosure.

Referring to FIG. 5I, a ninth user interface 500I is depicted for a chat interface within the platform. In some aspects, the ninth user interface 500I may include a chat input field where users can type their questions or prompts. This feature may facilitate user interaction with the platform, allowing users to ask questions and receive answers (e.g., text, media, and the like) about the case. The chat input field may be designed to accept text input from the user, which may include queries, commands, or other types of prompts. The user's input may be processed by the system to generate responses based on the indexed data and the large language model.

In some cases, the ninth user interface 500I may also include a chat response area. This area may display the responses generated by the large language model based on the input provided by the user. The responses may include references to specific documents and excerpts that support the information conveyed. This feature may provide users with contextually relevant answers, aiding in the understanding and analysis of the case. The chat response area may be designed to display text responses from the system, which may include answers to the user's queries, summaries of case details, or other types of information relevant to the case.

In some aspects, the system can access and analyze various documents to provide contextually relevant answers. This may involve the platform retrieving data from the indexed data, analyzing the data using the large language model, and generating responses based on the analysis. The responses may include references to specific documents, excerpts from the documents, or summaries of the documents, providing users with detailed and contextually relevant information about the case. This feature may facilitate a more dynamic and interactive exploration of the case, aiding users in understanding and analyzing the case files.

In some cases, the system can provide a chatbot interface for user interaction with the large language model. This feature may allow users to interact with the platform in a conversational manner, asking questions and receiving answers (e.g., text, media, or maps) about the case. The chatbot interface may be designed to facilitate a natural language interaction between the user and the system, providing a more intuitive and user-friendly way for users to explore and understand the case. This feature may provide a more dynamic and interactive exploration of the case, aiding users in understanding and analyzing the case files.

2. Multi-Model Object Processing and Analysis

Digital investigations and intelligence gathering have become increasingly complex in the modern era due to the vast amount of data generated from diverse sources. Law enforcement agencies, legal professionals, and intelligence organizations face significant challenges in efficiently processing, analyzing, and correlating information from various digital formats including documents, images, audio, video, and social media content.

Traditional methods of manual review and analysis are often time-consuming, error-prone, and struggle to keep pace with the volume and variety of digital evidence. Additionally, valuable connections and insights may be missed when examining data sources in isolation rather than as an interconnected whole.

There is a growing need for advanced technological solutions that can ingest and process multiple types of digital content, extract relevant information, identify entities and relationships, and present the analyzed data in meaningful ways. Ideally, such systems would leverage artificial intelligence and machine learning capabilities to automate much of the labor-intensive work while still allowing human analysts to guide investigations and draw conclusions.

Furthermore, the ability to visualize complex data relationships, generate timelines of events, and enable natural language querying of the processed information could greatly enhance investigative capabilities. However, building such comprehensive systems that can handle diverse data types while maintaining accuracy, scalability, and usability poses significant technical challenges.

The present disclosure provides a system and method for processing and analyzing digital content from diverse sources to generate investigative intelligence. This system and method may be particularly beneficial in the context of legal investigations or intelligence gathering, where the ability to efficiently process, analyze, and correlate information from various digital formats is crucial.

The system may include several key components and processes, such as content ingestion, content extraction and classification, entity identification and resolution, conversation parsing and storage, vector embedding and storage, relationship graph construction, timeline management, and multimodal processing. These components and processes may work together to ingest and process multiple types of digital content, extract relevant information, identify and resolve entities, construct a graph of relationships between entities, generate and update timelines of events, and provide access to the processed digital content, relationship graph, and timelines through one or more interactive interfaces.

In some aspects, the system may leverage artificial intelligence and machine learning techniques, including large language models, for tasks such as classification, entity recognition, and semantic search. This may allow for a high degree of automation, potentially increasing the efficiency and accuracy of the processing and analysis tasks.

In other aspects, the system may provide a user interface that allows users to interact with the processed data in various ways, such as through timelines, chat interfaces, maps, or presentations. This may enhance the usability of the system and enable users to gain insights from the processed data more effectively.

In yet other aspects, the system may handle diverse data types, including documents, images, audio, video, and social media content. This may allow for a comprehensive analysis of complex, multimodal datasets, potentially revealing valuable connections and insights that might be missed when examining data sources in isolation.

Overall, the system and method disclosed herein may provide a powerful tool for investigative intelligence, capable of handling diverse data types, leveraging advanced AI and machine learning techniques, and presenting the analyzed data in meaningful and interactive ways.

2.A. Platform

Figure 6A:
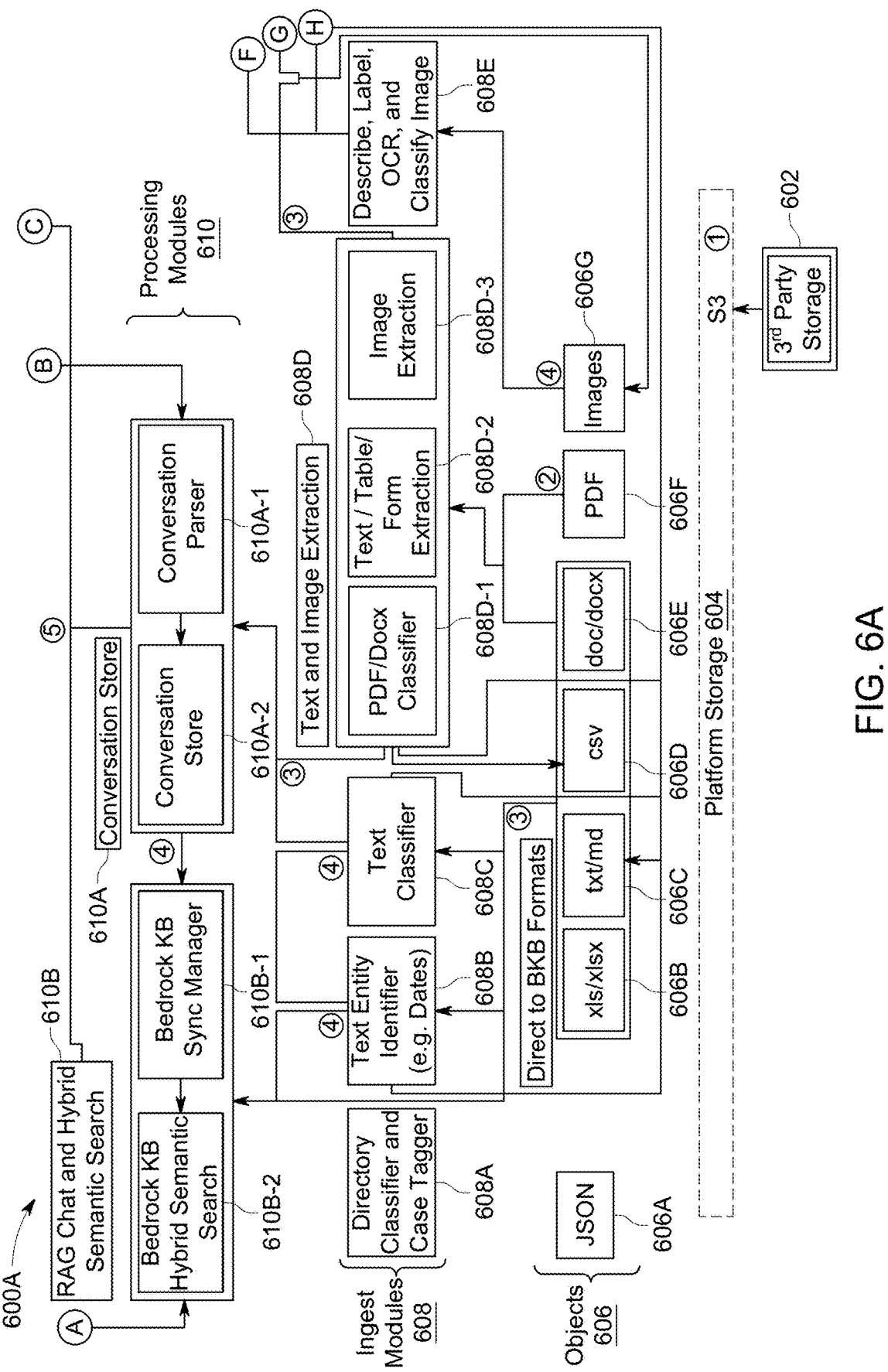
FIGS. 6A, 6B, and 6C illustrate system diagrams of a data processing and analysis platform, according to aspects of the present disclosure.
Figure 6B:
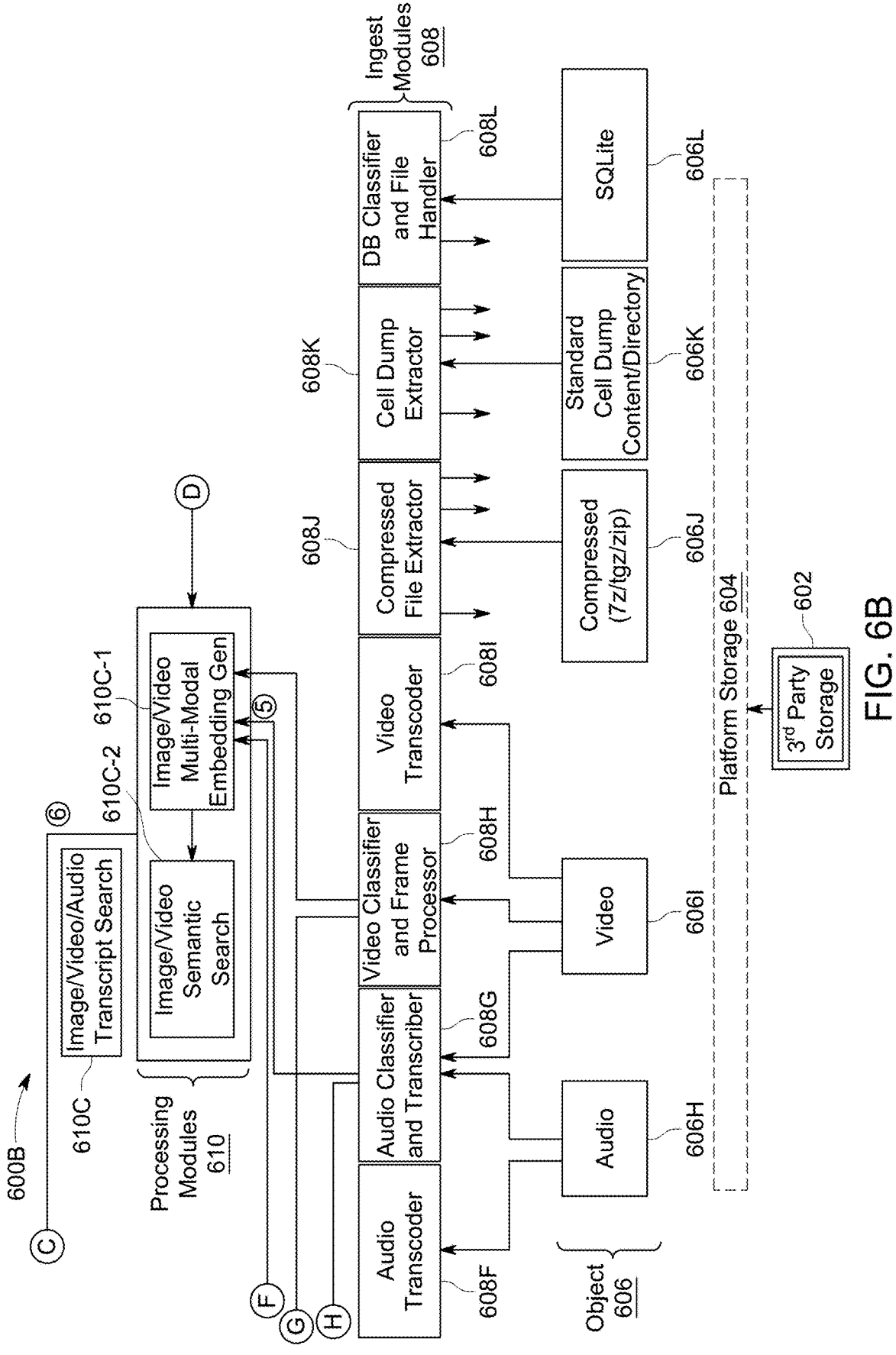
Figure 6C:
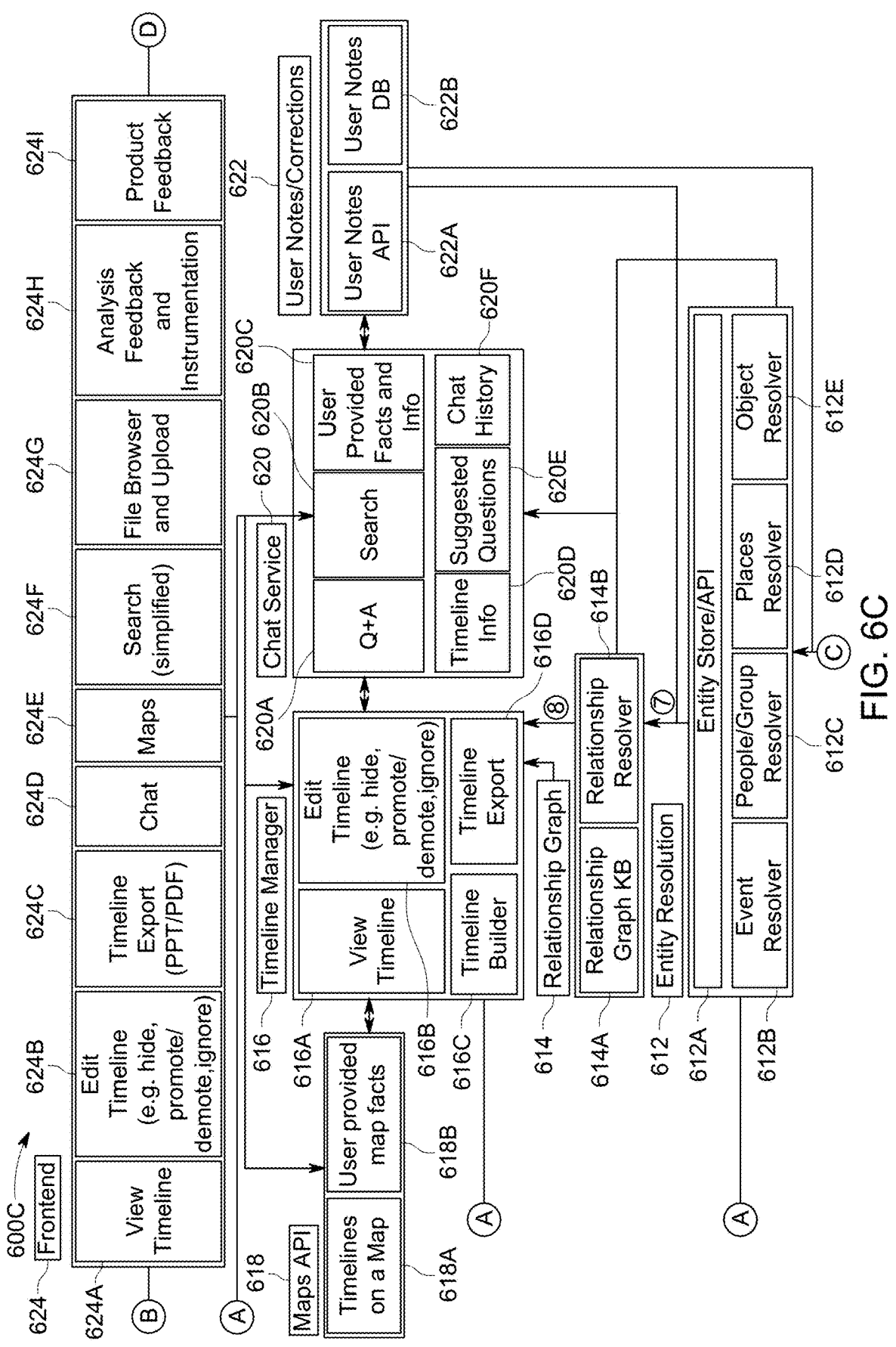

FIG. 6A, FIG. 6B, and FIG. 6C depict system diagrams 600A, 600B, and 600C, which illustrate interconnected components of a comprehensive data processing and analysis platform. These diagrams represent different aspects and functionalities of the platform, working together to provide a robust solution for investigative intelligence.

The system diagram 600A, shown in FIG. 6A, may focus on the initial stages of data ingestion and processing. It illustrates how the system handles various types of structured and unstructured data, including JSON, XLS, text, CSV, DOC, PDF, and image files. The ingest modules and processing modules in this diagram may perform data extraction and initial analysis.

The system diagram 600B, depicted in FIG. 6B, may expand the platform's capabilities to handle additional data types such as audio, video, compressed files, cell dumps, and databases. This diagram depicts how the system processes and analyzes these diverse data formats, preparing them for more advanced analysis and search functionalities.

The system diagram 600C, illustrated in FIG. 6C, may represent the higher-level analytical and user interaction components of the platform. It may demonstrate how the processed data is utilized to create relationship graphs, manage timelines, and provide interactive interfaces for users to explore and analyze the information.

Together, these interconnected components may form a comprehensive platform that ingests diverse data types, processes and analyzes the information, and presents the results in meaningful and interactive ways. The platform may leverage various technologies and methodologies, including artificial intelligence and machine learning, to provide powerful investigative intelligence capabilities.

The platform may interact with various different types of objects 606. In some cases, the objects 606 may include one or more (or combinations) of: a JSON object 606A, an XLS object 606B, a text object 606C, a CSV object 606D, a DOC object 606E, a PDF object 606F, an image object 606G, an audio object 606H, a video object 606I, a compressed file object 606J, a cell dump object 606K, and/or database object 606L.

The platform may use various different types of ingest modules 608 to process the different types of objects 606 to (1) extract sub-objects of the objects 606 (which may, themselves, be objects 606) and/or (2) classify, identify, describe, or label features of the objects 606 or the sub-objects (collectively, "ingest outputs"). In some cases, the ingest modules 608 may include one or more (or combinations) of: a directory classifier 608A, a text entity identifier 608B, a text classifier 608C, a text image extraction 608D, an image analyzer 608E, an audio transcoder 608F, an audio classifier 608G, a video classifier 608H, a video transcoder 608I, a compressed file extractor 608J, a cell dump extractor 608K, and/or a database classifier 608L. The text image extraction 608D may include a word/PDF classifier 608D-1, a text extractor 608D-2, and/or an image extractor 608D-3.

The platform may use various different types of processing modules 610 to process the different types of objects 606 (or the decomposed sub-objects from other objects 606) and/or the ingest outputs from ingest modules 608 to generate (a) semantic searchable embeddings, and/or (b) conversations. In some cases, the processing modules 610 may include one or more (or combinations) of: a conversation store 610A, a semantic search 610B, and/or an image/video/audio transcript search 610C.

The conversation store 610A may include a conversation parser 610A-1 and/or a conversation store database 610A-2. The semantic search 610B may include a semantic search manager 610B-1, and/or a semantic search database 610B-2. The image/video/audio transcript search 610C may include an image/video audio embedding model 610C-1, and/or an image/video audio semantic search 610C-2.

The ingest modules 608 may play a crucial role in decomposing complex data structures into simpler, more manageable components. This decomposition process may allow for more efficient and accurate processing of diverse data types. For example, when processing a PDF object 606F, the text image extraction module 608D may break it down into separate text and image components. The text extractor 608D-2 may extract the textual content, while the image extractor 608D-3 may isolate any embedded images.

Similarly, when handling a video object 606I, the video classifier 608H and video transcoder 608I may work together to decompose the video into its constituent parts. The video may be broken down into a series of image frames, an audio track, and potentially embedded metadata or subtitles. Each of these components may then be processed separately by specialized modules.

In the case of image processing, the image analyzer 608E may further decompose images into recognized objects or extracted text through optical character recognition (OCR). This multi-level decomposition may allow for more granular analysis and classification of the content.

As the ingest modules 608 break down complex data structures, they may also generate metadata that tracks the relationships between the original complex structure and its simpler components. This metadata may be crucial for maintaining context and allowing the system to reconstruct the original data structure if needed.

The simpler data structures resulting from this decomposition process may then be fed into other specialized ingest modules for further processing. For instance, extracted text from various sources (PDFs, images, videos) may be processed by the text entity identifier 608B and text classifier 608C. Similarly, extracted images from different sources may all be analyzed by the image analyzer 608E.

This hierarchical decomposition and processing approach may enable the processing modules 610 to work with atomic data parts while still maintaining awareness of their origin within more complex structures. The semantic search module 610B may perform text-based semantic search on extracted text from various sources, while the image/video/audio transcript search module 610C may handle semantic search for visual and audio content.

These processing modules may work together to handle various aspects of data processing, storage, and retrieval within the system. The conversation store 610A may manage parsed conversations, while the semantic search 610B and image/video/audio transcript search 610C may enable advanced search capabilities across different types of content.

The conversation store 610A may manage parsed conversations, correlating text segments extracted from a source on a per entity basis, to thereby reconstruct and associate communicators in conversations, social media posts, video, audio, and the like with specific parts of the recorded data. By working with these atomic data parts, the processing modules may achieve higher accuracy and efficiency in their respective tasks.

This approach may also facilitate more comprehensive analysis by allowing the system to identify connections and patterns across different data types and sources. For example, the system may be able to correlate text mentioned in a PDF document with objects recognized in an image or video, providing a more holistic view of the information contained in the diverse data sources.

Referring to FIG. 6A, the system diagram 600A illustrates a part of the platform for data processing and analysis. The platform may include several components and processes that work together to ingest, process, and store multiple types of digital content.

In some aspects, the platform may begin with data stored in a third-party storage 602, such as Google Drive. A third-party storage sync manager, which may be part of the ingest modules 608, may sync files from the third-party storage 602 to a platform storage 604, such as Amazon S3. The platform storage 604 may contain various objects 606, including but not limited to the JSON object 606A, the XLS object 606B, the text object 606C, the CSV object 606D, the DOC object 606E, the PDF object 606F, and the image object 606G.

The ingest modules 608 may process the incoming data. These modules may include the directory classifier 608A, the text entity identifier 608B, the text classifier 608C, the text image extraction module 608D, and the image analyzer 608E. In the text image extraction module 608D, the platform may host the word/PDF classifier 608D-1, the text extractor 608D-2, and the image extractor 608D-3.

The directory classifier 608A may play a crucial role in organizing and categorizing incoming data within the system. In some aspects, the directory classifier 608A may analyze the structure and content of directories or folders containing various files and sub-directories. This analysis may involve examining file names, extensions, metadata, and directory hierarchies to determine the nature and relationships of the stored data.

In some cases, the directory classifier 608A may decompose complex directory structures into simpler, more manageable sub-objects. These sub-objects may include individual files, groups of related files, or sub-directories that share common characteristics. The decomposition process may allow for more efficient and targeted processing of the data by other ingest modules.

For example, when processing a directory containing a mix of document types, the directory classifier 608A may categorize and group files based on their formats. It may identify all PDF files and create a sub-object for them, which may then be processed by the text image extraction module 608D. Similarly, it may group all image files into another sub-object, which may be directed to the image analyzer 608E for further processing.

In some implementations, the directory classifier 608A may also analyze the content and context of files within a directory to identify potential relationships or themes. This may help in creating meaningful sub-objects that preserve the contextual information of the original directory structure while facilitating more focused processing by other ingest modules.

The sub-objects created by the directory classifier 608A may be dynamically routed to the appropriate ingest modules based on their characteristics. For instance, a sub-object containing email files may be directed to a specialized email parser, while a sub-object with source code files may be sent to a code analysis module.

By decomposing complex directory structures and creating targeted sub-objects, the directory classifier 608A may enhance the overall efficiency and accuracy of the data ingestion process. It may enable other ingest modules to focus on specific types of data, potentially improving the speed and quality of subsequent analysis and processing tasks.

The text entity identifier 608B may process various types of objects, including XLS objects 606B, text objects 606C, CSV objects 606D, and DOC objects 606E, to identify entities within the data. This module may employ advanced natural language processing techniques to extract and categorize entities from different textual formats.

When processing an XLS object 606B, the text entity identifier 608B may extract structured data from spreadsheet cells and columns. It may analyze column headers and cell contents to identify potential entities such as names, dates, locations, or numerical values. The module may then categorize these entities based on their data type and context within the spreadsheet. For example, in a sales report spreadsheet, it may identify product names, customer information, transaction dates, and sales figures as separate entity types. The text entity identifier 608B may also examine relationships between columns to infer additional entity information. In some cases, it may generate a structured representation of the extracted entities and their relationships, which may be used for further analysis or integration with data from other sources.

For text objects 606C, the text entity identifier 608B may analyze unstructured text to recognize entities such as names, locations, organizations, and dates. In a social media post, for instance, it may identify people mentioned, places discussed, and relevant dates or events.

When handling CSV objects 606D, the text entity identifier 608B may examine each column to identify and categorize entities based on the data type and content. For example, in a sales report CSV file, it may recognize product names, customer information, and transaction dates as separate entity types.

For DOC objects 606E, the text entity identifier 608B may process the document's content to extract entities from various sections, including headers, paragraphs, and tables. In a legal document, for instance, it may identify parties involved, legal terms, dates, and case references.

In some cases, the text entity identifier 608B may output identified text as a new text object 606C. This may occur when the module extracts significant textual content from other object types or when it generates a consolidated text representation of identified entities.

The text entity identifier 608B may also trigger an event to the semantic search module 610B when new ingest data is processed. This event may notify the semantic search module to update its index with the newly identified entities and their relationships, enabling more accurate and comprehensive search capabilities.

In some cases, the objects 606B-606E may also be input directly to the semantic search module 610B. This direct input may allow for immediate indexing and searching of raw data, while the processed output from the text entity identifier 608B may provide enhanced, entity-rich information to improve search accuracy and relevance.

The text classifier 608C may play a crucial role in categorizing and organizing textual content within the system. This module may ingest various types of objects, including XLS objects 606B, text objects 606C, CSV objects 606D, and DOC objects 606E. The ingestion process may be triggered by events signaling the arrival of new objects in the system.

When processing an XLS object 606B, the text classifier 608C may analyze the content of individual cells, column headers, and sheet names. For example, it may classify a spreadsheet as a "Financial Report" based on the presence of financial terms and numerical data patterns.

For text objects 606C, the text classifier 608C may examine the entire body of text to determine its category. A social media post may be classified as "Politics" or "crime" based on the prevalent topics and terminology used.

When handling CSV objects 606D, the text classifier 608C may analyze the column headers and data patterns to determine the nature of the information. For instance, it may classify a CSV file as a "Customer Database" based on the presence of fields like name, address, and purchase history.

For DOC objects 606E, the text classifier 608C may process the document's content, including headers, paragraphs, and formatting. A legal contract may be classified as a "Non-Disclosure Agreement" based on specific legal clauses and structure.

In some cases, the text classifier 608C may output new text objects 606C that contain classification information. For example, it may generate a new text object with metadata tags indicating the determined categories or classifications for each processed document.

The text classifier 608C may also output classifications to the semantic search module 610B. This may enable more accurate and context-aware search capabilities by allowing users/the platform to filter or prioritize search results based on document classifications.

Additionally, when the text classifier 608C identifies a document as a conversation or dialogue, it may output the classification to the conversation store 610A. This may allow the conversation store to properly process and store the content as a structured conversation, potentially enabling features like speaker identification or dialogue flow analysis.

By providing these outputs to various components of the system, the text classifier 608C may enhance the overall functionality and efficiency of the data processing and analysis platform.

The text image extraction module 608D may play a crucial role in processing DOC objects 606E and PDF objects 606F. This module may comprise three sub-components: the word/PDF classifier 608D-1, the text extractor 608D-2, and the image extractor 608D-3. Each of these sub-components may perform specific actions on different ingests, potentially generating various outputs for further processing.

When processing a DOC object 606E, the word/PDF classifier 608D-1 may first analyze the document structure and content. It may identify sections containing text, tables, and embedded images. For example, in a business report, the classifier may recognize the title page, table of contents, main body text, charts, and appendices.

The text extractor 608D-2 may then extract the textual content from the identified sections. In some cases, it may also extract tables or data from forms within the document. In some cases, it may generate new text objects 606C for each major section of the document. For instance, each page or chapter of the DOC object 606E may become a separate text object 606C, which may then be processed by the text entity identifier 608B or the text classifier 608C.

The image extractor 608D-3 may focus on extracting embedded images from the DOC object 606E. These extracted images may be converted into new image objects 606G, which may then be sent to the image analyzer 608E for further processing. For example, charts and graphs from the business report may be extracted as separate image objects 606G.

In some cases, the text extractor 608D-2 may also identify tabular data within the DOC object 606E and convert it into CSV objects 606D. These CSV objects may then be processed by relevant ingest modules, such as the text entity identifier 608B, to extract structured information.

When processing a PDF object 606F, the word/PDF classifier 608D-1 may perform a similar initial analysis, identifying different components within the PDF. However, it may also need to handle potential security features or complex layouts often found in PDF documents.

The text extractor 608D-2, when working with PDF objects 606F, may employ optical character recognition (OCR) techniques to extract text from scanned documents or images within the PDF. This extracted text may be output as new text objects 606C for further processing.

The image extractor 608D-3 may handle both embedded images and entire pages of the PDF object 606F. In some cases, it may convert each page of the PDF into a separate image object 606G, which may be useful for documents with complex layouts or those that are primarily image-based.

In both DOC and PDF processing, the text image extraction module 608D may identify potential conversations within the documents. For example, in meeting minutes or interview transcripts, it may recognize dialogue structures and output these to the conversation store 610A for specialized processing.

Here are some specific examples of how the text image extraction module 608D may process different ingests and map outputs to different components:

1. Processing a DOC Object 606E (Business Report)
   Word/PDF classifier 608D-1: Identifies document structure
   Text extractor 608D-2:
   Extracts main body text→New text objects 606C→Text classifier 608C
   Extracts table of financial data→New CSV object 606D→Text entity identifier 608B
   Image extractor 608D-3:
   Extracts charts and graphs→New image objects 606G→Image analyzer 608E
2. Processing a PDF Object 606F (Scanned Crime Scene Report)
   Word/PDF classifier 608D-1: Identifies document as scanned image
   Text extractor 608D-2:
   Performs OCR on entire document→New text object 606C→Text classifier 608C
   Image extractor 608D-3:
   Extracts crime scene photos→New image object 606G→Image analyzer 608E
3. Processing a DOC Object 606E (Interview Transcript)
   Word/PDF classifier 608D-1: Identifies document as dialogue-based
   Text extractor 608D-2:
   Extracts full text→New text object 606C→Text entity identifier 608B Identifies conversation structure→Outputs to conversation store 610A
4. Processing a PDF Object 606F (Social Media History)
   Word/PDF classifier 608D-1: May identify document as containing multiple social media posts
   Text extractor 608D-2:
   May extract post text→New text objects 606C→Text classifier 608C
   May extract metadata (e.g. timestamps, user IDs)→New CSV object 606D→Text entity identifier 608B
   Image extractor 608D-3:
   May extract images from posts→New image objects 606G→Image analyzer 608E By processing DOC and PDF objects in this manner, the text image extraction module 608D may enable comprehensive analysis of complex documents, allowing the system to extract and utilize various types of information contained within them.

In some cases, the text image extraction module 608D may include optical character recognition (OCR) capabilities for handwritten content. This may allow the system to extract text from handwritten documents or forms, potentially increasing the range of content that can be processed and analyzed.

The image analyzer 608E may perform various tasks related to image analysis. For example, it may classify images based on their content, label objects or features within the images, and generate descriptions of the images. This may enable the system to extract meaningful information from image content, potentially enhancing the depth and richness of the analysis. The image analyzer 608E may play a crucial role in processing and extracting information from image objects 606G within the system.

This module may ingest image objects 606G from various sources, including those extracted from documents by the text image extraction module 608D, as well as standalone image files. In some cases, the image objects 606G may also come from the video classifier 608H via point G.

When processing an image object 606G, the image analyzer 608E may perform several tasks:
   1. Image Description Generation: The image analyzer 608E may generate textual descriptions of the overall content of the image. For example, when analyzing a photograph of a city skyline, it may generate a description such as "A panoramic view of a city skyline at sunset, with tall skyscrapers silhouetted against an orange sky."
   2. Object and Feature Labeling: The module may identify and label specific objects or features within the image. For instance, in an image of a crime scene, it may label items like "knife," "blood stain," or "broken window." In a photograph of a person, it may label features such as "blue eyes," "brown hair," or "glasses."
   3. Optical Character Recognition (OCR): The image analyzer 608E may perform OCR on images containing text. This may include processing handwritten notes, street signs in photographs, or text overlays in diagrams. For example, when analyzing a photograph of a license plate, the OCR function may extract the alphanumeric characters. The extracted text may be output as new text objects 606C, which may then be processed by other modules such as the text entity identifier 608B.
   4. Image Classification: The module may categorize images based on their content. For instance, it may classify images as "landscape," "portrait," "document," or "diagram." In a legal context, it may use more specific classifications such as "evidence photo," "crime scene diagram," or "surveillance footage still."

In some cases, the image analyzer 608E may apply these processes to specific regions or features within an image. For example, in a complex diagram, it may generate descriptions and labels for individual components or sections of the image.

The image analyzer 608E may also output processed image data to the image/video/audio transcript search module 610C via point F. This output may include the original image along with metadata such as generated descriptions, labels, and classifications. By providing this information to the search module, the system may enable more comprehensive and accurate image search capabilities.

For example, when processing a photograph from a crime scene:

1. Description: "A dimly lit room with overturned furniture and broken glass on the floor."
2. Labels: "Overturned chair," "Broken window," "Blood stain on carpet."
3. OCR: If there's a visible document in the image, the module may extract any legible text, outputting it as a new text object 606C.
4. Classification: "Crime scene photograph," "Indoor scene," "Evidence documentation."

This processed information, along with the original image, may then be sent to the image/video/audio transcript search module 610C, allowing users to search for images based on descriptions, specific objects, text content, or classifications.

By providing these diverse analytical capabilities, the image analyzer 608E may significantly enhance the system's ability to extract valuable information from visual data, potentially improving the overall effectiveness of the data processing and analysis platform.

The processed data may then flow to the processing modules 610. These may include the conversation store 610A and the semantic search module 610B. The conversation store 610A may include the conversation parser 610A-1 and the conversation store database 610A-2. The semantic search module 610B may comprise a semantic search manager 610B-1 and the semantic search database 610B-2.

The conversation store 610A may play a crucial role in processing and managing conversational data within the system. It may comprise two main components: the conversation parser 610A-1 and the conversation store database 610A-2, which may work together to handle conversations identified by the text classifier 608C and the text image extraction module 608D.

The conversation parser 610A-1 may receive conversation data from the text classifier 608C and the text image extraction module 608D. This data may include text identified as dialogues, transcripts, or other forms of conversational content. The parser may analyze this input to structure the conversation, potentially identifying individual speakers, separating utterances, and organizing the flow of dialogue.

In some cases, the conversation parser 610A-1 may employ natural language processing techniques to extract additional metadata from the conversations. This may include identifying topics discussed, sentiment analysis, or detecting key phrases or entities mentioned within the dialogue.

The structured and enriched conversation data produced by the parser may then be stored in the conversation store database 610A-2. This database may be designed to efficiently store and retrieve conversational data, potentially using specialized data structures or indexing methods optimized for dialogue-based content.

The conversation store 610A may be connected to the frontend 624 via point B through an API call. This connection may enable various user interactions with the stored conversation data. Users may be able to search for specific conversations based on criteria such as participants, topics, or date ranges. The API may also support filtering capabilities, allowing users to narrow down conversation results based on various parameters. Additionally, the frontend connection may facilitate viewing of conversation data, potentially presenting it in a user-friendly format that preserves the original structure and flow of the dialogue.

In some aspects, the conversation store 610A may output results to the semantic search module 610B for further processing. This may allow the semantic search capabilities to incorporate conversational context and content, potentially enhancing the system's ability to find relevant information across various data types.

Furthermore, the conversation store 610A may output results to the entity resolution module 612 via point C. This connection may enable the entity resolution module to incorporate conversational context when identifying and resolving entities. For example, it may help in disambiguating references to people or places mentioned in conversations by considering the full context of the dialogue.

By processing, storing, and providing access to conversational data in this manner, the conversation store 610A may enhance the system's ability to analyze and utilize information from dialogue-based sources, potentially improving the overall depth and accuracy of the data processing and analysis platform.

The semantic search module 610B may play a central role in enabling advanced search capabilities within the system. It may comprise two main components: the semantic search manager 610B-1 and the semantic search database 610B-2, which may work in tandem to process and store data for efficient retrieval.

The semantic search manager 610B-1 may be responsible for ingesting and processing various types of data from different sources. It may receive classifications from the text classifier 608C, entity identifications from the text entity identifier 608B, and objects such as XLS object 606B, text object 606C, CSV object 606D, and DOC object 606E. The manager may analyze this diverse input to create semantic representations of the content.

In some cases, the semantic search manager 610B-1 may employ advanced natural language processing techniques, potentially including large language models, to understand the context and meaning of the input data. It may generate vector embeddings for each piece of content, capturing semantic relationships between words, phrases, and concepts.

The semantic search database 610B-2 may store these vector embeddings along with metadata about the original content. It may utilize specialized indexing structures optimized for vector similarity searches, potentially enabling fast and efficient retrieval of semantically related information.

The semantic search module 610B may provide a RAG (Retrieval-Augmented Generation) chat capability. In this approach, the system may use the semantic search capabilities to retrieve relevant information from the database and augment it with generated responses. This may allow the chat interface to provide more informed and contextually relevant answers to user queries.

The hybrid semantic search functionality may combine traditional keyword-based search with semantic understanding. When a user submits a query, the system may perform both a keyword match and a semantic similarity search. This hybrid approach may yield more comprehensive and relevant search results, potentially capturing related concepts even when exact keyword matches are not present.

The semantic search module 610B may be connected via point A by API call to the entity resolution module 612, the relationship graph 614, and the chat service 620. This connection may enable these components to leverage the semantic search capabilities in their respective functions.

For the entity resolution module 612, the semantic search module 610B may provide contextually relevant information to aid in entity disambiguation. When the entity resolution module encounters ambiguous references, it may query the semantic search module to retrieve additional context that may help in accurately identifying and resolving entities.

In relation to the relationship graph 614, the semantic search module 610B may supply semantically related information that may help in identifying and strengthening connections between entities in the graph. This may enhance the system's ability to uncover non-obvious relationships and patterns within the data.

For the chat service 620, the semantic search module 610B may power the retrieval component of the RAG chat functionality. When a user poses a question, the chat service may use the semantic search capabilities to find relevant information from the knowledge base, which may then be used to generate or augment the response.

The semantic search module 610B may output results to the entity resolution module 612 in various ways. It may provide contextually relevant passages or documents that mention entities being resolved. This additional context may help in disambiguating between entities with similar names or characteristics.

In some cases, the semantic search module 610B may output entity co-occurrence information to the entity resolution module 612. By analyzing how entities appear together in semantically similar contexts across the corpus, the system may infer relationships that aid in entity resolution.

The semantic search module 610B may also provide confidence scores for entity matches based on semantic similarity. These scores may be used by the entity resolution module 612 to make more informed decisions when resolving ambiguous entity references.

By integrating these diverse functionalities, the semantic search module 610B may significantly enhance the system's ability to understand, process, and retrieve information, potentially improving the overall effectiveness of the data analysis platform.

In some aspects, the system may use an event-driven architecture for efficient processing. This may involve triggering workflows based on specific events, such as the arrival of new data in the platform storage 604 or the completion of certain processing tasks. This may allow the system to respond quickly to changes in the data and to efficiently manage the processing workload.

In other aspects, the system may be capable of processing and analyzing various types of digital content, including social media content and cell phone record collections. This may allow the system to handle diverse data sources and formats, potentially enabling a comprehensive and holistic analysis of the data.

Referring to FIG. 6B, the system diagram 600B illustrates a part of the platform for data processing and analysis of additional object types. In this embodiment, the system may handle additional types of data objects, including the audio object 606H, the video object 606I, the compressed file object 606J, the cell dump object 606K, and the database object 606L. These objects may be processed by specialized ingest modules 608 and (in some cases) processed by the image/video/audio transcript search module 610C.

In some aspects, the ingest modules 608 may include the audio transcoder 608F, the audio classifier 608G, the video classifier 608H, the video transcoder 608I, the compressed file extractor 608J, the cell dump extractor 608K, and the database classifier 608L. Each of these modules may be designed to handle specific types of data objects. For example, the audio transcoder 608F and audio classifier 608G may process audio objects 606H, while the video classifier 608H and video transcoder 608I may handle video objects 606I. The compressed file extractor 608J may manage compressed file objects 606J, the cell dump extractor 608K may process cell dump objects 606K, and the database classifier 608L may handle database objects 606L.

The compressed file extractor 608J may play a crucial role in processing compressed file objects 606J, which may contain various types of data encapsulated within a single compressed archive. This module may be designed to handle multiple compression formats, such as ZIP, RAR, 7Z, or TAR.GZ, among others.

When processing a compressed file object 606J, the compressed file extractor 608J may first identify the compression format used. It may then employ appropriate decompression algorithms to extract the contents of the archive. The extracted contents may include a diverse range of file types, which the module may categorize and process accordingly.

In some cases, the compressed file extractor 608J may generate new objects based on the extracted contents. These new objects may include:

1. Image objects 606G: The extractor may identify image files (e.g., JPEG, PNG, GIF) within the compressed archive and create separate image objects for each. These new image objects may then be routed to the image analyzer 608E for further processing, such as object detection or facial recognition.

2. Text objects 606C: Any text files (e.g., TXT, RTF, HTML) found in the compressed archive may be extracted and converted into individual text objects. These text objects may be sent to the text entity identifier 608B or the text classifier 608C for analysis and categorization.

3. CSV objects 606D: Spreadsheet files or other structured data files may be extracted and converted into CSV objects. These CSV objects may then be processed by modules such as the text entity identifier 608B to extract relevant information.

4. PDF objects 606F: If the compressed archive contains PDF files, the extractor may create separate PDF objects, which may be sent to the text image extraction module 608D for further processing.

5. DOC objects 606E: Word processing documents found in the archive may be extracted as DOC objects and routed to appropriate modules for text extraction and analysis.

6. Audio objects 606H: Any audio files within the compressed archive may be extracted and created as separate audio objects, which may then be processed by the audio transcoder 608F and audio classifier 608G.

7. Video objects 606I: Video files found in the archive may be extracted and created as individual video objects, to be handled by the video classifier 608H and video transcoder 608I.

In some implementations, the compressed file extractor 608J may also handle nested compressed files. If it encounters a compressed file within the main archive, it may recursively apply the extraction process to ensure all levels of compression are properly handled.

The compressed file extractor 608J may also generate metadata about the extraction process, including information about the original compressed file structure, file names, and relationships between extracted files. This metadata may be stored alongside the newly created objects to maintain context and provenance information.

As the compressed file extractor 608J generates these new objects, it may trigger events to notify relevant processing modules about the availability of new data. For instance, when a new image object is created, an event may be sent to the image analyzer 608E to initiate processing of the new image.

In some cases, the compressed file extractor 608J may work in conjunction with the directory classifier 608A to organize the extracted files into a logical directory structure, preserving any hierarchical relationships present in the original compressed archive.

By decomposing compressed file objects 606J into their constituent parts and generating appropriate new objects, the compressed file extractor 608J may enable the system to process and analyze the contents of compressed archives in a granular and efficient manner. This may enhance the system's ability to extract valuable information from complex, multi-file data sources, potentially improving the overall depth and accuracy of the data processing and analysis platform.

The cell dump extractor 608K may play a crucial role in processing cell dump objects 606K, which may contain diverse types of data extracted from mobile devices. These cell dump objects 606K may come in various formats, such as directories, PDF reports, compressed folders, or proprietary forensic file formats.

When processing a cell dump object 606K, the cell dump extractor 608K may first identify the structure and format of the input. It may then employ appropriate extraction techniques to decompose the cell dump into its constituent parts. The extracted contents may include a wide range of data types, which the module may categorize and process accordingly.

In some cases, the cell dump extractor 608K may generate new objects based on the extracted contents. These new objects may include:

1. Image objects 606G: The extractor may identify image files (e.g., photos, screenshots, thumbnails) within the cell dump and create separate image objects for each. These new image objects may then be routed to the image analyzer 608E for further processing, such as facial recognition or object detection.

2. Text objects 606C: The extractor may extract various text-based data, such as SMS messages, chat logs, notes, or contact information. These may be converted into individual text objects and sent to the text entity identifier 608B or the text classifier 608C for analysis and categorization.

3. CSV objects 606D: Structured data from the cell dump, such as call logs, location history, or app usage statistics, may be extracted and converted into CSV objects.

These CSV objects may then be processed by modules such as the text entity identifier 608B to extract relevant information.

When processing a cell dump object 606K that is structured as a directory or folder, the cell dump extractor 608K may traverse the directory structure, identifying and extracting relevant files. It may work in conjunction with the directory classifier 608A to maintain the logical organization of the extracted data.

For cell dump objects 606K in PDF format, the cell dump extractor 608K may employ techniques similar to those used by the text image extraction module 608D. It may extract text content, tables, and embedded images from the PDF, creating appropriate objects for each type of extracted data.

In cases where the cell dump object 606K is a compressed folder, the cell dump extractor 608K may first decompress the folder, then process its contents in a manner similar to handling a directory structure. It may also coordinate with the compressed file extractor 608J to handle any nested compressed files within the cell dump.

For proprietary forensic file formats, the cell dump extractor 608K may implement specific parsing algorithms to extract the relevant data and convert it into standard object types that can be processed by other modules in the system.

The cell dump extractor 608K may generate metadata about the extraction process, including information about the original cell dump structure, file names, timestamps, and relationships between extracted items. This metadata may be stored alongside the newly created objects to maintain context and provenance information, ensuring traceability of the extracted sub-objects back to their source within the original cell dump.

As the cell dump extractor 608K generates these new objects, it may trigger events to notify relevant processing modules about the availability of new data. For instance, when a new text object containing chat logs is created, an event may be sent to the text classifier 608C to initiate analysis of the conversation content.

By decomposing cell dump objects 606K into their constituent parts and generating appropriate new objects, the cell dump extractor 608K may enable the system to process and analyze the contents of mobile device extractions in a granular and efficient manner. This may enhance the system's ability to extract valuable information from complex, multi-format cell dump data, potentially improving the overall depth and accuracy of the data processing and analysis platform, particularly in contexts such as digital forensics or legal investigations.

The database classifier 608L may play a significant role in processing database objects 606L within the system. This module may be designed to handle various types of database formats, including but not limited to SQL databases, NoSQL databases, and other structured data storage systems.

When processing a database object 606L, the database classifier 608L may first identify the specific database format and structure. This may involve analyzing file headers, examining metadata, or using heuristics to determine the database type. Once the format is identified, the module may employ appropriate parsing techniques to extract and classify the data contained within the database.

In some cases, the database classifier 608L may generate CSV objects 606D based on the extracted database content. This process may involve several steps:

1. Table Identification: The module may identify individual tables or collections within the database structure. Each table may be treated as a separate entity for processing.

2. Schema Analysis: For each identified table, the database classifier 608L may analyze the schema to understand the structure of the data, including column names, data types, and relationships between fields.

3. Data Extraction: The module may extract the actual data from each table, preserving the relationships between fields as defined in the schema.

4. CSV Conversion: The extracted data may then be converted into CSV format. Each table in the database may potentially become a separate CSV object 606D. The first row of the CSV may contain the column headers derived from the table schema, followed by rows representing individual records from the database.

5. Metadata Generation: The database classifier 608L may generate additional metadata for each created CSV object 606D. This metadata may include information about the original database structure, table relationships, and any transformations applied during the conversion process.

In some implementations, the database classifier 608L may handle complex database structures with multiple interconnected tables. In such cases, it may generate multiple CSV objects 606D, each representing a different table from the original database. The module may also create additional CSV objects to represent the relationships between tables, potentially including foreign key mappings or join tables.

For databases containing large volumes of data, the database classifier 608L may implement streaming or batching techniques to process the data efficiently. This may allow the system to handle databases of varying sizes without overwhelming system resources.

As the database classifier 608L generates new CSV objects 606D, it may trigger events to notify other modules in the system about the availability of new structured data. For example, when a new CSV object is created from a database table, an event may be sent to the text entity identifier 608B to initiate entity extraction from the structured data.

In some cases, the database classifier 608L may work in conjunction with other modules to enhance its processing capabilities. For instance, it may coordinate with the text classifier 608C to categorize the content of text fields within the database, or with the image analyzer 608E to process any binary image data stored in the database.

By converting database objects 606L into CSV objects 606D, the database classifier 608L may enable the system to process and analyze structured data from various database sources in a consistent manner. This may enhance the system's ability to integrate database content with other types of data, potentially improving the comprehensiveness and accuracy of the overall data processing and analysis platform.

The audio transcoder 608F and audio classifier 608G may work in tandem to process and analyze audio content from various sources within the system. These modules may handle both standalone audio objects 606H and audio components extracted from video objects 606I.

The audio transcoder 608F may receive audio objects 606H directly from the platform storage 604 or from other ingest modules. In some cases, it may also receive audio streams extracted from video objects 606I by the video classifier 608H or video transcoder 608I. The audio transcoder 608F may perform several functions to prepare the audio data for further analysis:

1. Format Conversion: The audio transcoder 608F may convert audio files from various formats (e.g., MP3, WAV, AAC) into a standardized format for consistent processing.

2. Sample Rate Adjustment: It may resample audio to a uniform sample rate, ensuring compatibility with downstream processing modules.

3. Noise Reduction: The transcoder may apply noise reduction algorithms to improve audio quality, potentially enhancing the accuracy of subsequent transcription and classification tasks.

4. Audio Segmentation: For longer audio files, the transcoder may segment the audio into smaller chunks, facilitating parallel processing and analysis.

The processed audio data may then be passed to the audio classifier 608G for further analysis. The audio classifier 608G may perform multiple tasks on the received audio:

1. Speech Recognition: The classifier may employ advanced speech recognition algorithms to transcribe spoken content into text. This may include handling multiple languages, accents, and speaker diarization.

2. Audio Event Detection: It may identify and classify non-speech audio events, such as background noises, music, or specific sound effects.

3. Speaker Identification: In some implementations, the classifier may attempt to identify or distinguish between different speakers in the audio.

4. Emotion Analysis: The module may analyze speech patterns and tonal qualities to infer emotional states of speakers.

5. Language Identification: For multilingual content, the classifier may determine the language(s) spoken in the audio.

The audio classifier 608G may generate various outputs based on its analysis:

1. Text Objects 606C: The transcribed speech and any detected text-based information may be output as text objects 606C via point H. These text objects may then be processed by other modules such as the text entity identifier 608B or text classifier 608C for further analysis.

2. Metadata: The classifier may generate metadata about the audio, including information about detected audio events, speaker changes, emotional tones, or language switches. This metadata may be associated with the corresponding text objects or stored separately for use by other system components.

3. Output to Image/Video/Audio Transcript Search 610C: The audio classifier 608G may send its analysis results, including transcriptions, audio event classifications, and generated metadata, to the image/video/audio transcript search module 610C. This may enable the search module to index and make searchable the audio content alongside other data types in the system.

In some cases, the audio classifier 608G may implement machine learning models that can be updated or fine-tuned based on feedback from other system components or user interactions. This may allow the classifier to improve its accuracy over time and adapt to specific domains or use cases.

The collaboration between the audio transcoder 608F and audio classifier 608G may enable the system to extract valuable information from audio content, whether it originates from standalone audio files or as components of video files. This capability may enhance the system's ability to process and analyze multimodal data, potentially uncovering insights that might be missed when examining text or visual data alone.

The video classifier 608H and video transcoder 608I may work together to process and analyze video content within the system. These modules may handle video objects 606I, breaking them down into their constituent parts and extracting valuable information for further analysis.

The video transcoder 608I may receive video objects 606I directly from the platform storage 604 or from other ingest modules. This module may perform several preprocessing functions to prepare the video data for analysis:

1. Format Standardization: The video transcoder 608I may convert video files from various formats (e.g., MP4, AVI, MOV) into a standardized format for consistent processing.
2. Resolution Adjustment: It may resize video frames to a uniform resolution, ensuring compatibility with downstream processing modules.
3. Frame Rate Normalization: The transcoder may adjust the frame rate of videos to a standard rate, facilitating frame-by-frame analysis.
4. Codec Optimization: It may re-encode the video using optimal codecs for processing efficiency and quality preservation.

The processed video data may then be passed to the video classifier 608H for in-depth analysis. The video classifier 608H may perform multiple tasks on the received video:

1. Frame Extraction: The classifier may extract individual frames from the video at regular intervals or at key points of interest. These extracted frames may be output as new image objects 606G via point G, allowing them to be processed by the image analyzer 608E or other relevant modules.
2. Scene Detection: The module may identify distinct scenes or segments within the video based on visual changes, potentially creating logical breakpoints for analysis.
3. Object Recognition: It may employ computer vision algorithms to identify and track objects, people, or other elements of interest throughout the video.
4. Action Recognition: The classifier may analyze sequences of frames to detect and classify actions or events occurring in the video.
5. Text Detection and OCR: It may identify and extract any text visible in the video frames, potentially creating new text objects 606C for further processing.

The video classifier 608H may generate various outputs based on its analysis:

1. Image Objects 606G: As mentioned, extracted video frames may be output as new image objects via point G. These may include key frames representing significant moments in the video or frames containing objects of interest.
2. Metadata: The classifier may generate metadata about the video, including information about detected objects, actions, scene changes, and any extracted text. This metadata may be associated with the corresponding video object or stored separately for use by other system components.
3. Output to Image/Video/Audio Transcript Search 610C: The video classifier 608H may send its analysis results to the image/video/audio transcript search module 610C. This may include frame classifications, object detections, action recognitions, and any other relevant data extracted from the video. By providing this information to the search module, the system may enable more comprehensive and accurate video search capabilities.

In some implementations, the video classifier 608H may work in conjunction with the audio classifier 608G to provide a holistic analysis of the video content. For example, it may synchronize visual events with audio cues, enhancing the overall understanding of the video content.

The video classifier 608H may also implement adaptive thresholding techniques to determine when to extract frames or identify significant changes in the video. This may allow for more efficient processing by focusing on the most relevant parts of the video.

In some cases, the video classifier 608H may employ machine learning models that can be updated or fine-tuned based on feedback from other system components or user interactions. This may enable the classifier to improve its accuracy over time and adapt to specific types of video content or analysis requirements.

By decomposing video objects 606I into their constituent parts and generating appropriate new objects and metadata, the video classifier 608H and video transcoder 608I may enable the system to process and analyze video content in a granular and efficient manner. This may enhance the system's ability to extract valuable information from complex, multimodal video data, potentially improving the overall depth and accuracy of the data processing and analysis platform.

In some cases, the processed data may then flow to the image/video/audio transcript search module 610C. The image/video/audio transcript search module 610C may include two sub-components: the image/video audio embedding model 610C-1 and the image/video audio semantic search 610C-2. The embedding model 610C-1 may process the data from the ingest modules 608, creating embeddings that are then used by the semantic search component 610C-2 for semantic search capabilities.

In some cases, the image/video/audio transcript search module 610C may include time-indexed transcriptions for audio and video content. This may allow for precise alignment of transcriptions with the corresponding segments of the audio or video content, potentially enhancing the accuracy and usefulness of the transcriptions. For example, a user may be able to search for a specific phrase or word in the transcriptions and then quickly locate the corresponding segment in the audio or video content.

In yet other aspects, the system may store the time-indexed transcriptions in a platform storage 604 or another suitable storage medium. This may allow for efficient retrieval and use of the transcriptions in subsequent processing steps, such as entity identification and resolution, relationship graph construction, or timeline management. The system may also update the time-indexed transcriptions as new audio or video content is ingested and processed, ensuring that the transcriptions remain current and comprehensive.

The image/video/audio transcript search module 610C may play a crucial role in processing and analyzing multimodal data within the system. This module may leverage the combined capabilities of the image/video audio embedding model 610C-1 and the image/video audio semantic search 610C-2 to enable advanced semantic search functionalities across various data types.

The image/video audio embedding model 610C-1 may receive processed data from multiple sources, including image results from the image analyzer 608E, audio results from the audio classifier 608G, and video results from the video classifier 608H. This model may employ advanced machine learning techniques, such as deep neural networks, to generate high-dimensional vector representations (embeddings) of the input data.

For image data, the embedding model 610C-1 may create embeddings that capture visual features, object relationships, and semantic content. These embeddings may represent complex visual concepts in a format that facilitates efficient similarity comparisons.

In the case of audio data, the model may generate embeddings that encode acoustic properties, speech content, and other audio events. These embeddings may capture the semantic essence of spoken words, emotional tones, and non-speech audio elements.

For video data, the embedding model 610C-1 may produce embeddings that incorporate both visual and auditory information, potentially capturing temporal relationships and scene dynamics. These embeddings may represent the multimodal nature of video content, allowing for comprehensive semantic analysis.

The generated embeddings may then be passed to the image/video audio semantic search 610C-2 component. This component may utilize the embeddings to enable powerful semantic search capabilities across the processed multimodal data.

The semantic search component 610C-2 may employ various techniques to facilitate efficient and accurate searches:

1. Similarity Matching: It may use vector similarity measures (e.g., cosine similarity) to find content that is semantically similar to a given query, even if the exact keywords are not present.
2. Cross-modal Search: The component may enable searches that span different modalities. For example, a user may be able to search for videos using text queries, or find images that match the content of an audio description.
3. Concept-based Retrieval: By leveraging the semantic information encoded in the embeddings, the search component may allow users to search for abstract concepts or themes that may not be explicitly mentioned in the content.
4. Temporal Alignment: For time-based media like audio and video, the semantic search component may maintain temporal information, allowing for precise localization of search results within the content.

The image/video/audio transcript search module 610C may be connected to the frontend 624 via point D through an API. This connection may enable various user interactions with the search functionality:

1. Query Interface: The frontend may provide a user-friendly interface for submitting search queries, which may include text, images, audio snippets, or video clips.
2. Result Visualization: Search results may be presented in the frontend in a visually appealing and informative manner, potentially including thumbnails, previews, or relevant metadata.
3. Filtering and Sorting: Users may be able to refine search results based on various criteria, such as content type, date, or relevance scores.
4. Interactive Exploration: The frontend may allow users to explore related content or expand on search results, leveraging the semantic relationships captured by the embedding model.

The image/video/audio transcript search module 610C may also output results to the entity resolution module 612 via point C. This connection may serve several purposes:

1. Entity Context Enrichment: Search results may provide additional context to the entity resolution process, helping to disambiguate entities based on their occurrence in multimodal content.
2. Cross-reference Verification: The semantic search capabilities may help verify entity relationships by finding corroborating evidence across different types of content.
3. Timeline Enhancement: Search results may contribute to the construction and refinement of event timelines by providing temporally relevant multimodal data.
4. Relationship Discovery: The semantic search functionality may uncover non-obvious relationships between entities by identifying co-occurrences or thematic connections in the multimodal data.

By integrating advanced embedding techniques with powerful semantic search capabilities, the image/video/audio transcript search module 610C may significantly enhance the system's ability to process, analyze, and retrieve information from diverse multimodal sources. This may enable users to gain deeper insights and make more informed decisions based on the comprehensive analysis of complex, interconnected data.

Referring to FIG. 6C, the system diagram 600C illustrates a part of the platform for higher-level data processing. In this embodiment, the system may include several key components and processes that work together to process, analyze, and present information. These components may include a frontend 624, a chat service 620, a timeline manager 616, an entity resolution module 612, a relationship graph 614, a user notes module 622, and a maps API 618.

The entity resolution module 612 may include an entity store 612A, an event resolver 612B, a people/group resolver 612C, a place resolver 612D, and an object resolver 612E. This module may provide input to the relationship graph 614. The entity resolution module 612 may identify and resolve entities within the processed data, linking related entities across multiple documents. In some cases, the entity resolution module 612 may interact with the semantic search module 610B, via API calls, to retrieve additional contextual information that may aid in entity disambiguation.

The entity resolution module 612 may interact with the chat service 620 in various ways to enhance the accuracy and relevance of chat responses. In some aspects, the chat service 620 may query the entity resolution module 612 to obtain detailed information about entities mentioned in user queries or relevant to the conversation context.

For example, when a user asks a question through the chat interface 624D, the question answerer 620A may consult the entity resolution module 612 to identify and disambiguate entities mentioned in the query. The entity store 612A may provide comprehensive information about known entities, which may help the chat service 620 understand the user's intent more accurately.

In some cases, the people/group resolver 612C may assist the chat service 620 in identifying and providing information about specific individuals or organizations mentioned in the conversation. The place resolver 612D may help in clarifying geographic locations, while the object resolver 612E may provide context for physical items or concepts referenced in the chat.

The event resolver 612B may work in conjunction with the timeline sync 620D component of the chat service 620. This interaction may allow the chat service to provide temporally relevant information and align chat responses with the user's current position in a timeline view.

In some implementations, the chat service 620 may use the entity resolution module 612 to expand on entities mentioned in the conversation. For instance, if a user asks about a person, the chat service may retrieve additional information about related people, events, or places from the entity resolution module 612, potentially offering a more comprehensive response.

The user fact module 620C of the chat service 620 may also interact with the entity resolution module 612 to verify and cross-reference user-provided information against the known entity data. This interaction may help in maintaining consistency and accuracy in the knowledge base over time.

In some aspects, the suggestion generator 620E may leverage the entity resolution module 612 to provide relevant suggestions or follow-up questions based on the entities involved in the current conversation context. This may enhance the interactive nature of the chat service and guide users towards more insightful inquiries.

The chat history 620F may also benefit from interactions with the entity resolution module 612. As conversations progress, the chat service 620 may continuously update and refine its understanding of mentioned entities by consulting the entity resolution module 612, potentially improving the context and continuity of ongoing dialogues.

The entity store 612A may serve as a centralized repository for storing and managing information about various entities identified within the system. This component may maintain a comprehensive database of entities, including their attributes, relationships, and historical data. In some cases, the entity store 612A may employ advanced data structures and indexing techniques to facilitate rapid retrieval and efficient updates of entity information.

The entity store 612A may support versioning of entity data, allowing the system to track changes over time and maintain a historical record of entity evolution. This feature may be particularly useful for investigative purposes, enabling users to analyze how entities and their relationships have changed throughout the course of an investigation.

In some implementations, the entity store 612A may utilize a graph database structure to represent complex relationships between entities. This approach may allow for efficient traversal of entity networks and enable sophisticated query capabilities for relationship analysis.

The event resolver 612B may be responsible for identifying, disambiguating, and contextualizing events mentioned or implied in the processed data. This component may analyze temporal information, action descriptions, and entity interactions to construct a coherent representation of events.

The event resolver 612B may employ natural language processing techniques to extract event information from unstructured text. It may also integrate data from structured sources, such as timestamps or log entries, to build a comprehensive event timeline.

In some cases, the event resolver 612B may implement fuzzy matching algorithms to identify and merge references to the same event across multiple data sources. This capability may help in consolidating information and reducing redundancy in the event representation.

The people/group resolver 612C may focus on identifying and disambiguating references to individuals and organizations within the processed data. This component may employ various techniques to resolve entity mentions, including name matching algorithms, contextual analysis, and cross-referencing with external databases.

The people/group resolver 612C may handle challenges such as name variations, aliases, and ambiguous references. It may utilize machine learning models trained on large datasets to improve accuracy in entity resolution across diverse data sources.

In some implementations, the people/group resolver 612C may maintain relationship networks between individuals and organizations. This feature may enable the system to provide insights into social connections, organizational hierarchies, and group dynamics.

The place resolver 612D may be responsible for identifying and disambiguating geographic locations mentioned in the processed data. This component may handle various forms of location references, including place names, addresses, coordinates, and colloquial descriptions.

The place resolver 612D may integrate with geographic information systems (GIS) to provide rich contextual information about identified locations. It may support multiple levels of geographic granularity, from specific addresses to broader regions or countries.

In some cases, the place resolver 612D may implement algorithms for resolving ambiguous place names based on contextual cues. For example, it may distinguish between multiple cities with the same name by analyzing surrounding information or user context.

The object resolver 612E may focus on identifying and disambiguating references to physical objects, concepts, or other non-human entities within the processed data. This component may handle a wide range of object types, from tangible items like vehicles or weapons to abstract concepts or digital assets.

The object resolver 612E may employ ontology-based approaches to categorize and relate different types of objects. It may utilize knowledge graphs or semantic networks to represent relationships between objects and their attributes.

In some implementations, the object resolver 612E may integrate with external databases or knowledge bases to enrich object information. This may allow the system to provide detailed specifications, historical context, or related information about identified objects.

These components of the entity resolution module 612 may work in concert to provide a comprehensive and nuanced understanding of the entities, events, people, places, and objects mentioned in the processed data. Their combined capabilities may enable the system to construct rich, interconnected representations of the information landscape, supporting advanced analysis and insights generation.

The relationship graph 614 may include a relationship grapher 614A and a relationship resolver 614B. The relationship graph 614 may map relationships between entities based on the processed data. This may enable the system to reveal connections and patterns within the data that might not be apparent from examining individual data sources in isolation.

The relationship grapher 614A may be responsible for constructing and maintaining a graph-based representation of relationships between entities identified by the entity resolution module 612. This component may utilize various graph algorithms and data structures to efficiently store and query complex relationship networks.

In some implementations, the relationship grapher 614A may employ a multi-layered graph structure to represent different types of relationships. For example, one layer may represent direct connections between entities, while another layer may capture indirect or inferred relationships. This approach may allow for more nuanced analysis of entity interactions and networks.

The relationship grapher 614A may continuously update the graph structure as new information is processed by the entity resolution module 612. It may add new nodes to represent newly identified entities and create or modify edges to reflect changing relationships. In some cases, the grapher may also assign weights or attributes to edges, representing the strength or nature of relationships between entities.

The relationship resolver 614B may work in tandem with the relationship grapher 614A to analyze and interpret the constructed relationship graph. This component may employ various analytical techniques to extract meaningful insights from the graph structure.

In some aspects, the relationship resolver 614B may implement path-finding algorithms to identify connections between seemingly unrelated entities. It may discover indirect relationships by traversing multiple edges in the graph, potentially uncovering non-obvious links between individuals, organizations, or events.

The relationship resolver 614B may also employ clustering algorithms to identify groups of closely related entities within the larger graph structure. This capability may be useful for detecting communities, organizational structures, or patterns of association that may not be immediately apparent from individual entity data.

In some implementations, the relationship resolver 614B may utilize temporal analysis techniques to track how relationships evolve over time. It may identify emerging patterns, detect changes in relationship dynamics, or highlight significant shifts in entity associations.

The relationship grapher 614A and relationship resolver 614B may work together to process and analyze data from the entity resolution module 612. As the entity resolution module 612 identifies and resolves entities, the relationship grapher 614A may incorporate this information into the graph structure. For example, when the people/group resolver 612C identifies a new individual, the relationship grapher 614A may create a new node in the graph and establish connections based on the resolved entity information.

Similarly, when the event resolver 612B identifies a new event, the relationship grapher 614A may create nodes or edges to represent the event's relationship to involved entities. The place resolver 612D and object resolver 612E may contribute spatial and object-related information, respectively, which the grapher may use to enrich the graph structure with additional context.

As the graph evolves, the relationship resolver 614B may continuously analyze the updated structure to derive new insights. It may identify emerging patterns, detect anomalies, or generate hypotheses about potential relationships that warrant further investigation.

In some cases, the relationship resolver 614B may provide feedback to the entity resolution module 612, suggesting potential connections or inconsistencies that may require further analysis. This iterative process may help refine the entity resolution process and improve the overall accuracy of the relationship graph.

The combined capabilities of the relationship grapher 614A and relationship resolver 614B may enable the system to construct and analyze complex, multi-dimensional relationship networks based on the diverse entity data processed by the entity resolution module 612. This integrated approach may support advanced investigative techniques, pattern recognition, and predictive analytics across various domains and use cases.

In some aspects, the entity resolution module 612 may generate events when new relationships or entities are identified, which may trigger updates to the timeline manager 616. This process may allow for dynamic and real-time updates to timelines based on newly discovered information.

When the entity resolution module 612 identifies a new entity or relationship, it may create an event that is sent to the timeline manager 616. The timeline manager 616 may then process this event and determine how to incorporate the new information into existing timelines. For example, if a new event is identified by the event resolver 612B, the timeline manager 616 may add this event to relevant timelines, potentially adjusting the chronological order or relationships between other timeline elements.

The entity resolution module 612 may interact with the semantic search module 610B via an API call through point A. This connection may enable bidirectional information flow between these components. The semantic search module 610B may provide contextual information and relevant search results to aid in entity resolution tasks. Conversely, the entity resolution module 612 may feed resolved entity information back to the semantic search module 610B, potentially enhancing search accuracy and relevance.

The entity resolution module 612 may also work closely with the timeline manager 616. As new entities or relationships are resolved, the entity resolution module 612 may send updates to the timeline manager 616. The timeline manager 616 may then use this information to update existing timelines or create new ones. For instance, if the people/group resolver 612C identifies a new connection between individuals, the timeline manager 616 may update relevant timelines to reflect this relationship.

Furthermore, the entity resolution module 612 may interact with the chat service 620 through API calls. This interaction may allow the chat service 620 to leverage the entity resolution capabilities when processing user queries or generating responses. For example, when a user mentions an entity in a chat, the chat service 620 may consult the entity resolution module 612 to disambiguate the reference and provide accurate information.

The chat service 620 may also use the entity resolution module 612 to enhance its understanding of the conversation context. As users discuss various entities, events, or relationships, the chat service 620 may continuously update its knowledge by querying the entity resolution module 612. This may enable more intelligent and context-aware responses in the chat interface.

In some implementations, the entity resolution module 612 may provide real-time updates to both the timeline manager 616 and the chat service 620 as new information is processed. This may allow for dynamic updates to timelines and chat responses, ensuring that users have access to the most current and accurate information available in the system.

The interconnected nature of these components—the entity resolution module 612, semantic search module 610B, timeline manager 616, and chat service 620—may create a robust ecosystem for processing, analyzing, and presenting complex information. This integration may enable the system to provide users with comprehensive, up-to-date, and contextually relevant information across various interfaces and functionalities.

The timeline manager 616 may include a timeline viewer 616A, a timeline editor 616B, a timeline builder 616C, and a timeline exporter 616D. The timeline manager 616 may interact with the frontend 624, the maps API 618, and the chat service 620 to provide interactive timelines of events based on the processed data. In some cases, the system may allow filtering of timelines based on cases or tags. This may enable users to focus on specific subsets of the data that are relevant to their needs.

The timeline manager 616 may serve as a central hub for creating, viewing, editing, and exporting timelines based on the processed data from the relationship graph 614 and entity resolution module 612. The components of the timeline manager 616 may work together to provide a comprehensive timeline management system.

The timeline builder 616C may be responsible for constructing timelines based on the relationships and entities identified by the relationship graph 614 and entity resolution module 612. It may receive data through API calls and process this information to create chronological sequences of events, entity appearances, and relationship developments. The timeline builder 616C may utilize various algorithms to determine the most relevant events and entities to include in a timeline, potentially considering factors such as user preferences, case relevance, or significance of the events.

The timeline viewer 616A may provide an interface for users to visualize and interact with the constructed timelines. It may offer various viewing options, such as linear timelines, branching timelines, or parallel timelines for comparing multiple entities or events. The timeline viewer 616A may also incorporate features like zooming, filtering, and highlighting to enhance user interaction with the timeline data.

The timeline editor 616B may allow users to modify and refine the automatically generated timelines. It may provide tools for adding, removing, or rearranging events, annotating timeline elements, or adjusting the relationships between events. The timeline editor 616B may also enable users to create custom timelines by selecting specific entities or events of interest.

The timeline exporter 616D may facilitate the sharing and distribution of timelines. It may offer options to export timelines in various formats, such as PDF, interactive HTML, or data formats compatible with other visualization tools. The timeline exporter 616D may also include features for customizing the appearance and content of exported timelines to suit different presentation needs.

The timeline manager 616 may be connected to several other components of the system via API calls, enabling rich interactions and data exchange:

1. Connection to the Maps API 618

The timeline manager 616 may interact with the maps API 618 to incorporate geographical information into timelines. This connection may allow the system to display location-based events on maps, potentially using the timeline map 618A component. For example, when a user selects an event in the timeline viewer 616A, the system may trigger an API call to the maps API 618 to display the relevant location on a map.

2. Connection to the Chat Service 620

The timeline manager 616 may exchange information with the chat service 620 through API calls. This interaction may enable features such as:

Allowing users to query timeline information through the chat interface

Updating timelines based on information discovered during chat interactions

Synchronizing the chat context with the current timeline view using the timeline sync 620D component For instance, when a user asks about events related to a specific entity through the chat interface, the chat service 620 may make an API call to the timeline manager 616 to retrieve relevant timeline data.

3. Connection to the Frontend 624

The timeline manager 616 may have extensive interactions with the frontend 624 through API calls. These connections may facilitate:

Displaying timelines in the timeline viewer 624A component of the frontend

Enabling timeline editing through the timeline editor 624B component

Exporting timelines via the timeline exporter 624C component

Integrating timeline data with other frontend components such as the map interface 624E or search interface 624F

For example, when a user interacts with the timeline editor 624B in the frontend, it may trigger API calls to the timeline editor 616B component of the timeline manager 616 to update the underlying timeline data.

The timeline manager 616 may also receive updates from the relationship graph 614 and entity resolution module 612 when new relationships or entities are identified. These updates may trigger the timeline builder 616C to incorporate new information into existing timelines or create new timeline entries.

In some implementations, the timeline manager 616 may employ caching mechanisms to store frequently accessed timeline data, potentially improving system performance and responsiveness. It may also implement version control features, allowing users to track changes to timelines over time or revert to previous versions if needed.

The timeline manager 616 may also provide APIs for external systems or applications to access and utilize timeline data, potentially enabling integration with third-party analytics tools or custom user interfaces.

The chat service 620 may be integrated into the system and may include a question answerer 620A, a search module 620B, a user fact module 620C, a timeline sync 620D, a suggestion generator 620E, and a chat history 620F. In some aspects, the chat service 620 may use the entity store 612A, the relationship graph 614, the timeline manager 616, and, via point A, the semantic search 610B as tools for generating responses to user queries. This may allow the chat service 620 to provide contextually relevant and accurate responses based on the processed data.

The question answerer 620A, search module 620B, user fact module 620C, timeline sync 620D, suggestion generator 620E, and chat history 620F may work together within the chat service 620 to provide a comprehensive and interactive user experience. These components may collaborate to process user queries, retrieve relevant information, and generate contextually appropriate responses.

The question answerer 620A may serve as the primary interface for interpreting user queries and formulating responses. It may utilize natural language processing techniques to understand the intent and context of user questions. When a user submits a query, the question answerer 620A may analyze the input and determine the most appropriate way to address the user's request.

The search module 620B may work in conjunction with the question answerer 620A to retrieve relevant information from the system's knowledge base. It may leverage the semantic search capabilities provided by the semantic search module 610B to find contextually relevant data across various sources. The search module 620B may also interact with other components of the system, such as the entity resolution module 612 and the relationship graph 614, to gather comprehensive information related to the user's query.

The user fact module 620C may maintain a repository of user-specific information and preferences. This module may interact closely with the user notes module 622, particularly the user notes database 622B, to store and retrieve user-provided facts, corrections, and preferences. When generating responses, the question answerer 620A may consult the user fact module 620C to ensure that the information provided is consistent with the user's previous interactions and known preferences.

The timeline sync 620D may facilitate the integration of temporal context into the chat interactions. It may communicate with the timeline manager 616 to align the chat conversation with relevant timeline data. This synchronization may allow the chat service 620 to provide temporally relevant information and to update its responses based on the user's current position within a timeline view.

The suggestion generator 620E may analyze the ongoing conversation context, user history, and available data to propose relevant follow-up questions or topics. It may work in tandem with the search module 620B and the user fact module 620C to generate suggestions that are both informative and personalized to the user's interests and previous interactions.

The chat history 620F may maintain a record of past conversations and user interactions. This component may play a crucial role in providing context for ongoing conversations and may help in personalizing responses over time. The chat history 620F may also interact with the user notes module 622, potentially storing relevant parts of the conversation in the user notes database 622B for future reference.

In terms of interaction with the user notes module 622, these components of the chat service 620 may work together in several ways:

1. The question answerer 620A and search module 620B may query the user notes database 622B through the user notes API 622A to retrieve relevant user-specific information when formulating responses.
2. The user fact module 620C may regularly update the user notes database 622B with new facts or preferences learned during chat interactions. It may use the user notes API 622A to store this information in a structured and retrievable format.
3. The timeline sync 620D may utilize the user notes API 622A to store or retrieve temporal markers or preferences related to timeline views, potentially enhancing the user's experience when revisiting timeline-related conversations.
4. The suggestion generator 620E may analyze the content stored in the user notes database 622B to generate more personalized and relevant suggestions for follow-up questions or topics.
5. The chat history 620F may use the user notes API 622A to store significant parts of conversations or key insights derived from chat interactions. This may allow for easy retrieval of past discussions and may help in maintaining continuity across multiple chat sessions.

By working together and interacting with the user notes module 622, these components of the chat service 620 may create a more personalized, context-aware, and user-friendly chat experience. The system may adapt to individual user preferences, maintain consistency across interactions, and provide increasingly relevant and accurate responses over time.

The user notes module 622 may include a user notes API 622A and a user notes database 622B. This module may store user corrections and preferences for future chat interactions. For example, if a user corrects a fact presented by the chat service 620, the user notes module 622 may store this correction and use it to improve future responses.

The user notes API 622A may serve as the interface for various components of the system to interact with the user notes database 622B. This API may provide methods for creating, reading, updating, and deleting user-specific information, preferences, and corrections. The user notes API 622A may implement authentication and authorization mechanisms to ensure that only authorized components and users can access or modify the stored data.

In some cases, the user notes API 622A may offer advanced querying capabilities, allowing other system components to retrieve relevant user notes based on specific criteria such as timestamp, associated entities, or topic categories. The API may also support batch operations, enabling efficient processing of multiple user notes in a single request.

The user notes database 622B may store a wide range of user-generated content and system-derived information. This may include explicit corrections provided by users, implicit preferences inferred from user behavior, and annotations or comments added to specific pieces of information within the system. The database schema may be designed to efficiently store and retrieve this diverse set of data, potentially using a flexible structure such as a document-oriented database or a graph database to capture complex relationships between user notes and other system entities.

When a user provides a correction or addition through the chat interface 624D or other frontend components, the system may trigger a series of events to update and propagate this information:

1. The user input may be initially processed by the chat service 620 or the relevant frontend component.
2. The processed input may be sent to the user notes API 622A, which may create a new entry in the user notes database 622B.
3. The creation of this new user note may trigger an event that is broadcast to relevant system components, including the entity resolution module 612 and the relationship graph 614.
4. The entity resolution module 612 may receive this event and analyze the new user note to determine if it contains information about new entities or updates to existing entities. For example, if a user corrects the spelling of a person's name, the people/group resolver 612C may update the corresponding entity in the entity store 612A.
5. If the user note contains information about a new event, the event resolver 612B may create a new event entry and associate it with relevant entities.
6. The relationship graph 614 may also receive the event triggered by the new user note. The relationship grapher 614A may analyze the note to identify any new or modified relationships between entities. For instance, if a user specifies that two previously unconnected individuals are siblings, the relationship grapher 614A may create a new edge in the graph representing this familial relationship.

7. The relationship resolver 614B may then update its understanding of entity relationships based on this new information, potentially uncovering new patterns or connections in the data.

8. These updates to the entity resolution module 612 and relationship graph 614 may, in turn, trigger events that propagate to other system components. For example, the timeline manager 616 may receive an event indicating a new relationship has been established, prompting it to update relevant timelines.

9. The semantic search module 610B may also be notified of these updates, allowing it to incorporate the new or corrected information into its search index, potentially improving the accuracy of future search results.

In some implementations, the system may employ a confidence scoring mechanism for user-provided corrections or additions. Information with higher confidence scores, such as corrections from trusted users or corroborated by multiple sources, may be given more weight in updating the entity resolution module 612 and relationship graph 614.

The system may also implement a review process for significant changes derived from user notes. In such cases, the updates may be flagged for review by a system administrator or analyst before being fully incorporated into the entity resolution module 612 and relationship graph 614.

By leveraging user corrections and additions to drive updates across the system, the platform may continuously improve its accuracy and comprehensiveness. This feedback loop between user interactions and core data structures may enable the system to adapt and evolve based on user expertise and emerging information, potentially enhancing its overall effectiveness in processing and analyzing complex datasets.

In some aspects, the system may provide a maps API 618, which includes a timeline map 618A and a user map 618B. These components may, via API, interact with the map interface 624E in the frontend 624, providing visual representations of the processed data and the relationships between entities.

The maps API 618 may serve as a powerful visualization tool within the system, integrating geographical data with temporal information and entity relationships. The timeline map 618A and user map 618B components may work in tandem to provide a comprehensive, interactive representation of data processed by the timeline manager 616, entity resolution module 612, and relationship graph 614.

The timeline map 618A may focus on presenting chronological data in a geographical context. It may overlay timeline events from the timeline manager 616 onto a map interface, allowing users to visualize how events unfold across both time and space. In some implementations, the timeline map 618A may include features such as:

1. Event markers: The component may place markers on the map to represent individual events from the timeline. These markers may be color-coded or use different icons to indicate event types or categories.

2. Temporal controls: Users may be able to adjust the time range displayed on the map, potentially using slider controls or date selectors. This may allow for dynamic visualization of how events and entity locations change over time.

3. Event paths: For entities that move across locations over time, the timeline map 618A may draw paths on the map, illustrating the chronological progression of an entity's movements.

4. Clustering: When dealing with a high density of events in a particular area, the component may implement clustering algorithms to group nearby events, preventing visual clutter and improving performance.

The user map 618B may complement the timeline map 618A by focusing on user-specific data and preferences. This component may incorporate information from the user notes module 622 and the entity resolution module 612 to provide a personalized mapping experience. Features of the user map 618B may include:

1. Custom layers: Users may be able to create and toggle custom map layers, allowing them to focus on specific types of entities or relationships relevant to their investigation or analysis.

2. Saved views: The component may allow users to save specific map configurations, including zoom levels, visible layers, and time ranges, for quick access in future sessions.

3. Entity highlighting: Based on user preferences or recent interactions, the user map 618B may highlight specific entities or relationships on the map, drawing attention to areas of particular interest to the user.

4. Annotation tools: Users may be able to add personal annotations or markers to the map, which may be stored in the user notes database 622B for future reference.

Together, the timeline map 618A and user map 618B may work to present a rich, interactive visualization of timelines, entities, and relationships over time on a map interface. This integration may be achieved through several mechanisms:

1. Data synchronization: The maps API 618 may maintain a continuous connection with the timeline manager 616, entity resolution module 612, and relationship graph 614. When updates occur in these components, the maps API 618 may receive events triggering updates to the map visualizations.

2. Temporal alignment: As users interact with the timeline controls in the timeline map 618A, both map components may update simultaneously to reflect the selected time range. This may allow users to see how entity relationships and geographical distributions evolve over time.

3. Entity linking: When users select or hover over entities on either map component, the system may highlight related entities and connections across both the timeline map 618A and user map 618B. This may help users understand the spatial and temporal relationships between entities.

4. Filtering and querying: The maps API 618 may allow users to apply filters or perform queries that affect both map components simultaneously. For example, filtering for a specific entity type may update both the timeline events displayed in the timeline map 618A and the custom layers in the user map 618B.

5. Zoom level coordination: The timeline map 618A and user map 618B may maintain synchronized zoom levels and geographical focus, ensuring a consistent view as users navigate the map interface.

In some implementations, the maps API 618 may also provide additional features to enhance the integration of timeline and geographical data:

1. Heatmaps: The system may generate heatmaps based on event density or entity concentration over time, allowing users to quickly identify areas of high activity or interest.

2. Animated playback: Users may be able to initiate an animated playback of events and entity movements over time, providing a dynamic visualization of how situations evolve geographically.

3. Comparative views: The maps API 618 may support side-by-side or overlay comparisons of different time periods, allowing users to visually analyze changes in entity distributions or relationship patterns over time.

4. Data export: Users may be able to export map data, including custom annotations and filtered views, for use in external mapping or analysis tools.

By integrating these features and working closely with other system components, the maps API 618 may provide a powerful tool for visualizing and analyzing complex, interconnected data across both temporal and spatial dimensions. This may enhance users' ability to identify patterns, track entity movements, and understand the geographical context of events and relationships over time.

The frontend 624 may serve as the user interface for the system. It may include multiple modules, such as a timeline viewer 624A, a timeline editor 624B, a timeline exporter 624C, a chat interface 624D, a map interface 624E, a search interface 624F, a file browser 624G, a feedback interface 624H, and a product interface 624I. These modules may allow users to interact with the processed data in various ways, such as viewing and editing timelines, conducting searches, browsing files, providing feedback, and accessing product features.

The timeline viewer 624A may provide users with a visual representation of events, entities, and relationships over time. This component may offer various viewing modes, such as linear timelines, branching timelines, or parallel timelines for comparing multiple entities or events. Users may be able to zoom in and out of specific time periods, filter events based on categories or entities, and interact with individual timeline elements to access more detailed information. The timeline viewer 624A may also incorporate features like color-coding, icons, or tooltips to convey additional context about each event or entity on the timeline.

The timeline editor 624B may allow users to modify and refine the automatically generated timelines. This component may provide tools for adding new events, editing existing event details, or rearranging the order of events. Users may be able to create custom timelines by selecting specific entities or events of interest, or by merging multiple existing timelines. The timeline editor 624B may also include features for annotating timeline elements, adding supporting documentation or media files to events, and creating relationships between different timeline elements.

The timeline exporter 624C may facilitate the sharing and distribution of timelines created within the system. This component may offer options to export timelines in various formats, such as PDF, interactive HTML, or data formats compatible with other visualization tools. Users may be able to customize the appearance of exported timelines, including color schemes, fonts, and layout options. The timeline exporter 624C may also provide features for generating summary reports or presentations based on timeline data, potentially including key events, entity relationships, and analytical insights derived from the timeline.

The timeline viewer 624A, timeline editor 624B, and timeline exporter 624C may interact closely with the timeline manager 616 to provide a seamless user experience for viewing, editing, and exporting timelines. This interaction may occur through API calls and event-driven communication between the frontend 624 and the backend timeline manager 616.

The timeline viewer 624A may request timeline data from the timeline viewer 616A component of the timeline manager 616. When a user accesses the timeline viewer 624A in the frontend, it may send API calls to the timeline viewer

616A to retrieve the relevant timeline data. The timeline viewer 616A may process these requests, applying any necessary filters or transformations, and return the formatted timeline data to be displayed in the frontend.

As users interact with the timeline in the frontend, such as zooming, panning, or filtering, the timeline viewer 624A may send additional API calls to the timeline viewer 616A to request updated data. This may allow for dynamic and responsive timeline visualization without requiring the frontend to load all timeline data at once.

The timeline editor 624B may communicate with the timeline editor 616B component of the timeline manager 616. When users make changes to a timeline in the frontend, such as adding, editing, or deleting events, the timeline editor 624B may send API calls to the timeline editor 616B to update the underlying timeline data. The timeline editor 616B may process these edits, validate the changes, and update the timeline data stored in the system.

In some cases, the timeline editor 616B may also send events back to the frontend to notify the timeline editor 624B of any automatic adjustments or conflict resolutions that may have occurred during the editing process. This two-way communication may ensure that the frontend and backend timeline representations remain synchronized.

The timeline exporter 624C may interact with the timeline exporter 616D component of the timeline manager 616 to generate exportable versions of timelines. When a user initiates an export operation in the frontend, the timeline exporter 624C may send an API call to the timeline exporter 616D, specifying the desired export format and any customization options.

The timeline exporter 616D may then process this request, retrieving the necessary timeline data, applying the specified formatting and customization, and generating the exportable file. Once the export is complete, the timeline exporter 616D may send a response back to the timeline exporter 624C with a link or data stream for the exported file, which can then be presented to the user for download or further action.

In some implementations, the timeline manager 616 may also proactively send updates to the frontend components. For example, if the timeline builder 616C generates a new timeline or updates an existing one based on new data in the system, it may trigger an event that is sent to the relevant frontend components. This may allow the timeline viewer 624A, editor 624B, and exporter 624C to refresh their data and provide users with the most up-to-date timeline information.

The interaction between these components may also involve caching mechanisms to improve performance. The timeline manager 616 may cache frequently accessed timeline data, allowing for faster responses to API calls from the frontend components. Similarly, the frontend components may implement local caching to reduce the frequency of API calls for unchanged data.

By maintaining this close interaction between the frontend timeline components and the backend timeline manager 616, the system may provide users with a responsive, feature-rich, and consistent experience for working with timelines across viewing, editing, and exporting functionalities.

The chat interface 624D may provide a conversational user interface for interacting with the system. This component may allow users to input natural language queries, receive responses, and engage in dialogue-style interactions with the system's AI capabilities. The chat interface 624D may support features such as context-aware responses, suggestion of follow-up questions, and the ability to refine or expand on previous queries. It may also integrate with other system components, allowing users to initiate actions like searching for specific entities, updating timelines, or accessing detailed information about events or relationships through chat commands.

The chat interface 624D may work closely with the chat service 620 to provide users with an interactive and intelligent conversational experience. This integration may involve several key aspects:

1. Query Processing: When a user inputs a query through the chat interface 624D, it may be sent to the question answerer 620A component of the chat service 620. The question answerer 620A may analyze the query using natural language processing techniques to understand the user's intent and context.
2. Response Generation: The question answerer 620A may work in conjunction with the search module 620B to retrieve relevant information from the system's knowledge base. It may then formulate a response based on this information and send it back to the chat interface 624D for display to the user.
3. Context Awareness: The chat history 620F component may maintain a record of the ongoing conversation. This may allow the chat service 620 to understand and reference previous queries and responses, providing more contextually relevant answers as the conversation progresses.
4. User-Specific Information: The user fact module 620C may store and retrieve user-specific information and preferences. This may enable the chat service 620 to personalize responses and tailor information to the individual user's needs or previous interactions.
5. Timeline Integration: The timeline sync 620D component may allow the chat service 620 to align its responses with the user's current view or position within a timeline. This may enable users to ask questions about specific time periods or events directly from their timeline view.
6. Suggestions and Follow-ups: The suggestion generator 620E may analyze the conversation context and user queries to propose relevant follow-up questions or suggest related topics. These suggestions may be presented through the chat interface 624D, potentially guiding users towards more in-depth exploration of the data.
7. Multi-modal Interaction: The chat interface 624D may allow users to initiate actions in other parts of the system through chat commands. For example, a user may request to view a specific entity on the map or update a timeline entry. The chat service 620 may interpret these commands and coordinate with other system components to execute the requested actions.
8. Continuous Learning: The chat service 620 may incorporate machine learning techniques to improve its responses over time based on user interactions. The chat interface 624D may provide mechanisms for users to provide feedback on the quality or relevance of responses, which may be used to refine the chat service's performance.
9. Real-time Updates: As new information is added to the system or existing data is updated, the chat service 620 may incorporate this information into its responses in real-time. This may ensure that users receive the most current and accurate information through the chat interface 624D.

By leveraging these various components of the chat service 620, the chat interface 624D may provide users with a powerful and intuitive means of interacting with the system, accessing information, and performing complex analytical tasks through natural language conversations.

The map interface 624E may offer a geographical visualization of the data processed by the system. This component may integrate with the maps API 618 to display event locations, entity movements, and spatial relationships on interactive maps. Users may be able to toggle between different map views, such as satellite imagery or topographical maps, and apply various overlays to visualize data patterns. The map interface 624E may also support features like geofencing, distance measurements, and custom region definitions to enhance spatial analysis capabilities.

The search interface 624F may provide advanced search capabilities across all data processed by the system. This component may offer both simple keyword searches and complex query builders that allow users to construct multifaceted searches based on entities, relationships, events, or document properties. The search interface 624F may incorporate natural language processing to interpret user queries and may provide features like autocomplete, search suggestions, and faceted search results. It may also offer options for saving and sharing search queries, as well as visualizing search results in various formats such as lists, grids, or network graphs.

The file browser 624G may allow users to navigate and manage the documents and files ingested by the system. This component may provide a hierarchical view of files and folders, potentially mirroring the original structure of ingested data sources. Users may be able to preview file contents, access metadata, and initiate processing or analysis tasks directly from the file browser. The file browser 624G may also include features for tagging, categorizing, or annotating files, as well as tracking file versions and processing history.

The feedback interface 624H may provide mechanisms for users to submit feedback, corrections, or additional information to the system. This component may allow users to flag potential errors in entity resolution, suggest new relationships between entities, or provide context for ambiguous data points. The feedback interface 624H may include forms for structured feedback submission, as well as options for attaching supporting documentation or evidence. It may also provide a system for tracking the status of submitted feedback and notifying users when their input has been reviewed or incorporated into the system.

The product interface 624I may serve as a central hub for accessing various features and functionalities of the system. This component may provide a dashboard view of key metrics, recent activities, and system status updates. Users may be able to customize their workspace, manage preferences, and access user guides or tutorials through the product interface 624I. It may also include administrative features for user management, system configuration, and performance monitoring, depending on the user's role and permissions within the system.

Overall, the system diagram 600C illustrates a comprehensive system for processing and analyzing digital content, identifying and resolving entities, constructing a relationship graph, managing timelines, and providing interactive interfaces for user interaction. This system may enable efficient and effective analysis of complex, multimodal datasets for investigative or legal purposes.

In some aspects, the system may employ advanced artificial intelligence (AI) techniques, including large language models (LLMs), to perform various tasks. For instance, the text classifier 608C and the text entity identifier 608B, both part of the ingest modules 608, may utilize LLMs for classification and entity recognition tasks. These tasks may involve determining the type or category of a document or a page within a document, identifying entities such as people, places, objects, or events mentioned in the text, and linking related entities across multiple documents. The use of LLMs may enable the system to handle these tasks with a high degree of accuracy and efficiency, potentially improving the quality of the analysis and the usefulness of the results.

In some cases, the LLMs may be trained on large datasets, allowing them to learn complex patterns and relationships in the data. This may enable the LLMs to handle a wide range of tasks and to adapt to new tasks or data types with minimal additional training. For example, the LLMs may be capable of classifying a wide range of document types, from legal documents to social media posts, and of recognizing a wide range of entities, from common names and places to specialized terms or objects relevant to a particular investigation or legal case.

In other aspects, the system may be capable of handling diverse data types, including but not limited to text documents, images, audio files, video files, and social media content. The ingest modules 608 may include specialized modules for each data type, such as the text image extraction module 608D for text documents and images, the audio transcoder 608F and audio classifier 608G for audio files, and the video classifier 608H and video transcoder 608I for video files. Each of these modules may be designed to extract relevant information from the corresponding data type and to convert the extracted information into a format suitable for further processing and analysis.

In yet other aspects, the system may be capable of processing multimodal content, which includes content that combines multiple data types. For example, a video file may include both visual and audio content, and a social media post may include text, images, and possibly embedded audio or video content. The system may be capable of extracting and processing each type of content separately, and of correlating the extracted information across different types of content. This may enable the system to provide a comprehensive analysis of the multimodal content, potentially revealing valuable insights that might be missed when examining each type of content in isolation.

2.B. GUIs

FIGS. 7A-H depict GUIs 700A-700H of the platform, according to aspects of the present disclosure.

Figure 7A:
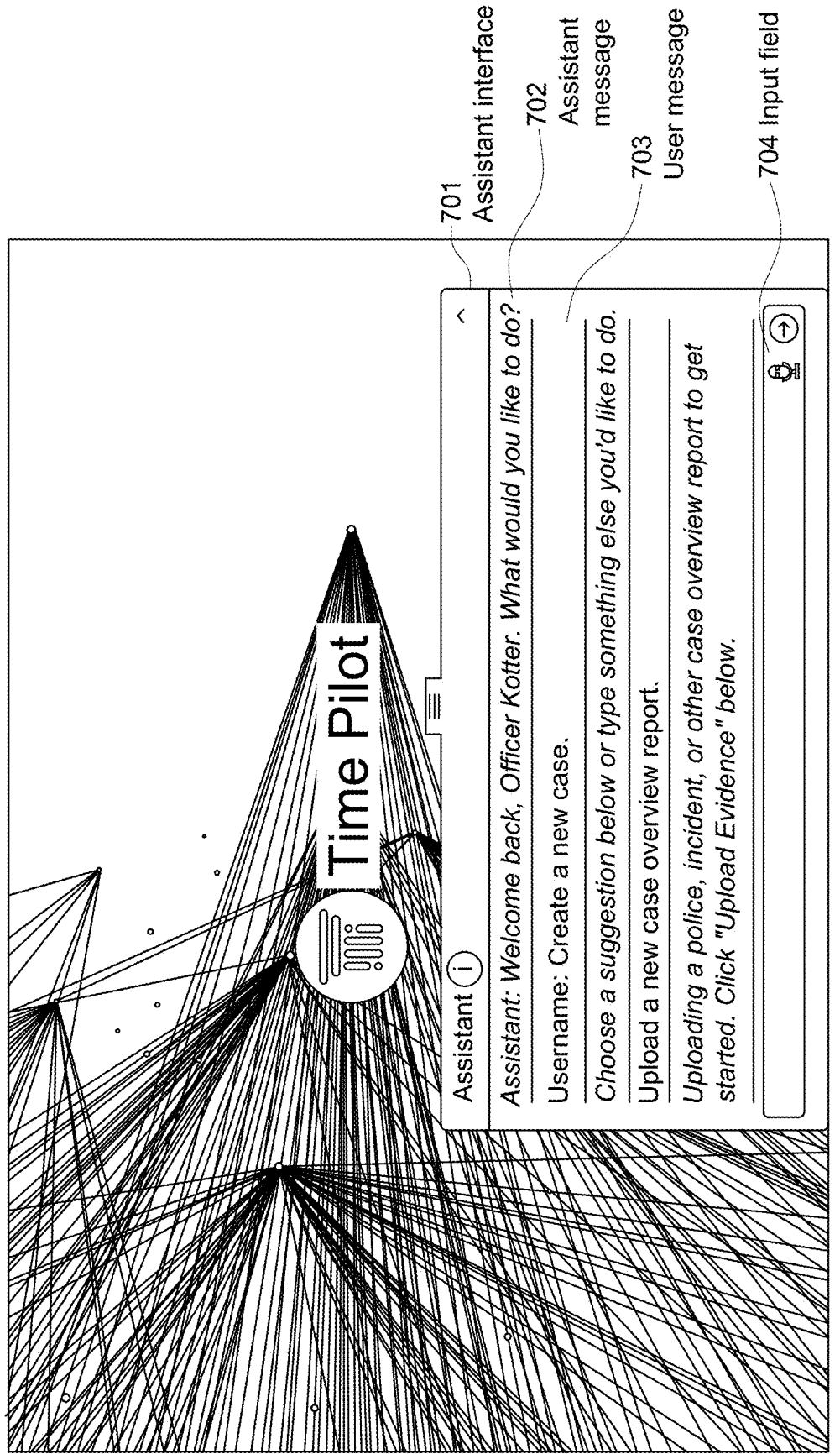
FIGS. 7A-H depict GUIs of the platform, according to aspects of the present disclosure.

FIG. 7A illustrates a landing GUI 700A of the platform. The landing GUI 700A may include an assistant interface 701 positioned in the center of the screen. The assistant interface 701 may contain several components that facilitate user interaction with the platform.

Within the assistant interface 701, an assistant message 702 may be displayed at the top. The assistant message 702 may welcome the user and ask what the user would like to do. Below the assistant message 702, a user message 703 may be shown. The user message 703 may indicate a request to create a new case.

The assistant interface 701 may also include an input field 704 at the bottom. The input field 704 may allow the user to type in commands or responses, enabling direct interaction with the assistant.

In some cases, the assistant interface 701 may present suggestions for actions the user can take, such as uploading a new case overview report. These suggestions may be presented as clickable options within the assistant interface 701.

The system may allow for user notes and corrections to be stored and recalled later by the chat service. In some cases, when a user provides a correction or additional information through the assistant interface 701, the system may store this information for future reference. The chat service may then recall and incorporate these user notes and corrections in subsequent interactions, potentially improving the accuracy and relevance of responses provided through the assistant interface 701.

Figure 7B:
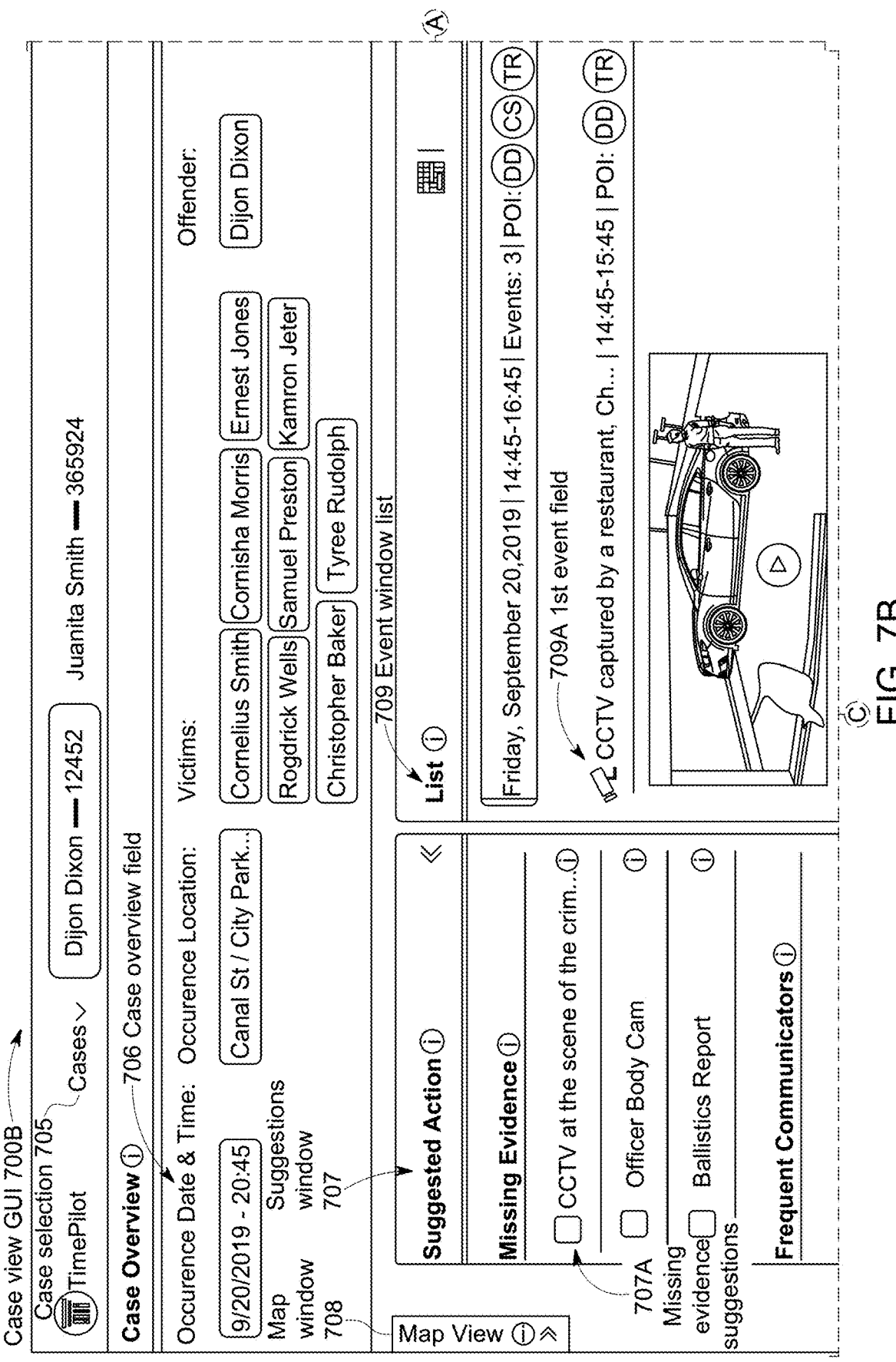
Figure 7B:
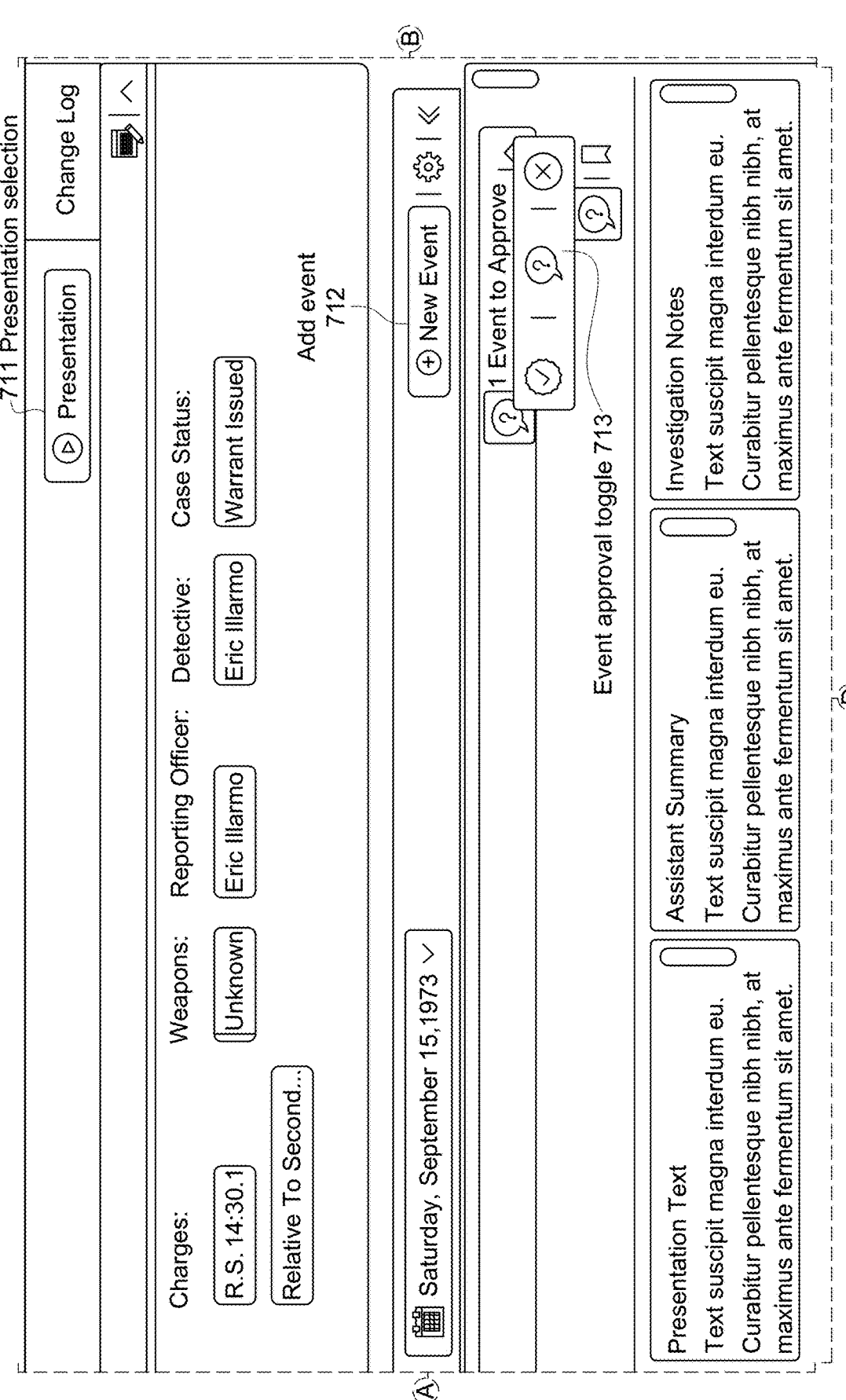
Figure 7B:
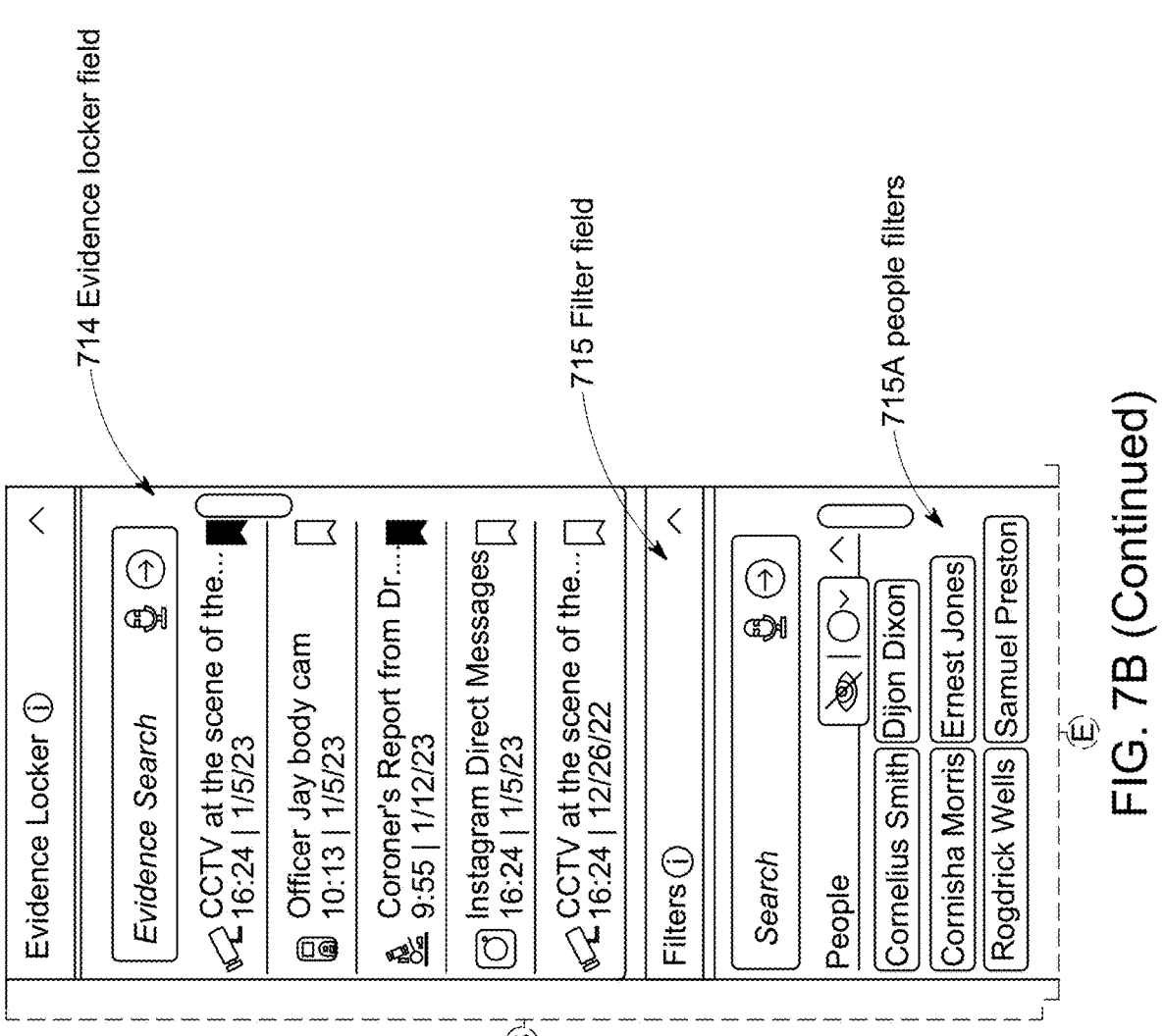
Figure 7B:
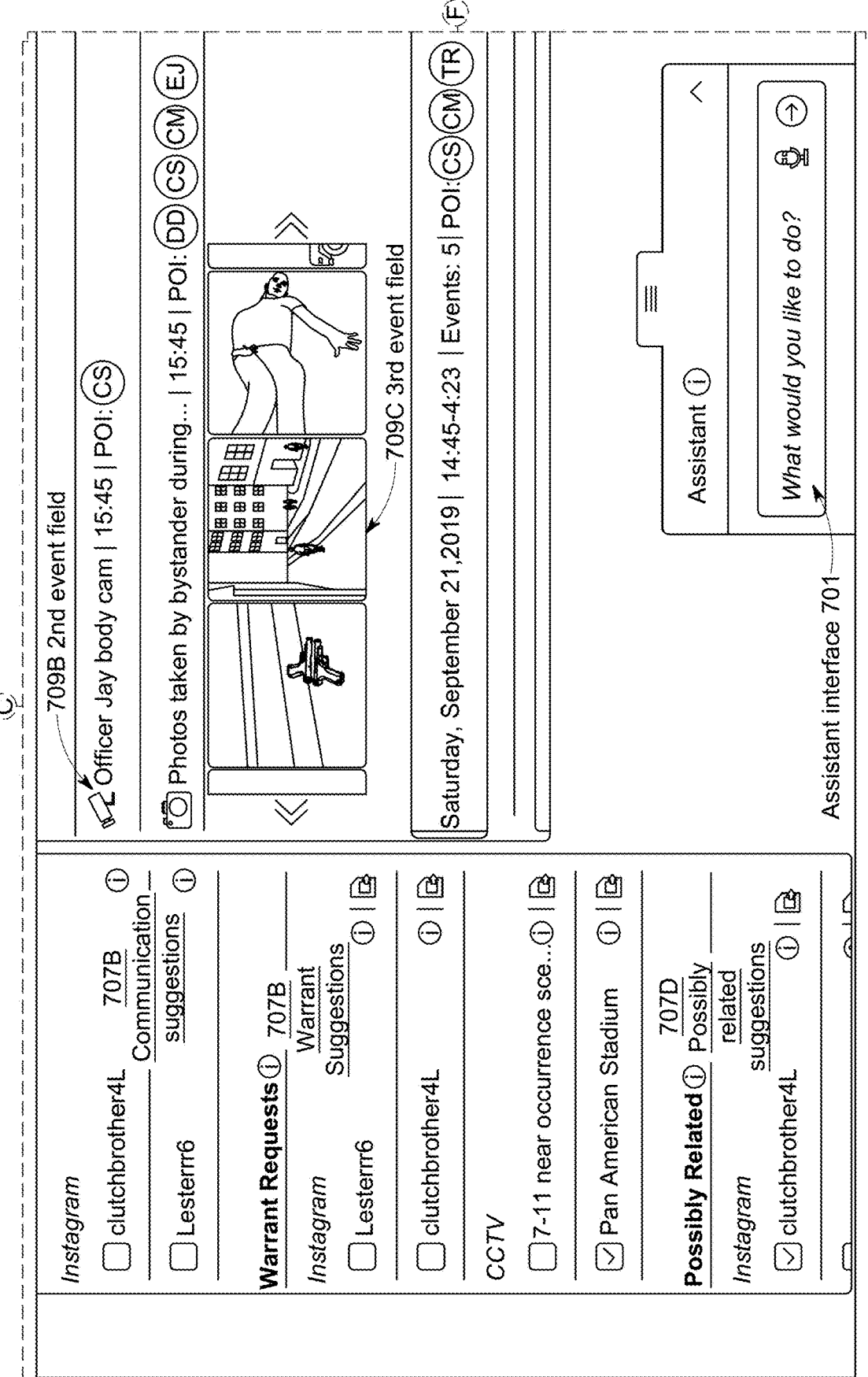
Figure 7B:
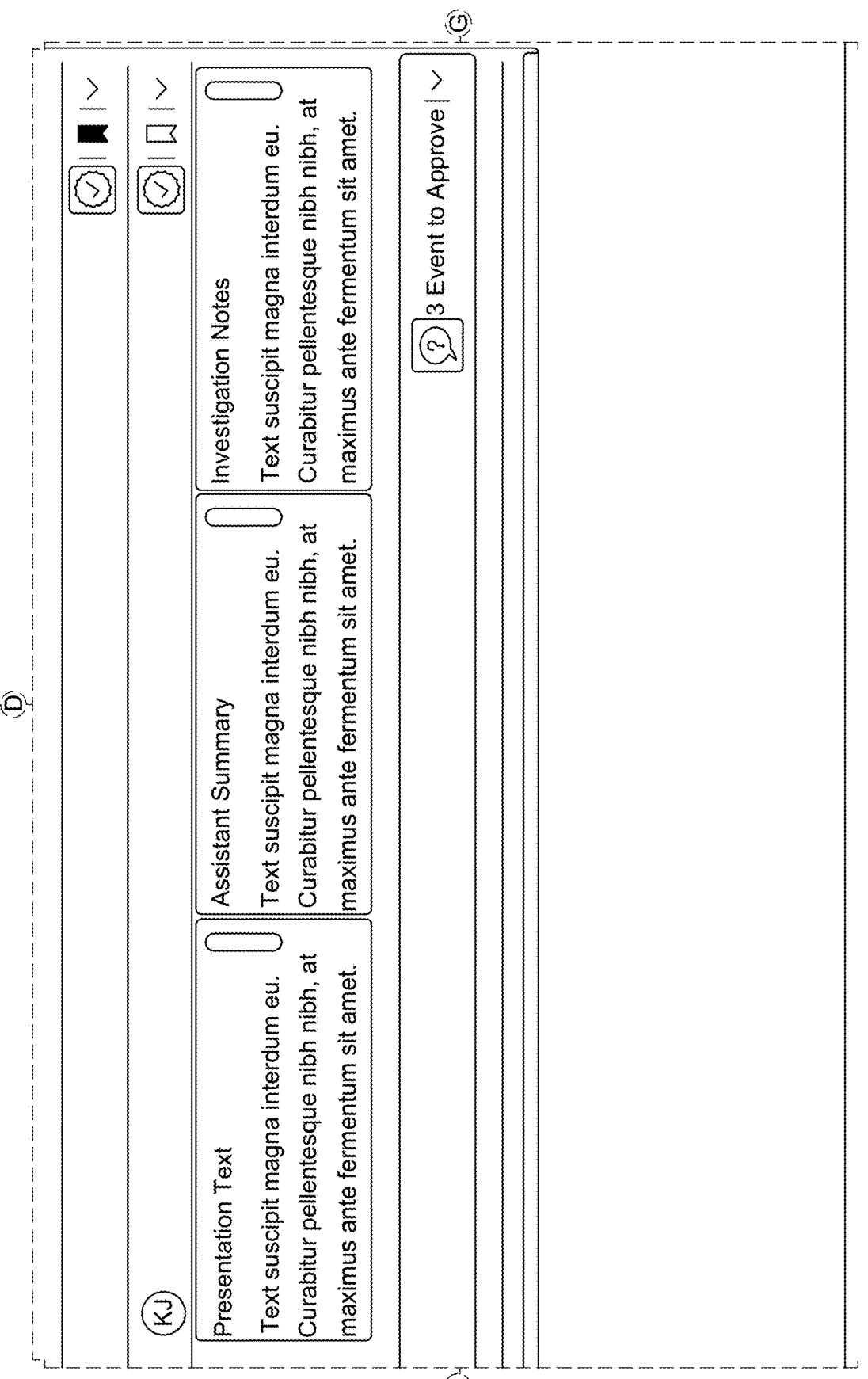

FIG. 7B illustrates a case view GUI 700B of a system for managing and analyzing case-related information. The case view GUI 700B may comprise several interconnected components designed to provide a comprehensive overview of a case and its associated data.

The case view GUI 700B may include a case selection 705 at the top, allowing users to choose and switch between different cases. Below this may be a case overview field 706, which may display key information about the selected case, such as occurrence date and time, location, victims, offenders, charges, and case status.

On the left side of the case view GUI 700B may be a suggestions window 707, which may contain several subsections: missing evidence suggestions 707A, communicators suggestions 707B, warrant suggestions 707C, and possibly related suggestions 707D. These sections may provide recommendations for further investigation or action.

A map window 708 may be positioned below the suggestions window 707, to display geographical information related to the case.

The central area of the case view GUI 700B may be occupied by an event list window 709, which may contain multiple event fields (709A, 709B, 709C) displaying chronological information about case-related events. Each event field may include details such as date, time, and a brief description of the event.

At the top of the event list window 709 may be several controls: a presentation selection 711, an add event button 712, and an event approval toggle 713. These may allow users to manage and organize the displayed events.

On the right side of the case view GUI 700B may be an evidence locker field 714, which may list various pieces of evidence associated with the case. Below this may be a filter field 715, which may include several subcategories: people filters 715A, places filters 715B, evidence type filters 715C, and communicators filters 715D. These filters may allow users to refine the displayed information based on specific criteria.

At the bottom of the case view GUI 700B may be the assistant interface 701, which may appear to be an AI-powered chat interface to assist users with case-related queries and tasks.

The overall layout of the case view GUI 700B may be designed to provide a comprehensive and interactive view of case information, allowing users to efficiently navigate, analyze, and manage complex case data.

In some cases, the system may include an entity store that resolves and links related entities across multiple documents. This entity store may work in conjunction with the various components of the case view GUI 700B to provide accurate and consistent information about entities mentioned in the case.

The system may also include a relationship graph that maps connections between entities based on processed content. This relationship graph may be utilized to populate the event list window 709 and the map window 708, showing how different entities and events are interconnected.

A timeline manager may be part of the system, constructing and updating timelines based on the relationship graph. The event list window 709 may display these timelines, allowing users to view the chronological progression of case-related events.

In some cases, the system may implement attribute-based and role-based access controls to manage user access to different cases and data. These access controls may determine what information is displayed in the case view GUI 700B based on the user's permissions and role within the organization.

The case view GUI 700B may integrate these various components and functionalities to provide a powerful tool for case management and analysis. By presenting a comprehensive view of case information, including suggestions, geographical data, event timelines, and evidence, the case view GUI 700B may enable users to gain deeper insights into complex cases and make more informed decisions.

Figure 7C:
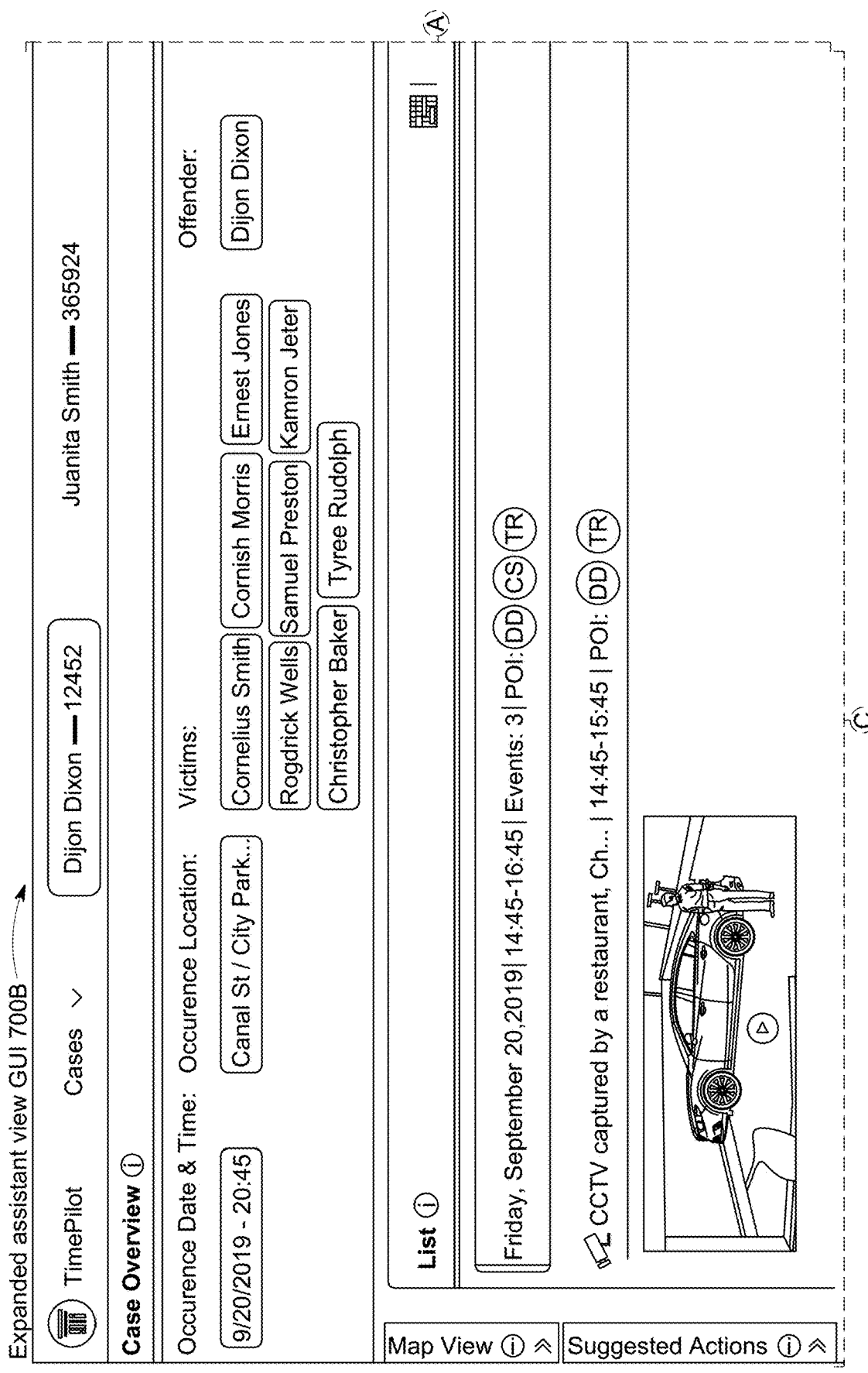
Figure 7C:
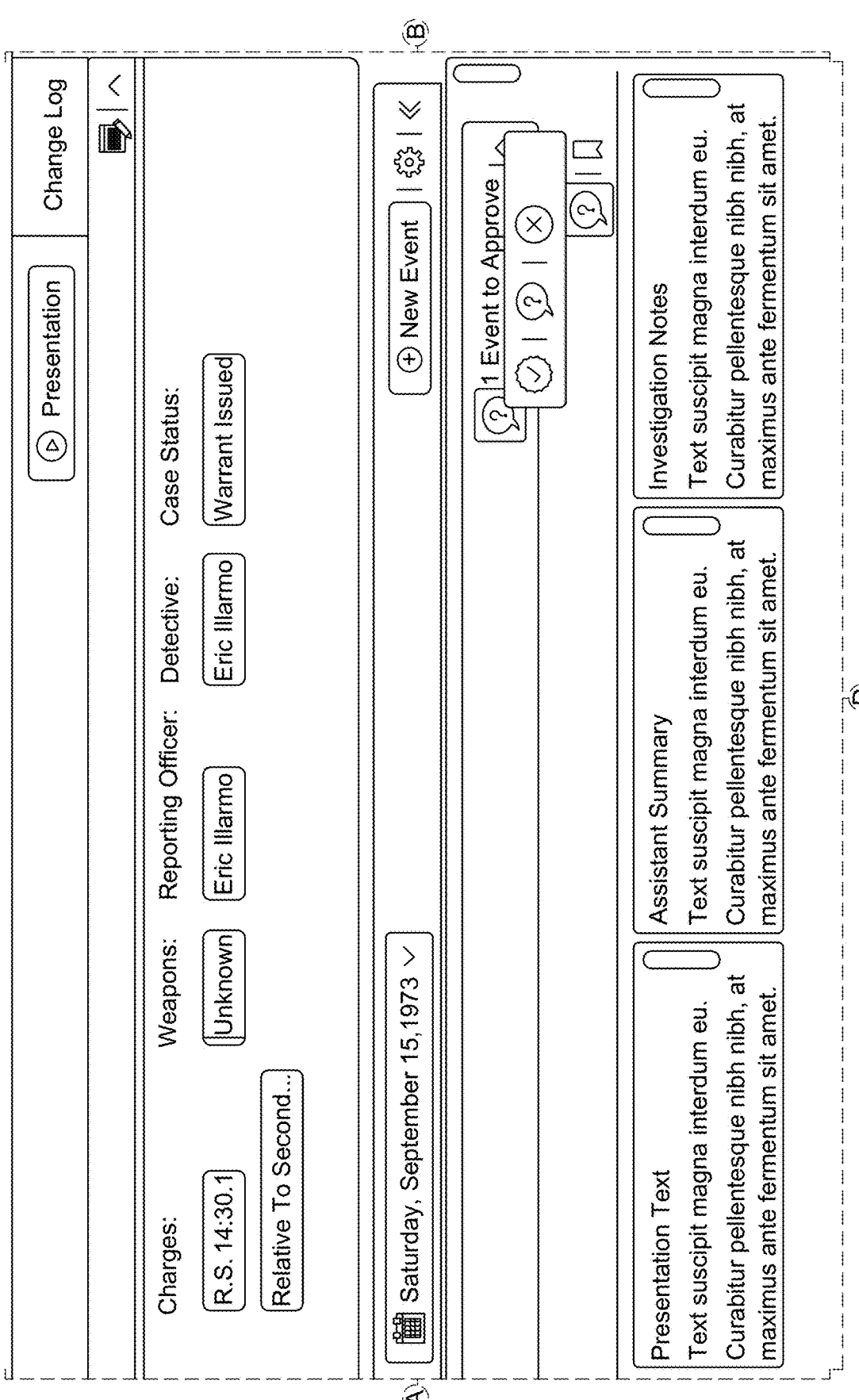
Figure 7C:
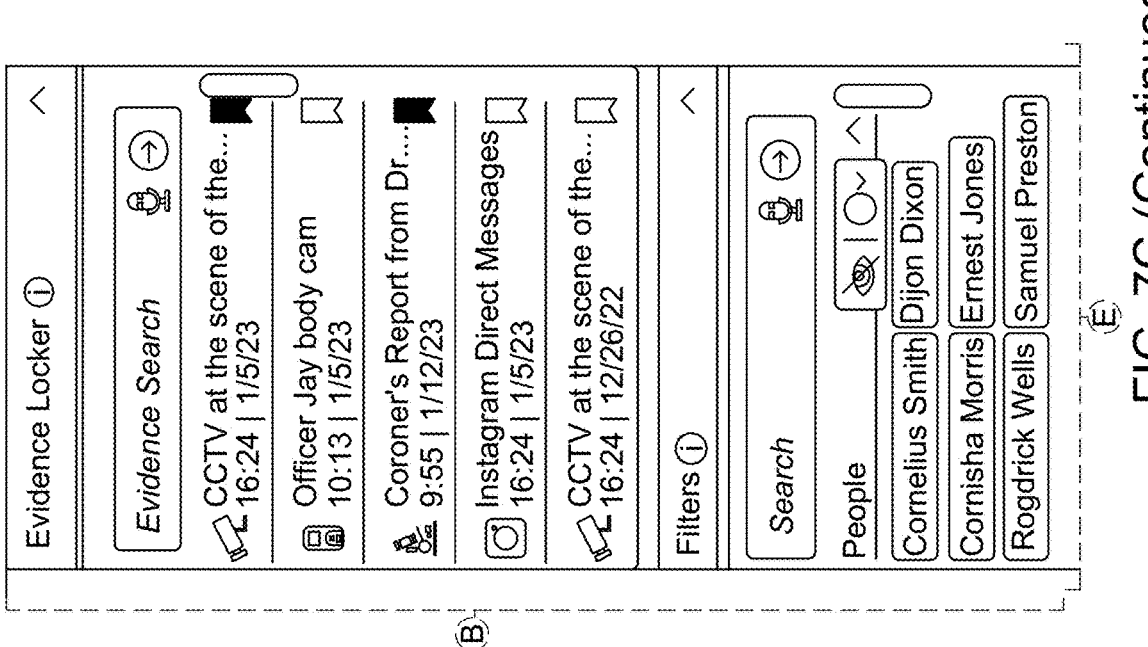
Figure 7C:
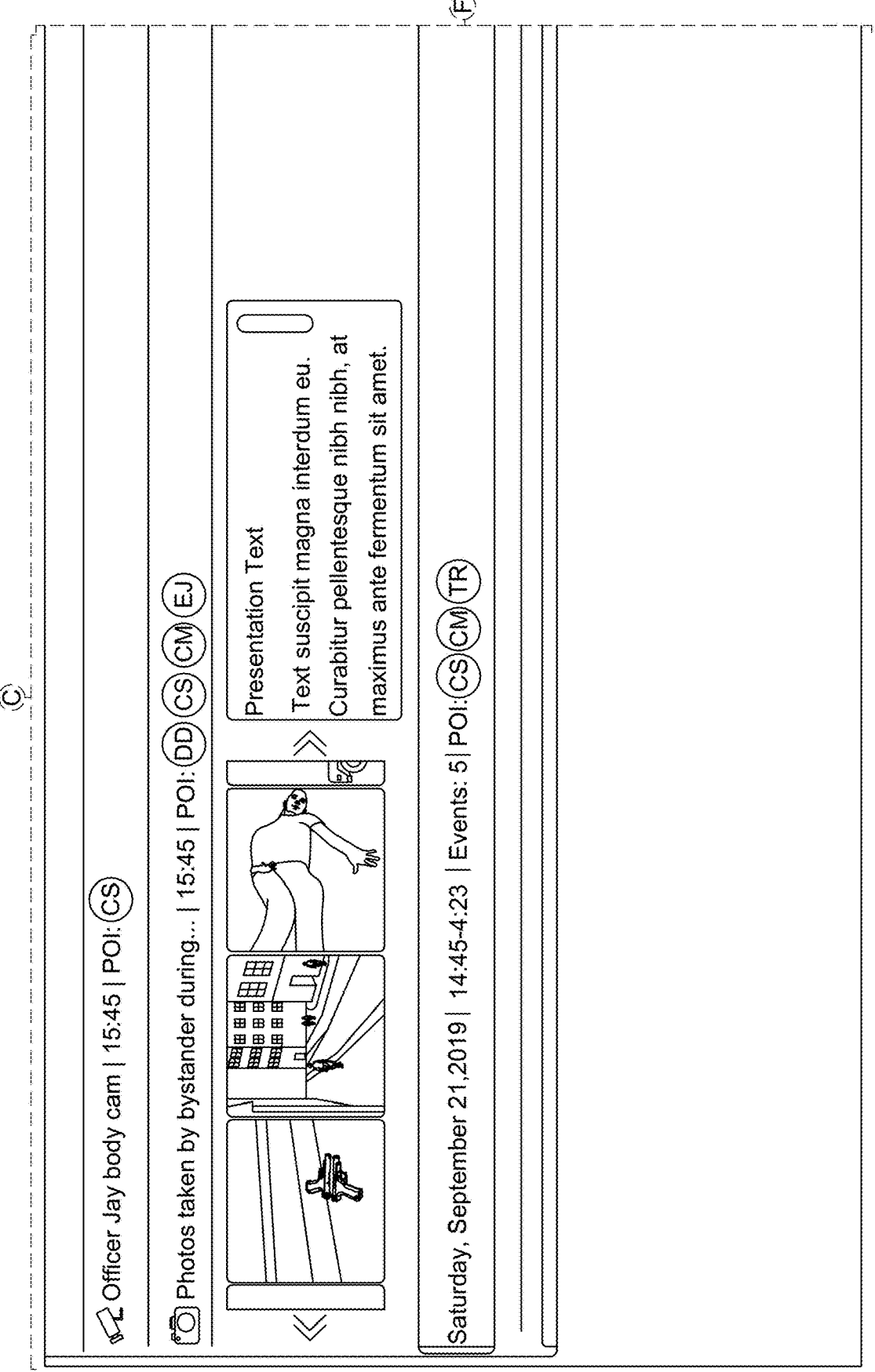
Figure 7C:
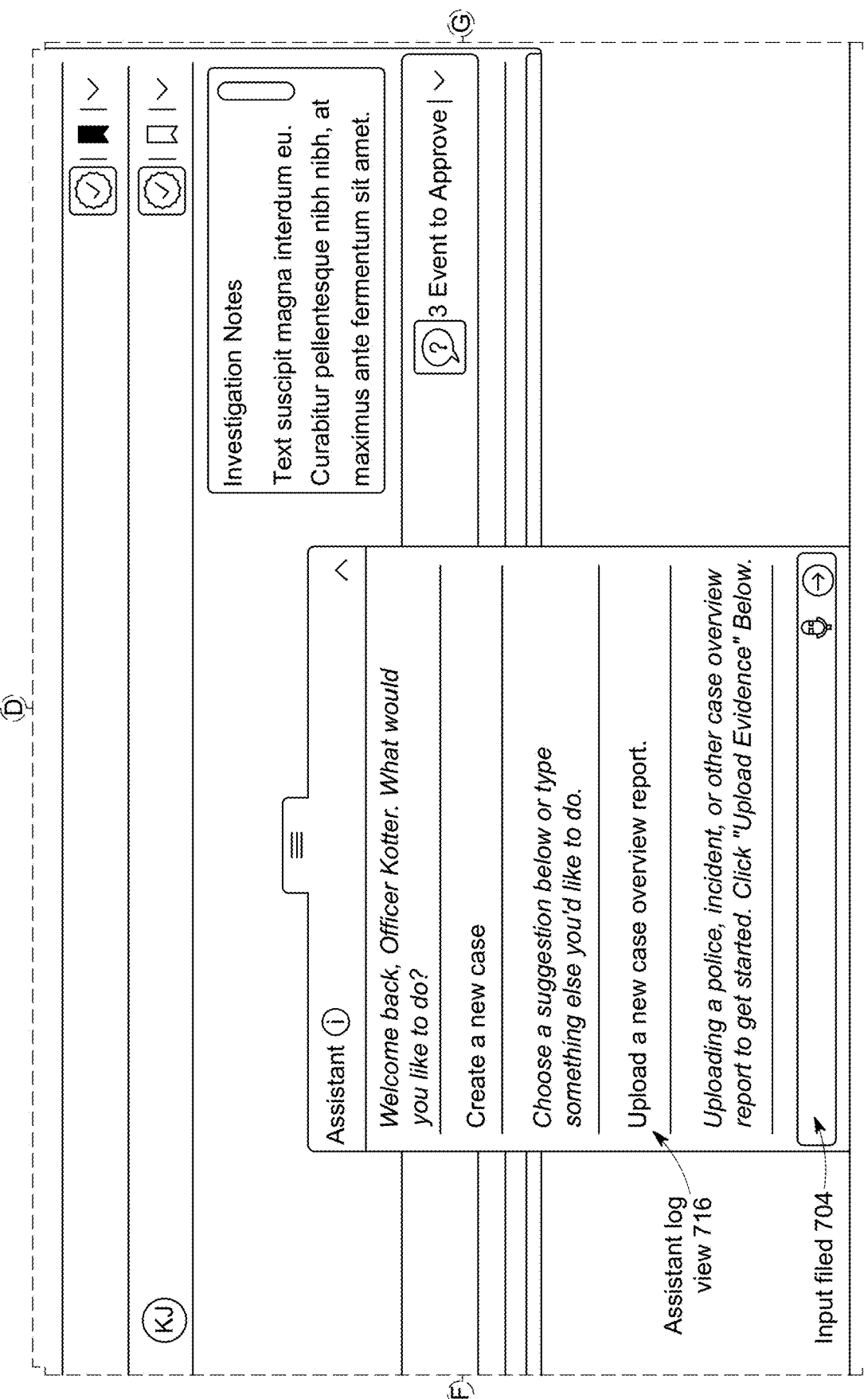
Figure 7C:
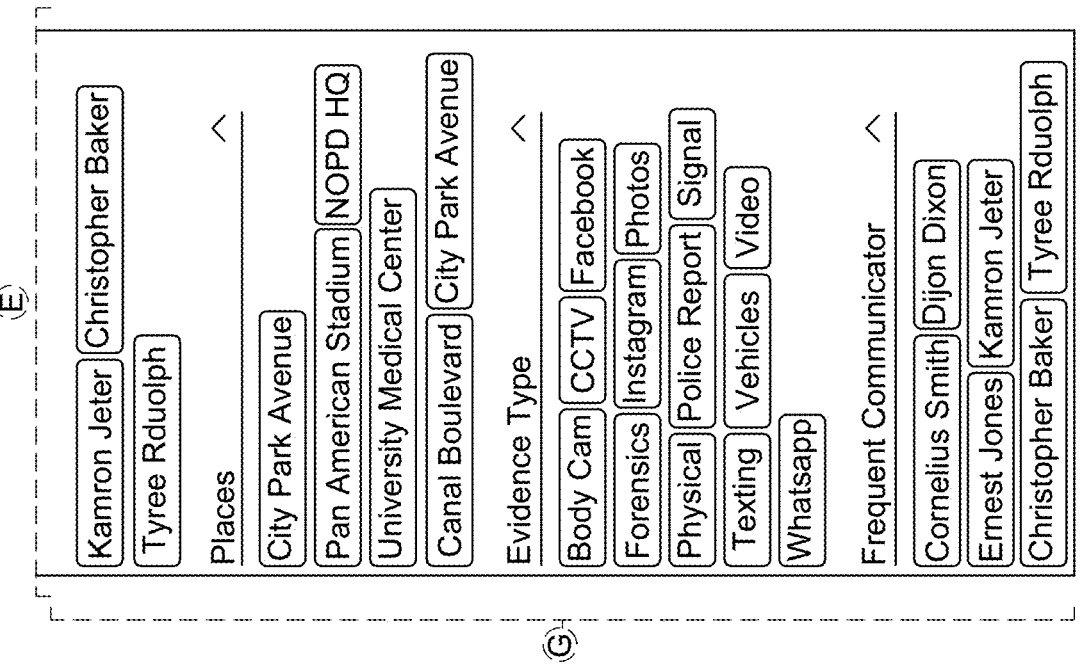

FIG. 7C illustrates an expanded assistant view GUI 700C of the platform. The expanded assistant view GUI 700C may provide an enhanced interface for user interaction with the system's AI assistant and facilitate various case management tasks.

The expanded assistant view GUI 700C may include an assistant chat log view 716, which may display a conversation history between the user and the AI assistant. The assistant chat log view 716 may show a series of messages exchanged between the user and the assistant, providing context for the ongoing interaction.

In some cases, the assistant chat log view 716 may display the assistant message 702 and the user message 703, similar to those shown in the landing GUI 700A. The assistant chat log view 716 may allow users to scroll through previous messages, enabling them to review earlier parts of the conversation or reference information provided by the assistant.

The expanded assistant view GUI 700C may also include the input field 704, positioned at the bottom of the interface. The input field 704 may allow users to type in queries, commands, or responses to interact with the AI assistant. Users may enter natural language questions or specific instructions related to case management tasks in the input field 704.

In some cases, the system may employ large language models (LLMs) to process and respond to user inputs entered in the input field 704. The LLMs may be used for tasks such as classification, entity recognition, and semantic search. For example, when a user enters a query about a specific case detail, the LLMs may analyze the input, classify the type of request, recognize relevant entities mentioned, and perform a semantic search to retrieve the most relevant information.

The expanded assistant view GUI 700C may provide a more comprehensive view of the assistant interface 701 compared to the landing GUI 700A or the case view GUI 700B. In some cases, the expanded assistant view GUI 700C may allow users to access additional features or information while maintaining the conversation with the AI assistant.

The assistant chat log view 716 and the input field 704 may work together to create a seamless interaction between the user and the AI assistant. As users enter queries or commands in the input field 704, the responses from the AI assistant may be displayed in the assistant chat log view 716, creating a continuous dialogue that may help users manage and analyze case information more effectively.

In some cases, the expanded assistant view GUI 700C may also display relevant case information alongside the chat interface. For example, the case overview field 706 may be visible, providing quick access to key case details while interacting with the AI assistant. The expanded assistant view GUI 700C may also include elements such as the evidence locker field 714 or the filter field 715, allowing users to reference or manipulate case data during the conversation with the AI assistant.

The combination of the assistant chat log view 716 and the input field 704 in the expanded assistant view GUI 700C may enhance user interaction with the AI assistant by providing a clear visual representation of the ongoing conversation and an intuitive method for user input. This interface may facilitate more efficient case management tasks by allowing users to leverage the AI assistant's capabilities while maintaining a comprehensive view of the case information.

Figure 7D:
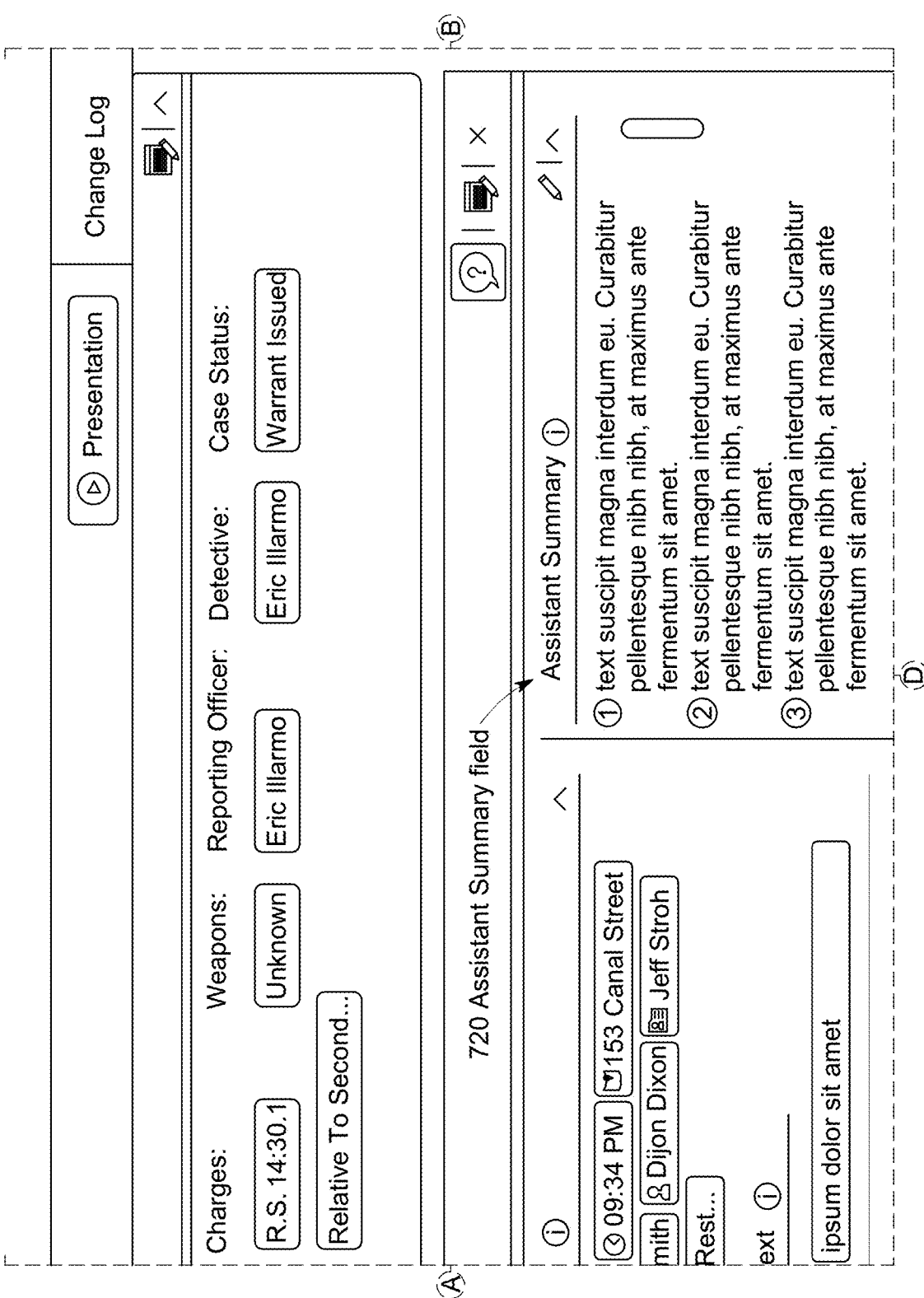
Figure 7D:
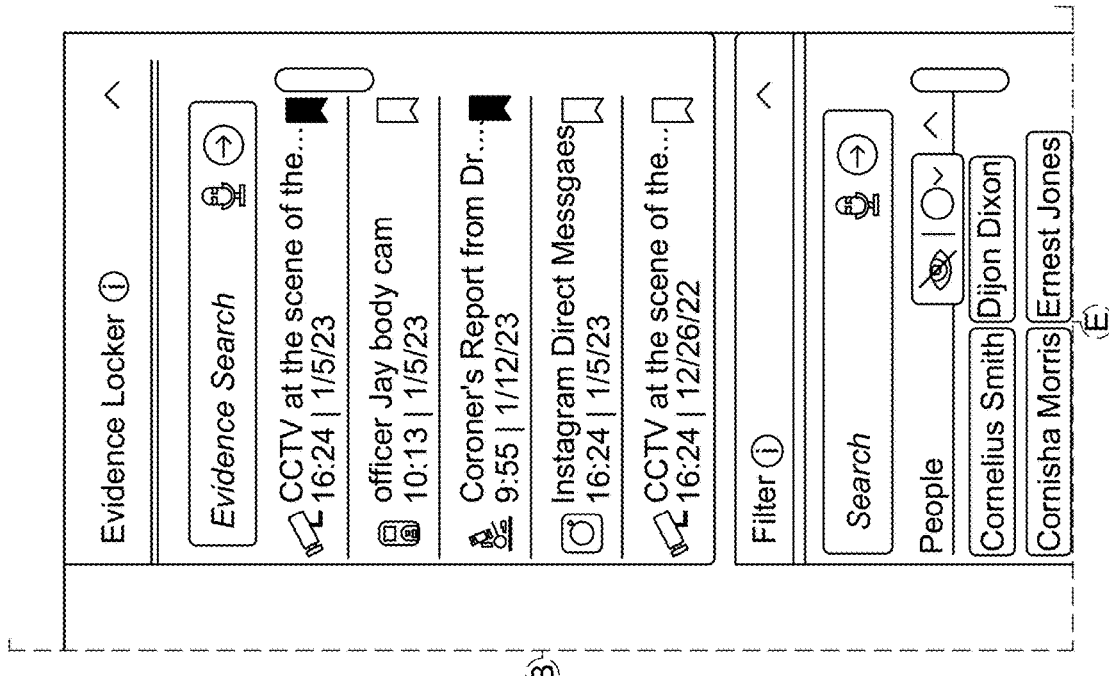
Figure 7D:
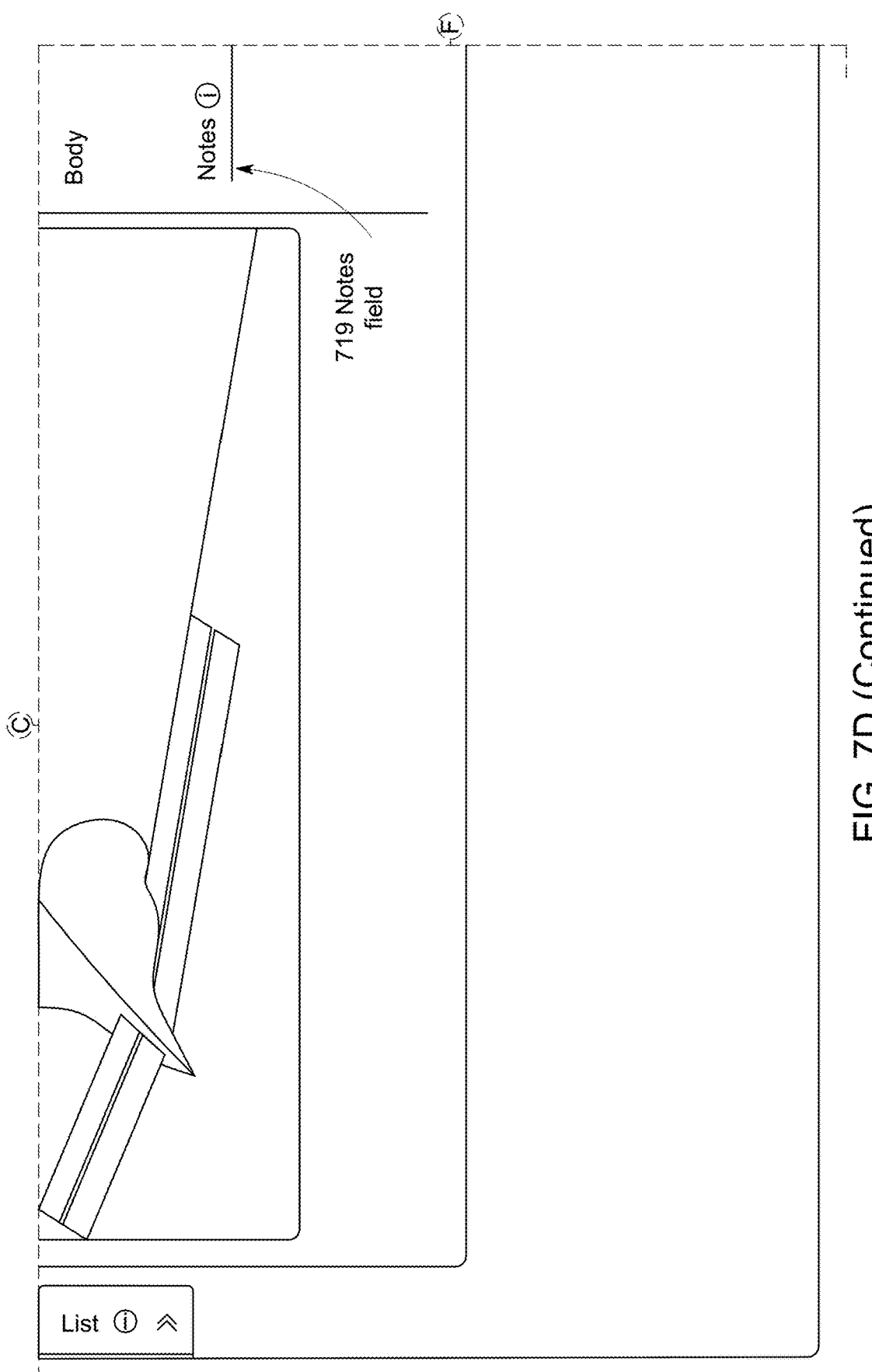
Figure 7D:
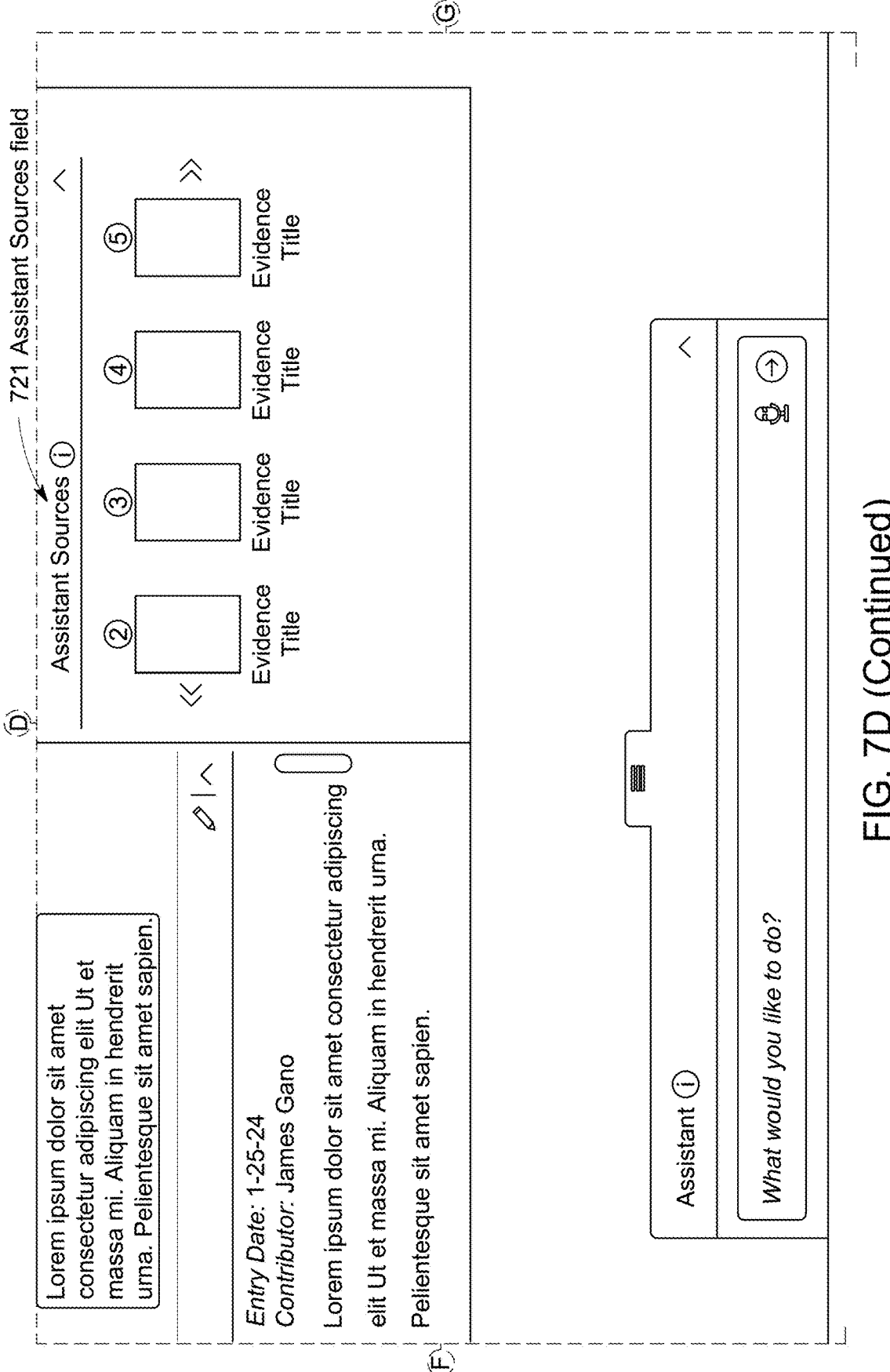
Figure 7D:
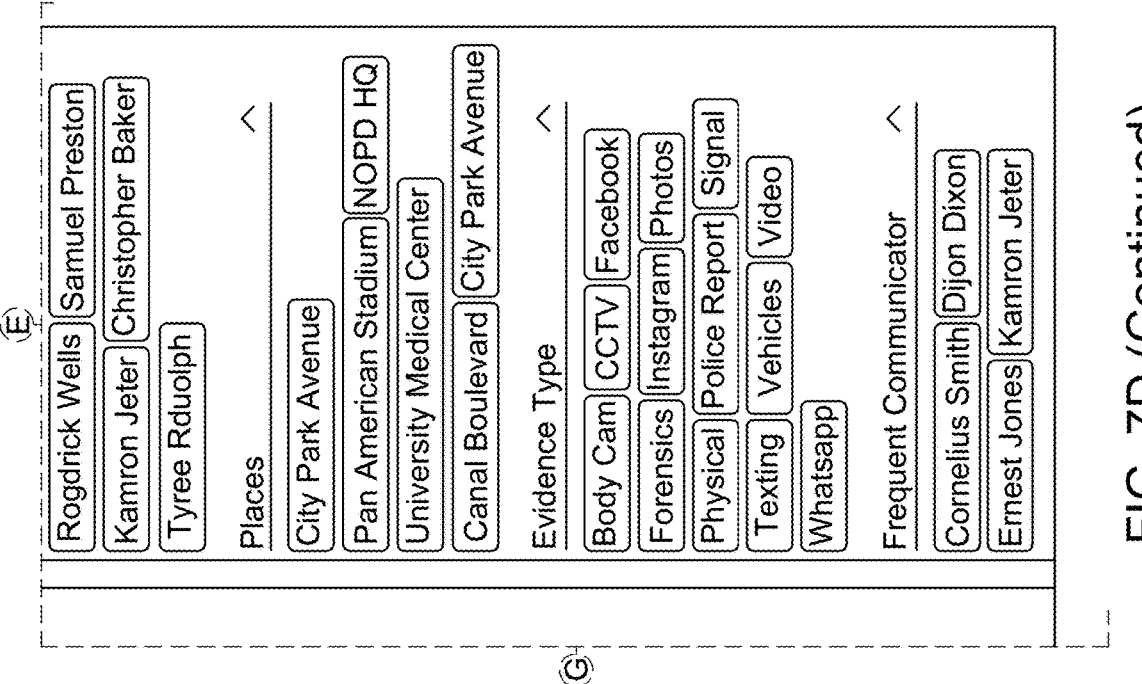

FIG. 7D illustrates an expanded event field GUI 700D for a case management system. The expanded event field GUI 700D may comprise several components that provide detailed information and analysis for a specific case event.

A multimedia viewer 717 may occupy a central position in the expanded event field GUI 700D, displaying visual evidence related to the event. In some cases, the multimedia viewer 717 may show CCTV footage from a restaurant, featuring a car and an individual.

Below the multimedia viewer 717 may be a presentation field 718, which may contain text fields for a subtitle and body text describing the event details. Adjacent to the presentation field 718 may be a notes field 719, allowing users to input and view case-specific notes.

To the right of the multimedia viewer 717 may be an assistant summary field 720, which may present AI-generated summaries or insights about the event. Below the assistant summary field 720 may be an assistant sources field 721, displaying thumbnails of evidence files related to the event.

The expanded event field GUI 700D may also include the case overview field 706 at the top, providing key information such as occurrence date and time, location, victims, offender, charges, and case status. On the right side, the expanded event field GUI 700D may display the evidence locker field 714 and the filter field 715 for searching and organizing case information.

At the bottom of the expanded event field GUI 700D may be the assistant interface 701, allowing users to interact with an AI assistant for additional support or queries related to the case.

In some cases, the system may include optical character recognition (OCR) capabilities for processing handwritten content in forms and documents. The multimedia viewer 717 may utilize these OCR capabilities to extract text from handwritten notes or forms displayed in the viewer, potentially enhancing the information available for analysis.

The system may include multimodal processing capabilities for images, videos, and audio, including transcription and time-indexing. In some cases, the multimedia viewer 717 may leverage these capabilities to provide synchronized transcripts for audio or video content, allowing users to search and navigate through the media based on spoken words or sounds.

The system may include an image processing pipeline that extracts, describes, labels, and classifies images from documents. The assistant summary field 720 may utilize this pipeline to provide detailed descriptions of images displayed in the multimedia viewer 717. For example, the assistant summary field 720 may describe the contents of a CCTV image, identify key objects or individuals, and classify the image based on its content.

The expanded event field GUI 700D may integrate these components to provide a comprehensive view of a specific event within a case, facilitating analysis and investigation processes. By combining visual evidence, AI-generated summaries, and user notes, the expanded event field GUI 700D may enable users to gain deeper insights into case events and make more informed decisions during investigations.

Figure 7E:
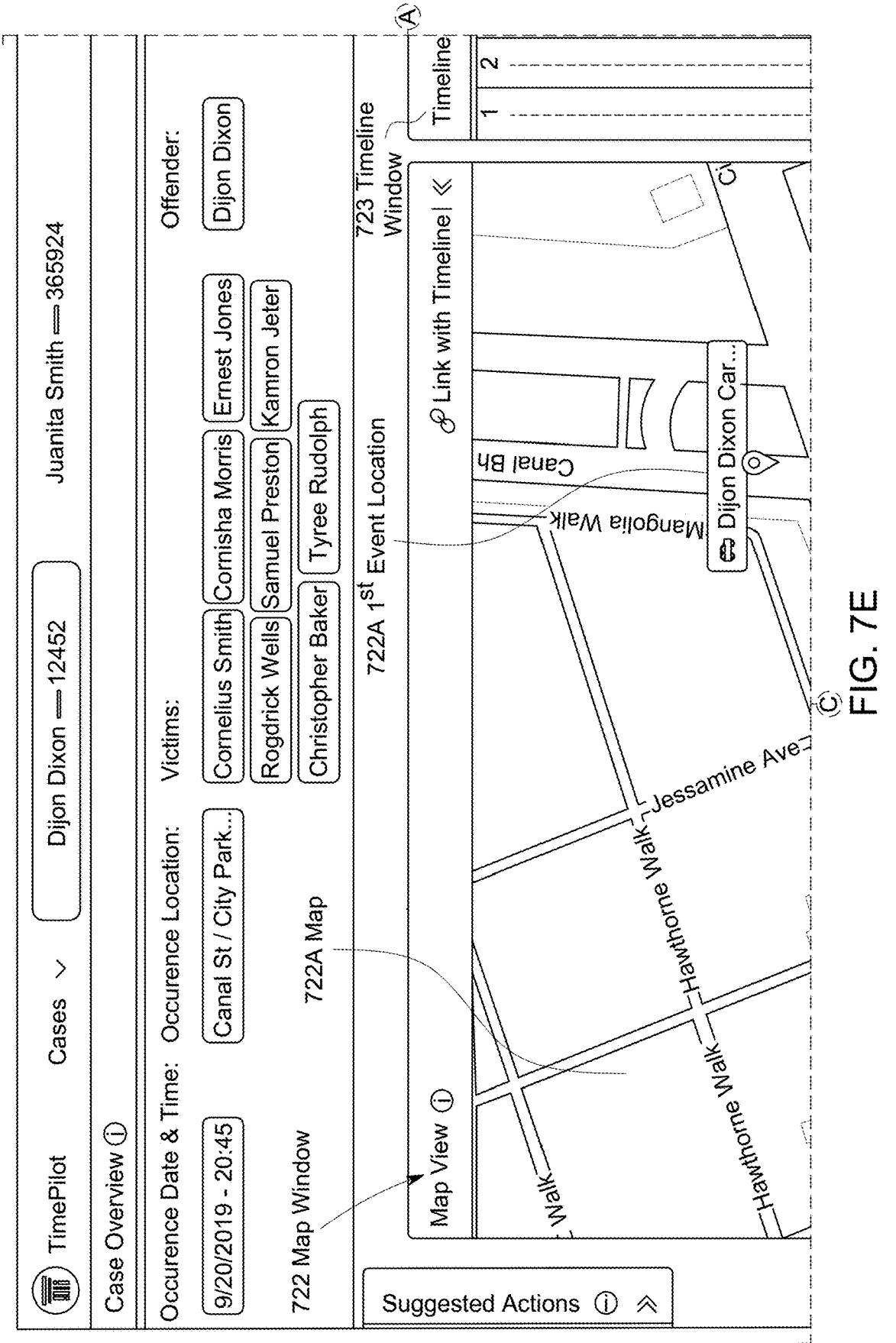
Figure 7E:
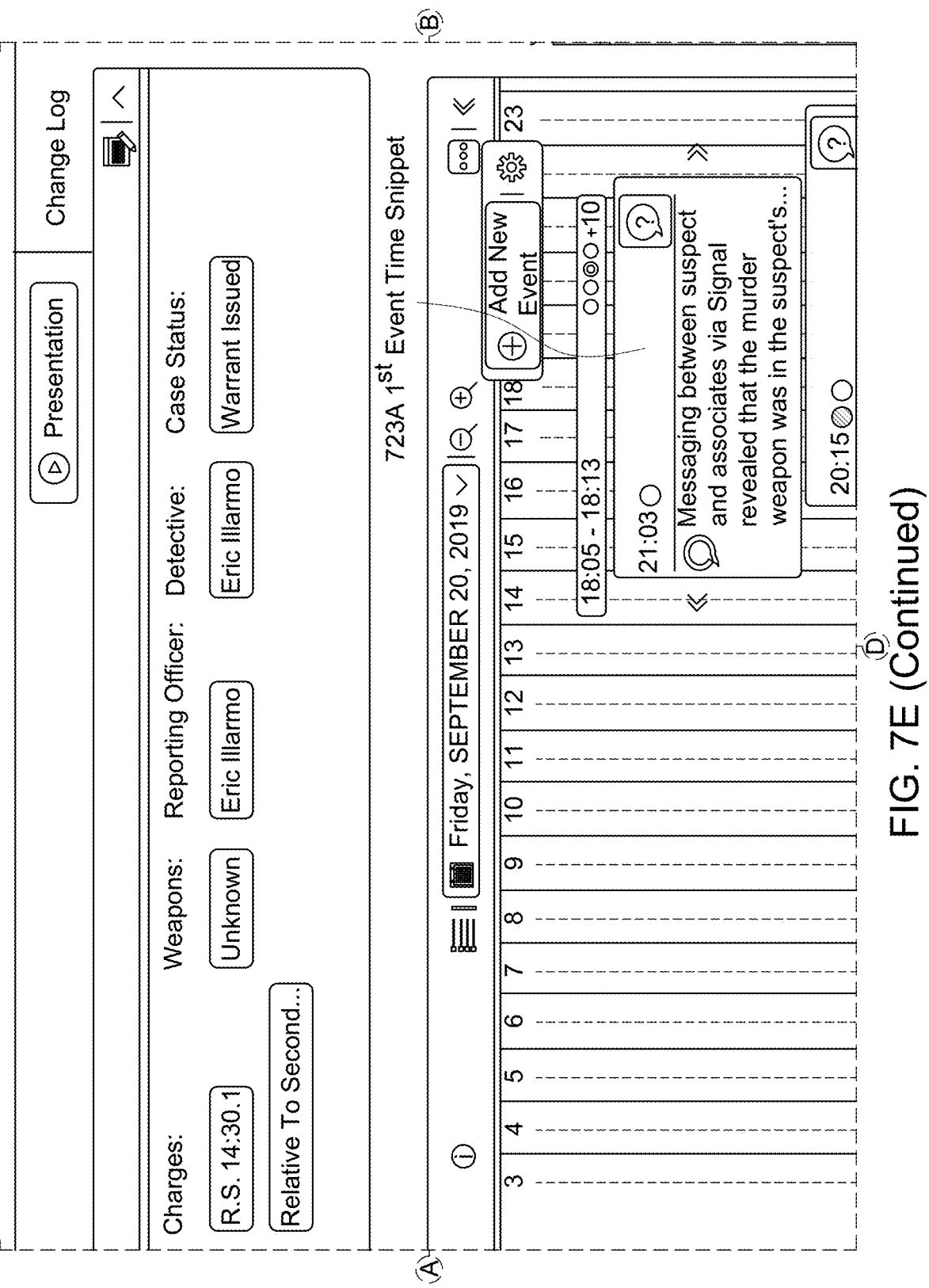
Figure 7E:
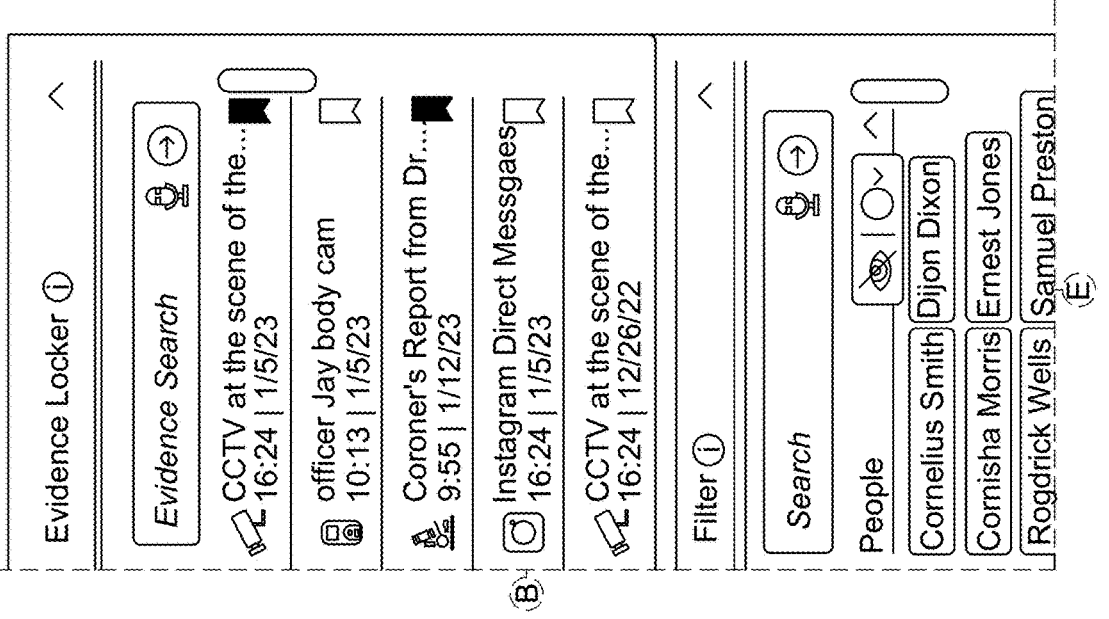
Figure 7E:
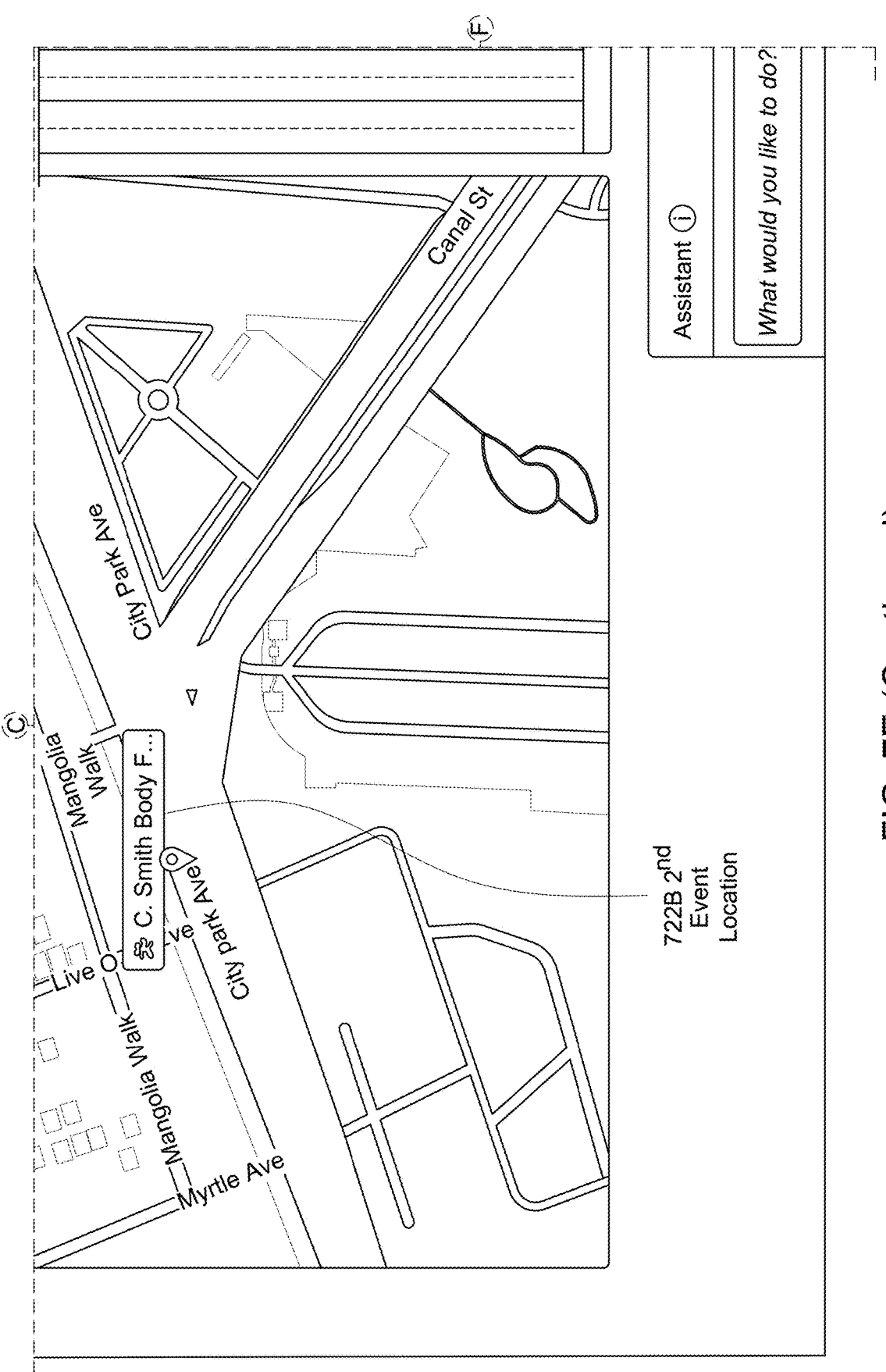
Figure 7E:
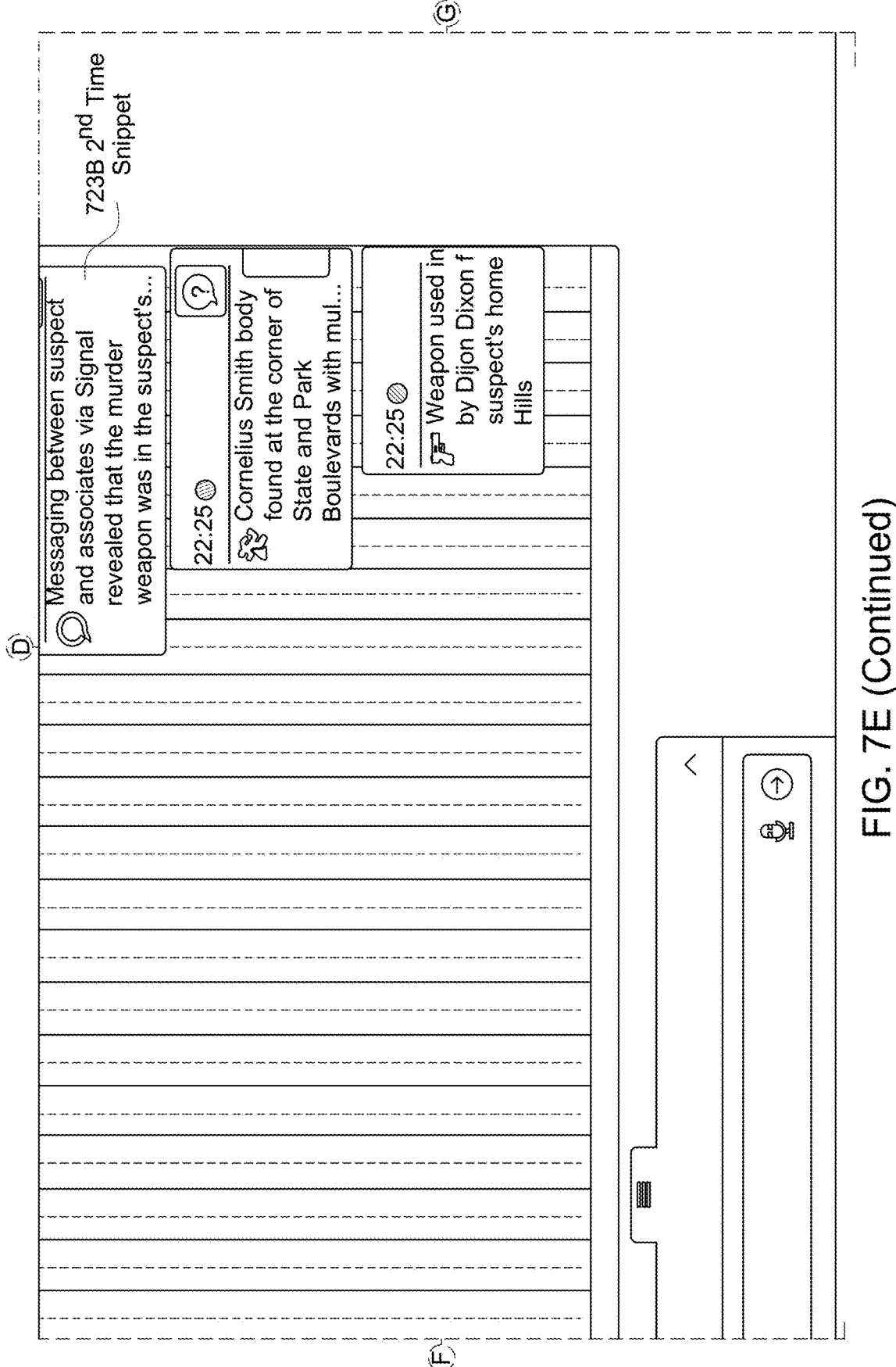
Figure 7E:
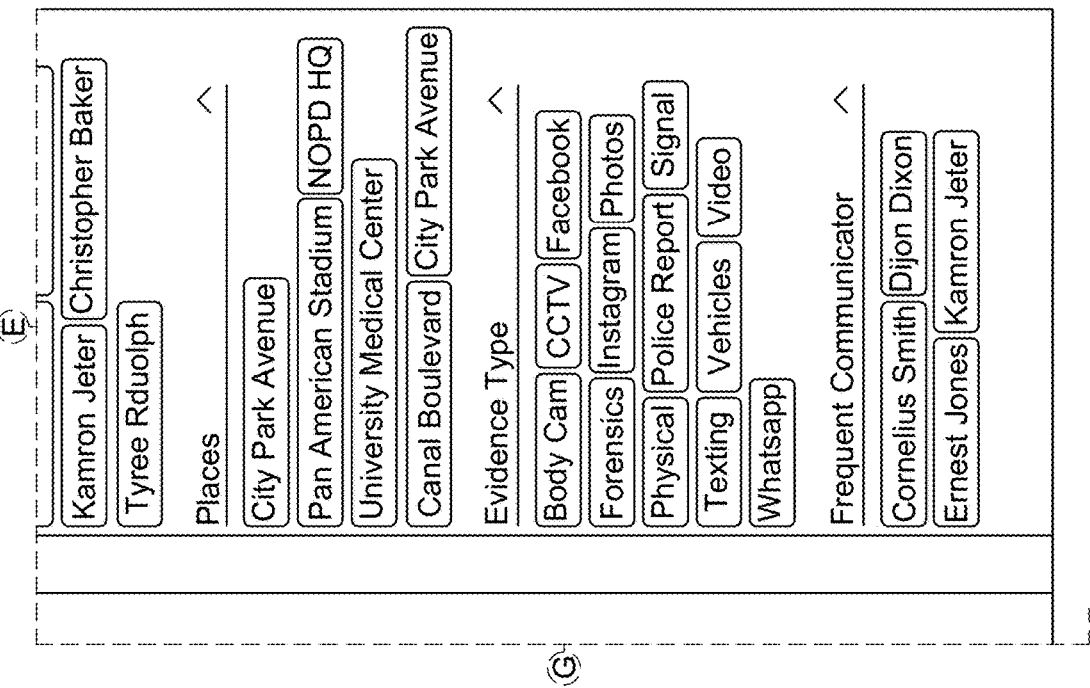

FIG. 7E illustrates a map and timeline view GUI 700E for a case management and analysis system. The map and timeline view GUI 700E may comprise several components that provide a comprehensive view of case-related information.

The map and timeline view GUI 700E may include a map window 722 and a timeline window 723. The map window 722 may contain a map 722A that displays geographical information relevant to the case. On the map 722A, event locations may be marked, including a first event location 722B and a second event location 722B, providing spatial context for case-related incidents.

Adjacent to the map window 722 may be the timeline window 723. The timeline window 723 may present a chronological view of case events. Within the timeline window 723, there may be event time snippets, including a first event time snippet 723A and a second event time snippet 723B. These event time snippets may represent specific events or occurrences related to the case, arranged in temporal order.

The map and timeline view GUI 700E may also feature various other elements, such as the case overview field 706 at the top of the interface, and the filter field 715 on the right side allowing users to refine the displayed information based on criteria like people, places, evidence types, and frequent communicators.

At the bottom of the map and timeline view GUI 700E, there may be the assistant interface 701, providing a means for users to interact with the system and potentially request additional information or analysis.

The layout of the map and timeline view GUI 700E may allow for simultaneous visualization of spatial and temporal data, enabling users to correlate events across both dimensions. This integrated view may assist in identifying patterns, relationships, and sequences of events relevant to the case under investigation.

In some cases, the system may include a vector store for semantic search capabilities, storing embeddings of text and image content. The vector store may enable efficient retrieval of relevant information based on semantic similarity, potentially enhancing the ability to find related events or locations when users interact with the map window 722 or timeline window 723.

The system may use event-driven architecture with serverless infrastructure for efficient processing. In some cases, this architecture may allow for real-time updates to the map 722A and timeline window 723 as new information is processed and added to the system. For example, when a new event is detected, the system may automatically update the relevant event location 722B on the map 722A and add a corresponding event time snippet to the timeline window 723.

Figure 7F:
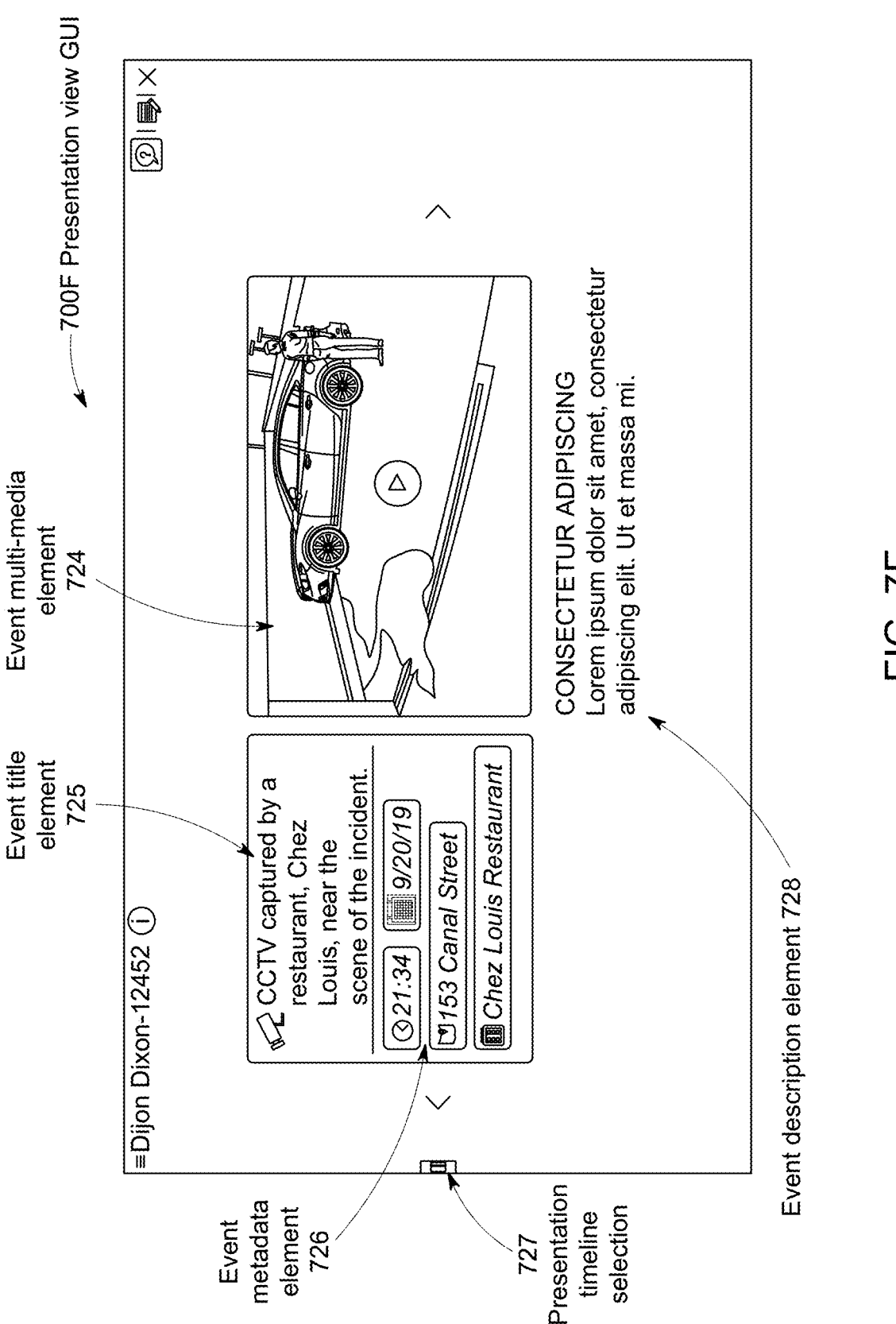

FIG. 7F illustrates a presentation view GUI 700F of a system for analyzing and presenting event-related information. The presentation view GUI 700F may comprise several components that display various aspects of an event.

An event multi-media element 724 may occupy a significant portion of the presentation view GUI 700F, showing a video or image related to the event. In some cases, the event multi-media element 724 may display CCTV footage of a parking area with a car and a person visible.

Adjacent to the event multi-media element 724 may be an event title element 725, which may provide a brief description of the captured footage. The event title element 725 may state "CCTV captured by a restaurant, Chez Louis, near the scene of the incident."

Below the event title element 725 may be an event metadata element 726. The event metadata element 726 may display additional information about the event, including the time (21:34), date (Sep. 20, 2019), location (153 Canal Street), and the source of the footage (Chez Louis Restaurant).

A presentation timeline selection 727 may be represented by left and right arrow indicators, suggesting the ability to navigate between different events or time points in the presentation.

At the bottom of the presentation view GUI 700F may be an event description element 728. While the specific content may not be visible in the image, the event description element 728 may be intended for more detailed information or analysis of the event.

The overall layout of the presentation view GUI 700F may allow for a comprehensive display of event-related information, combining visual evidence with contextual details and descriptions.

In some cases, the system may include a conversation store that parses and stores conversations from various sources like text messages and social media. The conversation store may work in conjunction with the presentation view GUI 700F to provide additional context for the events being presented. For example, the event description element 728 may include relevant excerpts from parsed conversations that are related to the event being displayed in the event multi-media element 724.

The presentation view GUI 700F may facilitate the presentation of event-related information by organizing key elements in a visually intuitive manner. The event multi-media element 724 may provide immediate visual context, while the event title element 725 and event metadata element 726 may offer quick reference information. The presentation timeline selection 727 may allow users to navigate through a sequence of events, potentially enabling a chronological exploration of case-related incidents. The event description element 728 may provide space for more detailed analysis or additional context, which may include information derived from the conversation store.

Figure 7G:
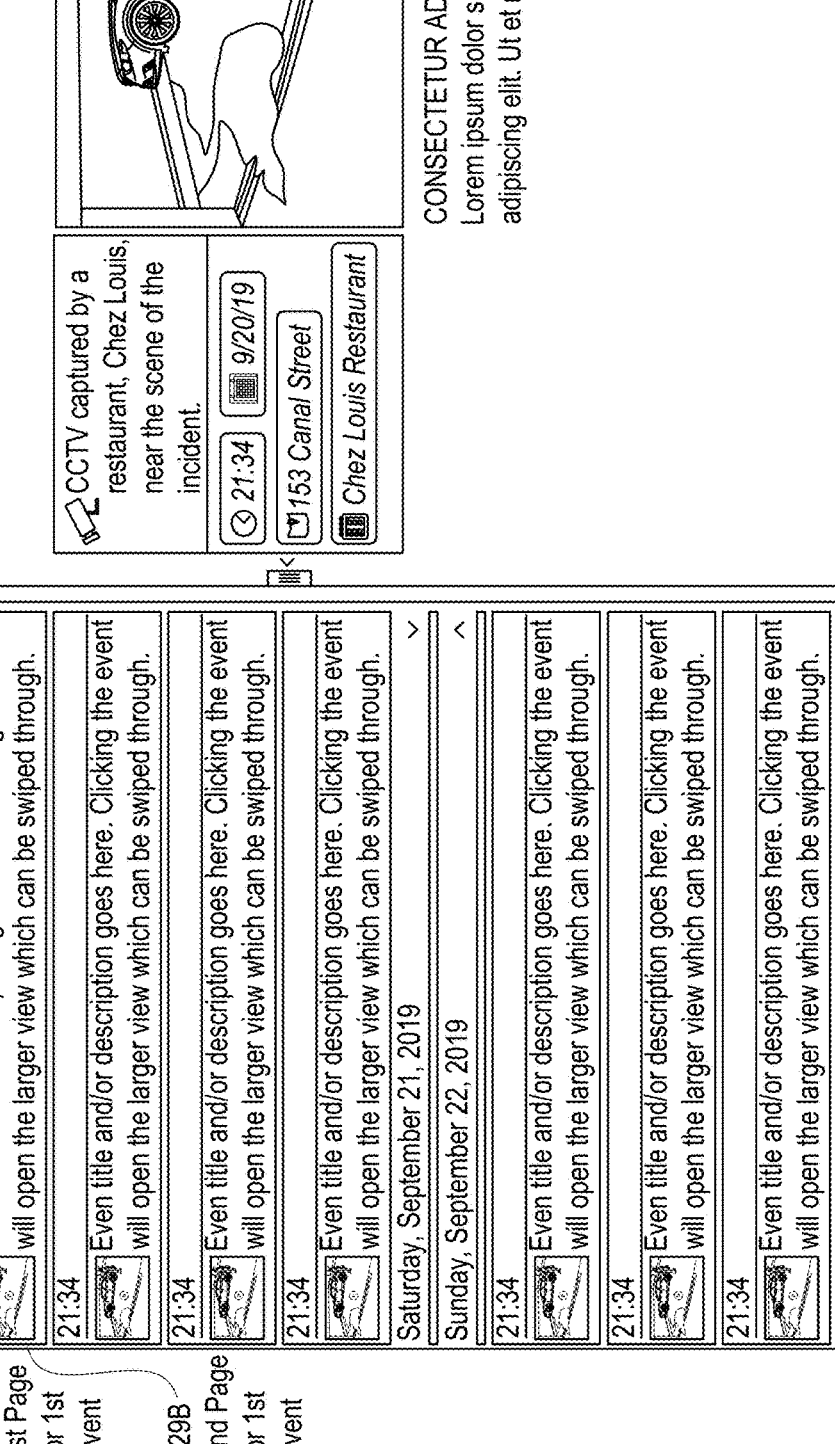

FIG. 7G illustrates a presentation timeline view GUI 700G of a system for organizing and presenting event-related information. The presentation timeline view GUI 700G may include several components that work together to provide a comprehensive view of events and related data.

A presentation timeline field 729 may be located on the left side of the presentation timeline view GUI 700G. The presentation timeline field 729 may display a chronological list of events, with each event represented by a thumbnail image and brief description. The events may be organized by date, with the current view showing events from Friday, Sep. 20, 2019.

Within the presentation timeline field 729, there may be multiple event entries. A first event page 729A and a second event page 729B may be visible, representing different aspects or pages of the same event. Each event entry may include a timestamp, thumbnail image, and a brief description of the event.

At the top of the presentation timeline view GUI 700G may be a search interface 730. The search interface 730 may allow users to search for specific events or information within the system. The search interface 730 may include a search bar and additional icons, likely for filtering or advanced search options.

The main area of the presentation timeline view GUI 700G may display detailed information about a selected event. In some cases, the main area may show a CCTV capture from a restaurant near the scene of an incident. The image may display a car and a person in a parking area. Below the image, there may be additional text providing context and details about the event.

The presentation timeline view GUI 700G may also include metadata about the displayed event, such as the time (21:34), date (Sep. 20, 2019), and location (153 Canal Street, Chez Louis Restaurant). This information may help to contextualize the event within the broader timeline.

The presentation timeline view GUI 700G may include navigation arrows on either side of the main display area, suggesting that users may move between different events or pieces of evidence. Additionally, there may be control buttons in the top right corner of the presentation timeline view GUI 700G, likely for adjusting settings or closing the interface.

In some cases, the system may include a text and image extractor service that performs classification, text extraction, and image extraction on incoming files. This service may be used to process the events displayed in the presentation timeline field 729. For example, when a new file is added to the system, the text and image extractor service may classify the file type, extract any text content, and identify and extract images. The extracted text and images may then be used to populate the event entries in the presentation timeline field 729, including the thumbnail images and brief descriptions for each event.

The text and image extractor service may also contribute to the search functionality provided by the search interface 730. By extracting and classifying text from various file types, the service may enable users to search for specific keywords or phrases across all processed documents. This may allow for more comprehensive and accurate search results when using the search interface 730 to locate specific events or information within the timeline.

Figure 7H:
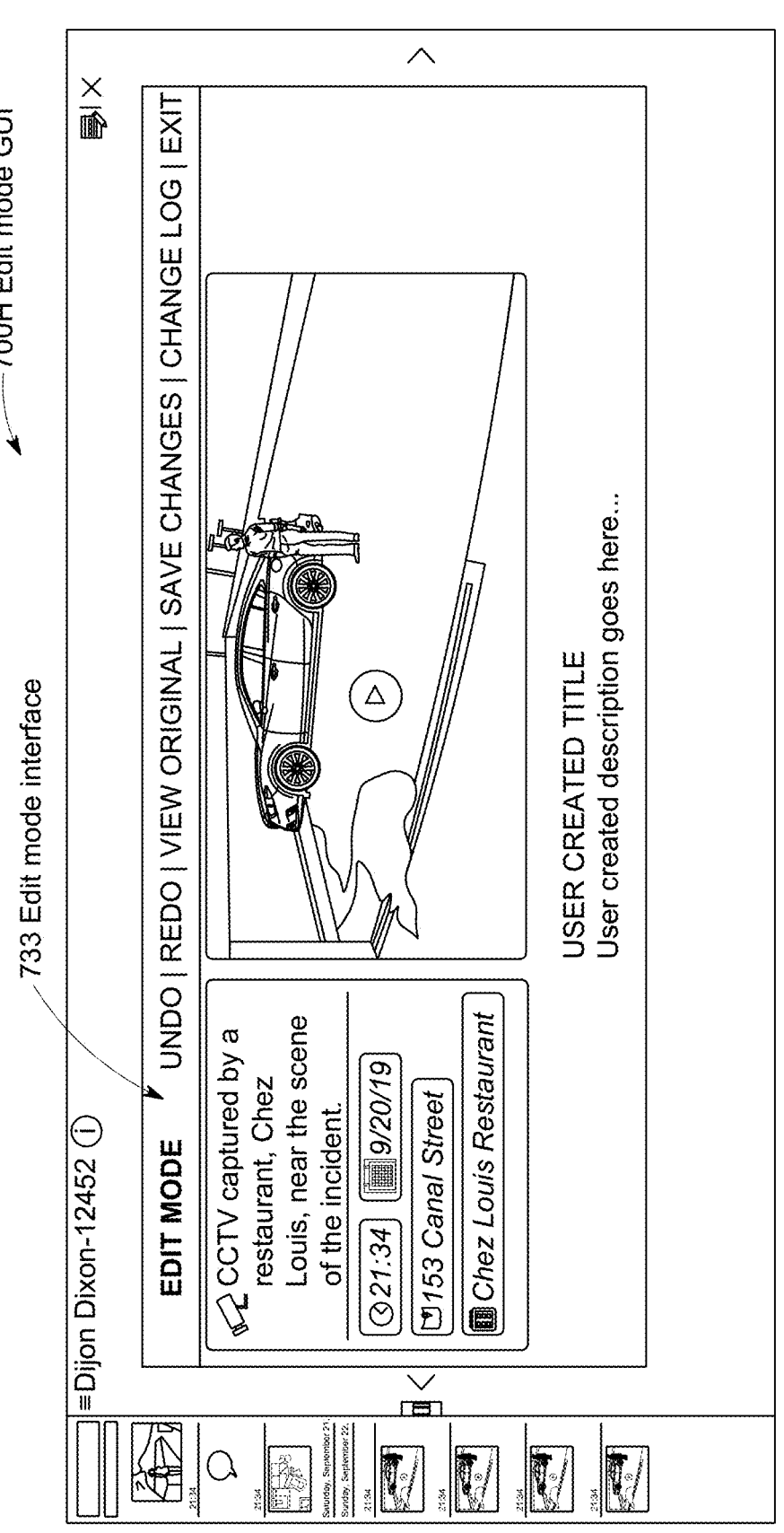

FIG. 7H illustrates an orthogonal view of an edit mode GUI 700H for a digital content management system. The edit mode GUI 700H may comprise an edit mode interface 733 that allows users to modify and annotate digital content.

The edit mode interface 733 may be displayed within the main window of the edit mode GUI 700H. The edit mode interface 733 may feature a yellow header bar with the text "EDIT MODE" and several action buttons such as "UNDO", "REDO", "VIEW ORIGINAL", "SAVE CHANGES", "CHANGE LOG", and "EXIT".

Below the header, the edit mode interface 733 may display a video frame or image, likely from CCTV footage. The image may show a car and a person in a parking area. To the left of the image, there may be an information panel providing context about the footage, including:

A description: "CCTV captured by a restaurant, Chez Louis, near the scene of the incident."

Timestamp: "21:34"

Date: "Sep. 20, 2019"

Location: "153 Canal Street"

Venue: "Chez Louis Restaurant"

Beneath the image, there may be editable fields for a user-created title and description. The title field may display "USER CREATED TITLE" in large text, while the description field may show "User created description goes here . . . " in smaller text.

On the left side of the edit mode GUI 700H, there may be a vertical panel displaying thumbnail images, likely representing different pieces of evidence or content related to the case being edited.

The edit mode interface 733 may provide a comprehensive set of tools for users to annotate, describe, and organize digital evidence within the system.

In some cases, the system may include a third-party storage sync manager that syncs files to platform storage, triggering event-based workflows. The sync manager may facilitate the ingestion of new digital content into the system, which may then be available for editing and annotation through the edit mode GUI 700H. For example, when a new file is synced from third party storage to the platform storage, the system may automatically process the file and make the content available for editing in the edit mode interface 733.

In some aspects, the system may employ advanced artificial intelligence techniques to process and analyze ambiguous transcripts or low-quality audio recordings, such as jail phone calls. This approach may utilize large language models (LLMs) to identify speakers in audio transcripts, potentially overcoming limitations of traditional speaker identification methods.

The process may begin with the transcription of audio using services like Amazon Transcribe or Assembly AI. These services may provide an initial text representation of the audio content, and in some cases, may offer preliminary speaker differentiation. Following this initial transcription, LLMs may be employed to refine and expand upon the speaker identification.

LLMs may analyze the conversation context, including topics discussed, speech patterns, and contextual clues, to make inferences about speaker identities. This approach may be particularly beneficial in scenarios where traditional speaker identification methods are less effective, such as in low-quality phone calls or situations where speakers frequently exchange the phone.

In some cases, the system may incorporate an agent framework to iteratively refine speaker identification. This process may involve multiple passes of analysis, with each iteration building upon the results of the previous one to potentially increase accuracy. The system may also integrate additional context from case data or other sources to enhance the LLM's ability to identify speakers. This could include known relationships between individuals or typical topics of conversation for certain speakers.

The system may be especially useful for analyzing large volumes of audio data, such as in legal cases or investigations, where manual speaker identification may be time-consuming and impractical. By leveraging AI and LLMs, the system may provide a more efficient and accurate method for speaker identification in complex audio scenarios.

In some implementations, the system may allow users to review and verify the AI-generated speaker identifications through the edit mode GUI 700H. Users may be able to listen to audio segments, view the transcript with suggested speaker labels, and make corrections or confirmations as needed. This human-in-the-loop approach may help to improve the accuracy of speaker identification over time, as the system learns from user corrections and refinements.

The system may also provide visualization tools within the presentation timeline view GUI 700G to represent speaker turns and durations. For example, different colors or patterns in the timeline may indicate different speakers, allowing users to quickly grasp the structure of a conversation and identify patterns or anomalies in speaker participation.

In some cases, the system may generate confidence scores for speaker identifications, which may be displayed alongside the transcript or in the edit mode interface 733. These confidence scores may help users prioritize their review efforts, focusing on segments where the AI's speaker identification is less certain.

The speaker identification capabilities may be integrated with other components of the system, such as the relationship graph 614 and the entity resolution module 612. This integration may allow the system to update entity profiles with new information gleaned from identified speech patterns or topics of conversation, potentially enhancing the overall understanding of relationships and activities within a case.

3. Computer System

FIG. 8 depicts an example system that may execute techniques presented herein. FIG. 8 is a simplified functional block diagram of a computer that may be configured to execute techniques described herein, according to exemplary cases of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

4. Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

As used herein, the terms "transmit," "provide," "receive," and "obtain" may refer to the transfer or communication of data, information, or signals between various components or entities. This may include, but is not limited to, transmission over a network (such as a local area network, wide area network, or the Internet), transfer between devices (such as between computers, smartphones, or other electronic devices), communication between central processing units (CPUs) or graphics processing units (GPUs), exchange of information between microservices, transfer of data between software components within an environment, or any other form of data transfer or communication as indicated by the context in which the terms are used. The specific mode or medium of transmission or provision may vary depending on the particular implementation and system architecture.

As used herein, the term "module" may refer to software code, a software component, a software function, a software application, and firmware. As indicated by context, "module" may be logical, digital, analog, optical, electronic, or quantum implementations of operations or functions. A module may be implemented as a standalone unit or as part of a larger system. In some cases, a module may interact with other modules or components to perform specific tasks or operations within the system. As indicated by context or based on design preference, any two modules may be combined. As indicated by context or based on design preference, any module may be broken into two or more modules that provide some or all of the operations or functions of the single module. The specific implementation of module(s) may vary depending on the requirements of the system and the particular application.

The term "exemplary" is used in the sense of "example" rather than "ideal." As used herein, the singular forms "a," "an," and "the" include plural reference unless the context dictates otherwise.

5. Examples

Exemplary embodiments of the systems and methods disclosed herein are described in the numbered paragraphs below.

A1. A computer-implemented method for processing and analyzing legal case files, the computer-implemented method comprising: receiving a set of legal case files; indexing the legal case files to generate indexed data; generating a timeline prompt based on the indexed data; processing the timeline prompt to generate a timeline response; and outputting the timeline response as an interactive timeline of the legal case files.

A2. The computer-implemented method of A1, wherein the set of legal case files includes one or combinations of: police reports, ballistics reports, coroners reports, social media data, mobile phone forensics data, mobile phone business records, financial records, video footage, photos, facial recognition results, and/or audio recordings.

A3. The computer-implemented method of any of A1-A2, wherein indexing of the legal case files includes generating a searchable database of the legal case files.

A4. The computer-implemented method of any of A1-A3, wherein generating the timeline prompt based on the indexed data includes identifying chronological events within the legal case files.

A5. The computer-implemented method of any of A1-A4, wherein processing the timeline prompt to generate the timeline response includes using a large language model to interpret the timeline prompt and organize the timeline response.

A6. The computer-implemented method of any of A1-A5, wherein outputting the timeline response as the interactive timeline of the legal case files includes displaying the interactive timeline on a user interface.

A7. The computer-implemented method of any of A1-A6, further comprising generating a geospatial representation of the legal case files based on the indexed data.

A8. The computer-implemented method of any of A1-A7, further comprising generating a narrative summary of the legal case files based on the indexed data.

A9. The computer-implemented method of any of A1-A8, further comprising providing a chatbot interface for user interaction with a large language model.

A10. The computer-implemented method of any of A1-A9, wherein the set of legal case files is received from a user device or a third-party platform.

A11. The computer-implemented method of any of A1-A10, wherein the legal case files include multi-model datasets of text-based documents, portable document format documents, audio recordings, video recordings, and/or images.

A12. A system for processing and analyzing legal case files, the system comprising: at least one memory configured to store instructions; and at least one processor configured to execute the instructions to perform operations, wherein the operations include: receive a set of legal case files; index the legal case files to generate indexed data; generate a timeline prompt based on the indexed data; process the timeline prompt to generate a timeline response; and output the timeline response as an interactive timeline of the legal case files.

A13. The system of A12, wherein, to receive the set of legal case files, the operations further include interacting with a plurality of sources including user devices and third-party platforms.

A14. The system of A13, wherein the third-party platforms include one or combinations of: publicly available data sets, social media platforms, mobile phone service providers, financial institutions, surveillance systems, and/or ballistics repositories.

A15. The system of any of A12-A14, wherein, to generate the timeline prompt, the operations further include: generate the timeline prompt based on parameters, and the parameters include chronological events, geographical locations, and involved individuals within the legal case files.

A16. The system of any of A12-A15, wherein, to output the timeline response as the interactive timeline of the legal case files, the operations further include generate one or combinations of: graphical representations, geospatial maps, interactive elements, and/or textual descriptions.

A17. The system of any of A12-A16, wherein the operations further include: generate a geospatial representation of the legal case files based on the indexed data and the timeline response.

A18. A non-transitory computer-readable medium storing instructions that, when executed by a processor, cause a computer to perform a method for processing and analyzing legal case files, the method comprising: receiving a set of legal case files; indexing the legal case files to generate indexed data; generating a timeline prompt based on the indexed data; processing the timeline prompt to generate a timeline response; and outputting the timeline response as an interactive timeline of the legal case files.

A19. The non-transitory computer-readable medium of A18, wherein the set of legal case files includes one or combinations of: police reports, ballistics reports, coroners reports, social media data, mobile phone forensics data, mobile phone business records, financial records, video footage, photos, facial recognition results, and audio recordings.

A20. The non-transitory computer-readable medium of A18 or A19, further comprising instructions for generating a geospatial representation of the legal case files based on the indexed data and the timeline response.

B1. A system for processing and analyzing audio recordings, comprising: an audio transcription module configured to generate a transcript from an audio recording; an entity resolution module configured to identify and resolve entities within the transcript; a large language model (LLM) configured to analyze the transcript and identify speakers based on conversation context; and a timeline manager configured to generate an interactive timeline of events based on the analyzed transcript.

B2. The system of B1, wherein the audio recording comprises a low-quality audio recording from a jail phone call.

B3. The system of any of B1-B2, wherein the LLM is configured to analyze speech patterns and topics of conversation to infer speaker identities.

B4. The system of any of B1-B3, further comprising an agent framework configured to iteratively refine speaker identification through multiple passes of analysis.

B5. The system of B4, wherein the agent framework is configured to incorporate additional context from case data to enhance the LLM's ability to identify speakers.

B6. The system of any of B1-B5, further comprising a user interface configured to allow users to review and verify AI-generated speaker identifications.

B7. The system of B6, wherein the user interface is configured to display confidence scores for speaker identifications alongside the transcript.

B8. A method for processing and analyzing audio recordings, comprising: receiving an audio recording; generating a transcript of the audio recording; identifying and resolving entities within the transcript; analyzing the transcript using a large language model (LLM) to identify speakers based on conversation context; and generating an interactive timeline of events based on the analyzed transcript.

B9. The method of B8, wherein the audio recording comprises a low-quality audio recording from a jail phone call.

B10. The method of any of B8-B9, wherein analyzing the transcript using the LLM comprises analyzing speech patterns and topics of conversation to infer speaker identities.

B11. The method of any of B8-B10, further comprising iteratively refining speaker identification through multiple passes of analysis using an agent framework.

B12. The method of B11, wherein iteratively refining speaker identification comprises incorporating additional context from case data to enhance the LLM's ability to identify speakers.

B13. The method of any of B8-B12, further comprising displaying a user interface configured to allow users to review and verify AI-generated speaker identifications.

B14. The method of B13, wherein the user interface is configured to display confidence scores for speaker identifications alongside the transcript.

B15. A non-transitory computer-readable medium storing instructions that, when executed by a processor, cause the processor to perform operations for processing and analyzing audio recordings, the operations comprising: receiving an audio recording; generating a transcript of the audio recording; identifying and resolving entities within the transcript; analyzing the transcript using a large language model (LLM) to identify speakers based on conversation context; and generating an interactive timeline of events based on the analyzed transcript.

B16. The non-transitory computer-readable medium of B15, wherein the audio recording comprises a low-quality audio recording from a jail phone call.

B17. The non-transitory computer-readable medium of any of B15-B16, wherein analyzing the transcript using the LLM comprises analyzing speech patterns and topics of conversation to infer speaker identities.

B18. The non-transitory computer-readable medium of any of B15-B17, wherein the operations further comprise iteratively refining speaker identification through multiple passes of analysis using an agent framework.

B19. The non-transitory computer-readable medium of B18, wherein iteratively refining speaker identification comprises incorporating additional context from case data to enhance the LLM's ability to identify speakers.

B20. The non-transitory computer-readable medium of B19, wherein the operations further comprise displaying a user interface configured to allow users to review and verify AI-generated speaker identifications, the user interface displaying confidence scores for speaker identifications alongside the transcript.

C1. A system for processing and analyzing digital content, comprising: an ingest module configured to receive a plurality of digital objects of different types; a decomposition module configured to decompose at least one complex digital object from the plurality of digital objects into a plurality of sub-objects; an index module configured to generate indexed data based on the plurality of digital objects and the plurality of sub-objects; and a processing module configured to process the indexed data to generate analysis results.

C2. The system of C1, wherein the plurality of digital objects comprises at least two of: text documents, portable document format (PDF) files, images, audio files, video files, and compressed files.

C3. The system of any of C1-C2, wherein the decomposition module is further configured to: extract text content from the at least one complex digital object; and extract image content from the at least one complex digital object.

C4. The system of any of C1-C3, further comprising a semantic search module configured to: generate vector embeddings based on the indexed data; and perform semantic searches using the vector embeddings.

C5. The system of C4, wherein the semantic search module is further configured to: receive a search query; identify semantically similar content to the search query using the vector embeddings; and return search results based on the identified semantically similar content.

C6. The system of any of C1-C5, further comprising a conversation store configured to: parse conversations from the plurality of digital objects; and store the parsed conversations in a conversation database.

C7. The system of C6, wherein the conversation store is further configured to: receive a conversation search query; search the conversation database based on the conversation search query; and return conversation search results based on the search of the conversation database.

C8. A method for processing and analyzing digital content, comprising: receiving a plurality of digital objects of different types; decomposing at least one complex digital object from the plurality of digital objects into a plurality of sub-objects; generating indexed data based on the plurality of digital objects and the plurality of sub-objects; and processing the indexed data to generate analysis results.

C9. The method of C8, wherein the plurality of digital objects comprises at least two of: text documents, portable document format (PDF) files, images, audio files, video files, and compressed files.

C10. The method of any of C8-C9, wherein decomposing the at least one complex digital object comprises: extracting text content from the at least one complex digital object; and extracting image content from the at least one complex digital object.

C11. The method of any of C8-C10, further comprising: generating vector embeddings based on the indexed data; and performing semantic searches using the vector embeddings.

C12. The method of C11, wherein performing semantic searches comprises: receiving a search query; identifying semantically similar content to the search query using the vector embeddings; and returning search results based on the identified semantically similar content.

C13. The method of any of C8-C12, further comprising: parsing conversations from the plurality of digital objects; and storing the parsed conversations in a conversation database.

C14. The method of C13, further comprising: receiving a conversation search query; searching the conversation database based on the conversation search query; and returning conversation search results based on the search of the conversation database.

C15. A non-transitory computer-readable medium storing instructions that, when executed by a processor, cause the processor to perform operations for processing and analyzing digital content, the operations comprising: receiving a plurality of digital objects of different types; decomposing at least one complex digital object from the plurality of digital objects into a plurality of sub-objects; generating indexed data based on the plurality of digital objects and the plurality of sub-objects; and processing the indexed data to generate analysis results.

C16. The non-transitory computer-readable medium of C15, wherein the plurality of digital objects comprises at least two of: text documents, portable document format (PDF) files, images, audio files, video files, and compressed files.

C17. The non-transitory computer-readable medium of any of C15-C16, wherein decomposing the at least one complex digital object comprises: extracting text content from the at least one complex digital object; and extracting image content from the at least one complex digital object.

C18. The non-transitory computer-readable medium of any of C15-C17, the operations further comprising: generating vector embeddings based on the indexed data; and performing semantic searches using the vector embeddings.

C19. The non-transitory computer-readable medium of C18, wherein performing semantic searches comprises: receiving a search query; identifying semantically similar content to the search query using the vector embeddings; and returning search results based on the identified semantically similar content.

C20. The non-transitory computer-readable medium of any of C15-C19, the operations further comprising: parsing conversations from the plurality of digital objects; storing the parsed conversations in a conversation database; receiving a conversation search query; searching the conversation database based on the conversation search query; and returning conversation search results based on the search of the conversation database.

D1. A system for processing and analyzing digital content, comprising: a storage device configured to store digital objects; an ingest module configured to process the digital objects to extract content and generate metadata; an indexing module configured to create a searchable index of the extracted content and metadata; an entity resolution module configured to identify and resolve entities within the indexed content; a relationship graph module configured to generate a graph of relationships between the resolved entities; and a timeline manager configured to generate and manage timelines based on the relationship graph and resolved entities.

D2. The system of D1, wherein the ingest module is configured to process digital objects including one or more of: text documents, images, audio files, video files, and social media content.

D3. The system of D2, wherein the ingest module comprises: a text classifier configured to categorize text content; an image analyzer configured to extract and classify visual information from images; and an audio transcoder configured to convert audio content to text.

D4. The system of any of D1-D3, wherein the entity resolution module is configured to: identify entities including people, places, objects, and events; and resolve ambiguities between entities across multiple digital objects.

D5. The system of any of D1-D4, further comprising a user interface configured to display an interactive timeline view of entities and relationships.

D6. The system of D5, wherein the user interface is further configured to: receive user feedback and corrections related to displayed entities and relationships; and update the entity resolution module and relationship graph module based on the user feedback and corrections.

D7. The system of D6, wherein the user interface is further configured to display: a map view of geospatial data related to entities and events; an events viewer for detailed event information; a timeline viewer for chronological visualization of events; and a presentation viewer for creating and editing case presentations.

D8. A method for processing and analyzing digital content, comprising: receiving digital objects at an ingest module; processing the digital objects to extract content and generate metadata; creating a searchable index of the extracted content and metadata; identifying and resolving entities within the indexed content; generating a graph of relationships between the resolved entities; and generating and managing timelines based on the relationship graph and resolved entities.

D9. The method of D8, wherein processing the digital objects comprises:

classifying text content; extracting and classifying visual information from images; and converting audio content to text.

D10. The method of D9, wherein identifying and resolving entities comprises: identifying entities including people, places, objects, and events; and resolving ambiguities between entities across multiple digital objects.

D11. The method of D10, further comprising displaying an interactive timeline view of entities and relationships.

D12. The method of D11, further comprising: receiving user feedback and corrections related to displayed entities and relationships; and updating the identified entities and relationship graph based on the user feedback and corrections.

D13. The method of D12, further comprising displaying: a map view of geospatial data related to entities and events; an events viewer for detailed event information; a timeline viewer for chronological visualization of events; and a presentation viewer for creating and editing case presentations.

D14. The method of D13, wherein the timeline viewer allows filtering of timelines based on cases or tags.

D15. A non-transitory computer-readable medium storing instructions that, when executed by a processor, cause the processor to perform operations for processing and analyzing digital content, the operations comprising: receiving digital objects; processing the digital objects to extract content and generate metadata; creating a searchable index of the extracted content and metadata; identifying and resolving entities within the indexed content; generating a graph of relationships between the resolved entities; and generating and managing timelines based on the relationship graph and resolved entities.

D16. The non-transitory computer-readable medium of D15, wherein processing the digital objects comprises: classifying text content; extracting and classifying visual information from images; and converting audio content to text.

D17. The non-transitory computer-readable medium of D16, wherein identifying and resolving entities comprises: identifying entities including people, places, objects, and events; and resolving ambiguities between entities across multiple digital objects.

D18. The non-transitory computer-readable medium of D17, the operations further comprising displaying an interactive timeline view of entities and relationships.

D19. The non-transitory computer-readable medium of D18, the operations further comprising: receiving user feedback and corrections related to displayed entities and relationships; and updating the identified entities and relationship graph based on the user feedback and corrections.

D20. The non-transitory computer-readable medium of D19, the operations further comprising displaying: a map view of geospatial data related to entities and events; an events viewer for detailed event information; a timeline viewer for chronological visualization of events; and a presentation viewer for creating and editing case presentations.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for processing and analyzing digital content, comprising:

a storage device configured to store digital objects and instructions;

at least one processor configured to execute the instructions to process the digital objects to extract content and generate metadata;

create a searchable index of the extracted content and metadata;

generate vector embeddings for the extracted content, the vector embeddings capturing semantic relationships within the extracted content;

identify entities within the indexed content, wherein the entities include one or combinations of events, people, locations, objects, and identifiers;

retrieve, using a semantic search of the vector embeddings, confidence scores for the identified entities;

resolve the identified entities based on the confidence scores to produce resolved entities;

generate a graph of relationships associated with the resolved entities, wherein a node of the graph is associated with an entity of the resolved entities, and wherein an edge between the node and a second node of the graph represents a relationship between the entity and a second entity of the resolved entities;

timelines based on the graph of relationships and the resolved entities;

in response to identifying a new entity or a new relationship in the graph, provide a real-time update to the timelines; and a user interface configured to:

display the timelines;

receive user feedback and corrections related to displayed entities and relationships; and in response to the user feedback and corrections, update the resolved entities and the graph of relationships.

2. The system of claim 1, wherein the digital objects include one or more of: text documents, images, audio files, video files, and social media content.

3. The system of claim 2, wherein the at least one processor is further configured to execute the instructions to:

categorize text content;

extract and classify visual information from images; and convert audio content to text.

4. The system of claim 1, wherein the at least one processor is further configured to execute the instructions to:

identify entities including people, places, objects, and events; and resolve ambiguities between entities across multiple digital objects.

5. The system of claim 1, wherein the user interface is further configured to display an interactive view of the resolved entities and the graph of relationships.

6. The system of claim 1, wherein the at least one processor is further configured to execute the instructions to:

identify a new event within the indexed content:

create a node or an edge in the graph of relationships to represent the new event's relationship to the resolved entities; and add the new event to the timelines, adjusting a chronological order of the timelines based on the new event.

7. The system of claim 6, wherein the user interface is further configured to display:

a map view of geospatial data related to entities and events;

an events viewer for detailed event information;

a timeline viewer for chronological visualization of events; and a presentation viewer for creating and editing case presentations.

8. A method for processing and analyzing digital content, comprising:

processing digital objects to extract content and generate metadata;

creating a searchable index of the extracted content and metadata;

generating vector embeddings for the extracted content, the vector embeddings capturing semantic relationships within the extracted content;

identifying entities within the indexed content, wherein the entities include one or combinations of events, people, locations, objects, and identifiers;

retrieving, using a semantic search of the vector embeddings, confidence scores for the identified entities;

resolving the identified entities based on the confidence scores to produce resolved entities;

generating a graph of relationships associated with the resolved entities, wherein a node of the graph is associated with an entity of the resolved entities, and wherein an edge between the node and a second node of the graph represents a relationship between the entity and a second entity of the resolved entities;

generating timelines based on the graph of the relationships and the resolved entities;

in response to identifying a new entity or a new relationship in the graph, providing a real-time update to the timelines;

displaying the timelines;

receiving user feedback and corrections related to displayed entities and relationships; and in response to the user feedback and corrections, updating the resolved entities and the graph of relationships.

9. The method of claim 8, wherein processing the digital objects comprises:

classifying text content;

extracting and classifying visual information from images; and converting audio content to text.

10. The method of claim 9, wherein identifying and resolving entities comprises:

identifying entities including people, places, objects, and events; and resolving ambiguities between entities across multiple digital objects.

11. The method of claim 10, further comprising displaying an interactive timeline view of entities and relationships.

12. The method of claim 11, further comprising:

identifying a new event within the indexed content;

create a node or an edge in the graph of relationships to represent the new event's relationship to the resolved entities; and add the new event to the timelines, adjusting a chronological order of the timelines based on the new event.

13. The method of claim 12, further comprising displaying:

a map view of geospatial data related to entities and events;

an events viewer for detailed event information;

a timeline viewer for chronological visualization of events; and a presentation viewer for creating and editing case presentations.

14. The method of claim 13, wherein the timeline viewer allows filtering of timelines based on cases or tags.

15. A non-transitory computer-readable medium storing instructions that, when executed by a processor, cause the processor to perform operations for processing and analyzing digital content, the operations comprising:

processing digital objects to extract content and generate metadata;

creating a searchable index of the extracted content and metadata;

generating vector embeddings for the extracted content, the vector embeddings capturing semantic relationships within the extracted content;

identifying entities within the indexed content, wherein the entities include one or combinations of events, people, locations, objects, and identifiers;

retrieving, using a semantic search of the vector embeddings, confidence scores for the identified entities;

resolving the identified entities based on the confidence scores to produce resolved entities;

generating a graph of relationships associated with the resolved entities, wherein a node of the graph is associated with an entity of the resolved entities, and wherein an edge between the node and a second node of the graph represents a relationship between the entity and a second entity of the resolved entities;

generating timelines based on the graph of relationships and the resolved entities;

in response to identifying a new entity or a new relationship in the graph, providing a real-time update to the timelines;

displaying the timelines;

receiving user feedback and corrections related to displayed entities and relationships; and in response to the user feedback and corrections, updating the resolved entities and the graph of relationships.

16. The non-transitory computer-readable medium of claim 15, wherein processing the digital objects comprises:

classifying text content;

extracting and classifying visual information from images; and converting audio content to text.

17. The non-transitory computer-readable medium of claim 16, wherein identifying and resolving entities comprises:

identifying entities including people, places, objects, and events; and resolving ambiguities between entities across multiple digital objects.

18. The non-transitory computer-readable medium of claim 17, the operations further comprising displaying an interactive timeline view of entities and relationships.

19. The non-transitory computer-readable medium of claim 18, the operations further comprising:

identifying a new event within the indexed content;

create a node or an edge in the graph of relationships to represent the new event's relationship to the resolved entities; and add the new event to the timelines, adjusting a chronological order of the timelines based on the new event.

20. The non-transitory computer-readable medium of claim 19, the operations further comprising displaying:

a map view of geospatial data related to entities and events;

an events viewer for detailed event information;

a timeline viewer for chronological visualization of events; and a presentation viewer for creating and editing case presentations.

* * * * *